United States Patent
Sato et al.

(10) Patent No.: US 6,580,830 B1
(45) Date of Patent: *Jun. 17, 2003

(54) PICTURE DECODING METHOD AND APPARATUS

(75) Inventors: Kazushi Sato, Chiba (JP); Kenji Komori, Kanagawa (JP); Tetsuo Kaneko, Kanagawa (JP); Satoshi Mitsuhashi, Tokyo (JP); Masami Goseki, Tokyo (JP); Naofumi Yanagihara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/358,032

(22) Filed: Jul. 21, 1999

(30) Foreign Application Priority Data

Jul. 23, 1998 (JP) .............................. 10-208386

(51) Int. Cl.[7] .................................. G06K 9/36

(52) U.S. Cl. ....................... 382/238; 382/236

(58) Field of Search ................. 382/232, 233, 382/234, 235, 236, 240, 244, 247, 251, 300, 304, 307; 348/403.1, 452, 441, 699; 325/240.03, 240.02

(56) References Cited

U.S. PATENT DOCUMENTS

| 5,093,720 A | * | 3/1992 | Krause et al. .............. 348/452 |
| 5,357,282 A | * | 10/1994 | Lee .......................... 348/403.1 |
| 5,485,279 A | * | 1/1996 | Yonemitsu et al. ..... 375/240.02 |
| 5,546,129 A | * | 8/1996 | Lee ............................. 348/699 |
| 6,188,727 B1 | * | 2/2001 | Lee ....................... 375/240.03 |

* cited by examiner

Primary Examiner—Andrew W. Johns
Assistant Examiner—Duy M. Dang
(74) Attorney, Agent, or Firm—Frommer Lawrence & Haug LLP; William S. Frommer; Glenn F. Savit

(57) ABSTRACT

An MPEG downdecoder is to be provided which eliminates dephasing of pixels of moving picture data without losing properties inherent in a picture obtained on interlaced scanning. In the case of a field DCT mode, 4×4 decimating IDCT is executed for phase correction for a ¼ pixel for pixels in the vertical direction of a top field and for phase correction for ¾ pixel for pixels in the vertical direction of a bottom field. In the case of a frame DCT mode, the totality of coefficients of a DCT block are IDCTed and separated into two pixel blocks associated with interlaced scanning. The low-frequency components of these two pixel blocks are IDCTed to synthesize the two pixel blocks. The pixels in the vertical direction of the top field are phase-corrected by a ¼ pixel, while those in the vertical direction of the bottom field are phase-corrected by a ¾ pixel.

14 Claims, 40 Drawing Sheets

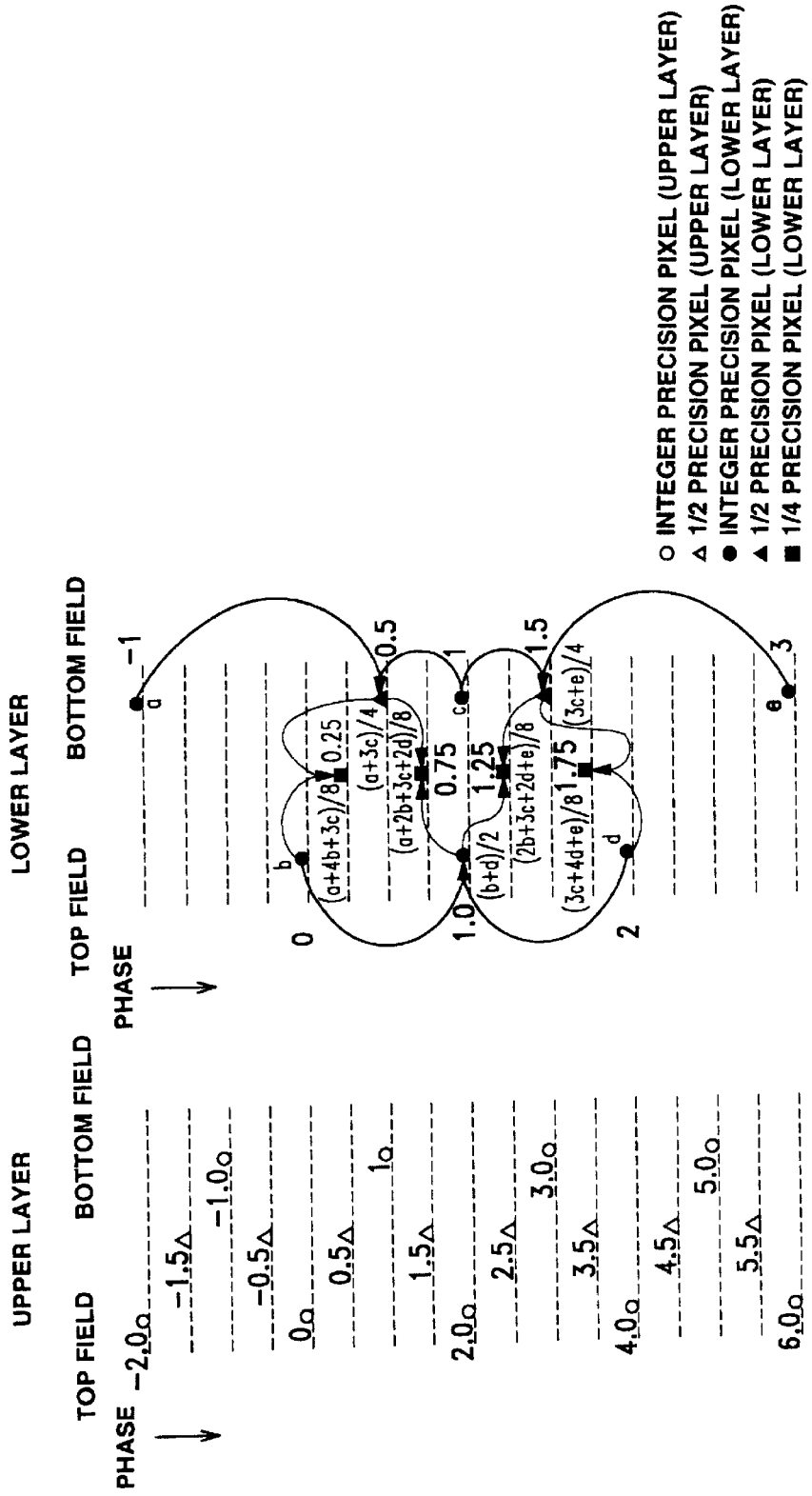

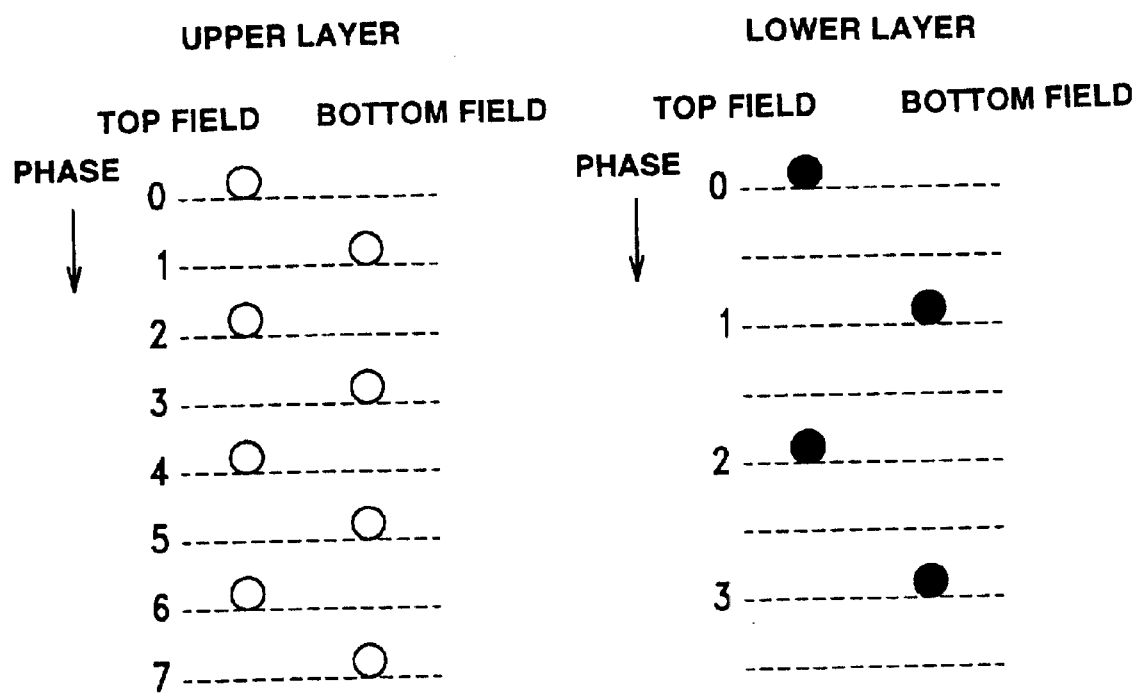
FRAME DCT MODE
FIG.10A  FIG.10B
(PRIOR ART)  (PRIOR ART)

FIG.15

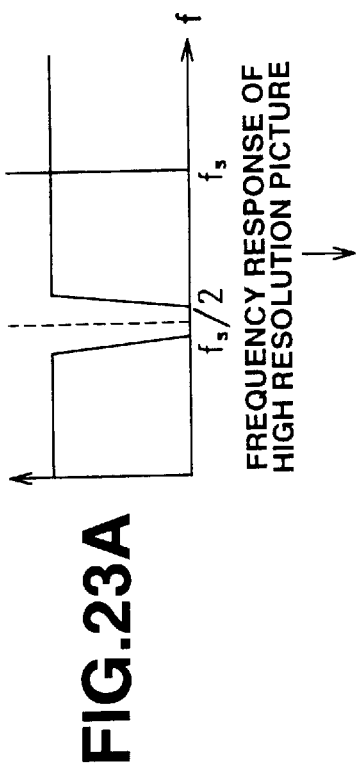
FIG.23A FREQUENCY RESPONSE OF HIGH RESOLUTION PICTURE
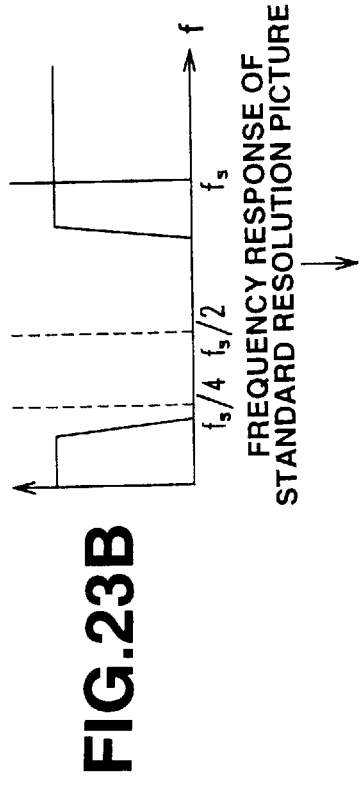
FIG.23B FREQUENCY RESPONSE OF STANDARD RESOLUTION PICTURE
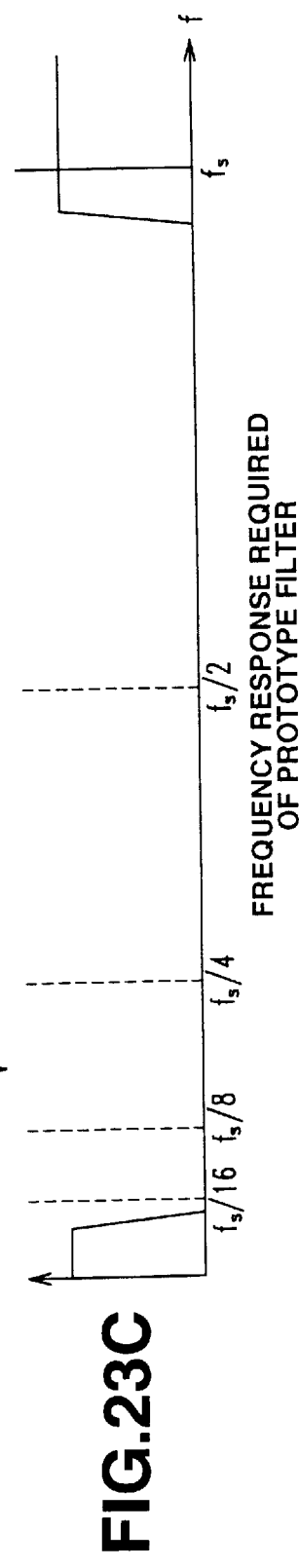
FIG.23C FREQUENCY RESPONSE REQUIRED OF PROTOTYPE FILTER

GAIN LIST ={1,1,1,1,1,0,0,0,0,0,0,0,0,0,0,0,0,0,0,0,0,0,0,0,0,0,0,0,0,}

GAIN LIST = {1,1,0,0,0,0,0,0,0,0,0,0,0,}

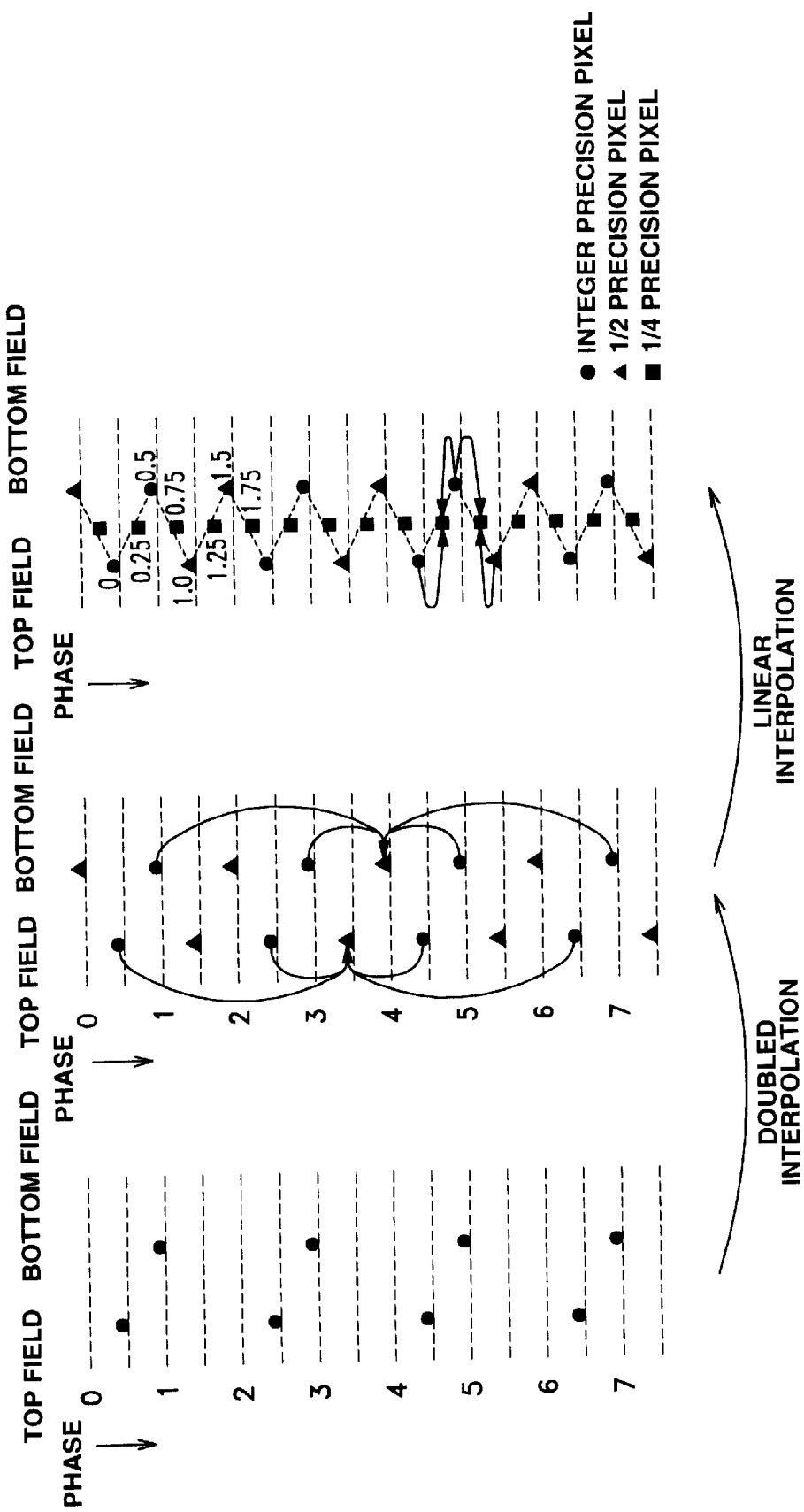

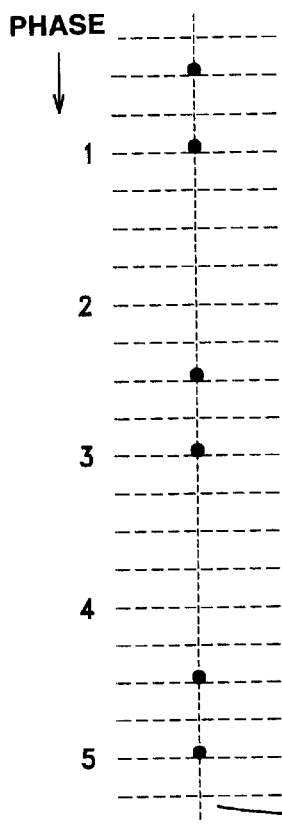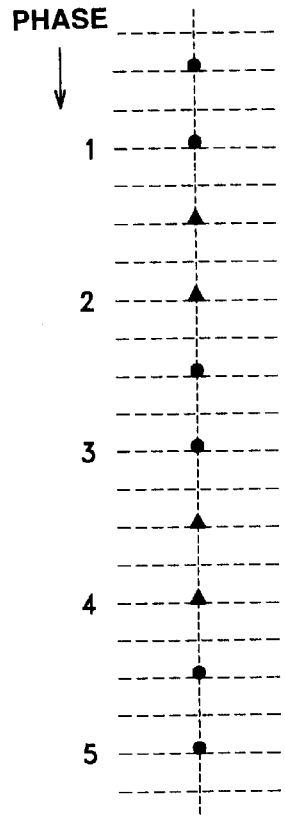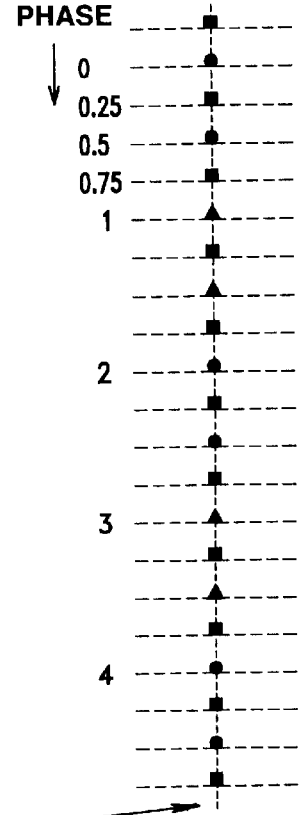
QUADRUPLED INTERPOLATION BASED ON
SAMPLE VALUES OF UNEQUAL INTERVAL
INTER-FIELD
INTERPOLATION
LINEAR
INTERPOLATION
● INTEGER PRECISION PIXEL
▲ 1/2 PRECISION PIXEL
■ 1/4 PRECISION PIXEL
FIG.38A     FIG.38B     FIG.38C

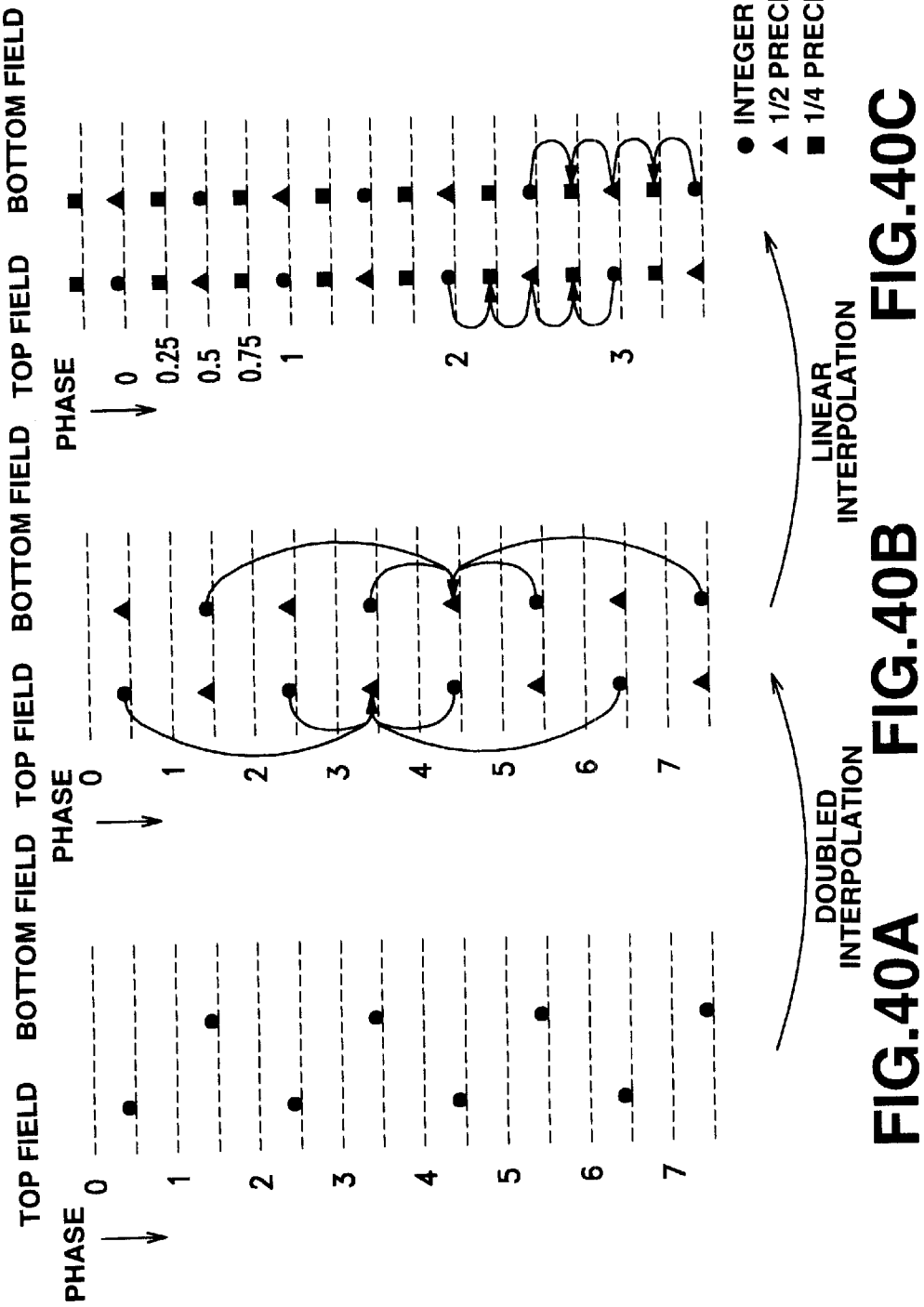

PICTURE DECODING METHOD AND APPARATUS

BACKGROUND OF THE INVENTION

1. Field of the Invention

This invention relates to a picture decoding method and apparatus for decoding compressed picture data of a first resolution obtained on predictive coding by motion prediction in terms of a pre-set pixel block (macro-block) as a unit and on performing orthogonally-transform in terms of a pre-set pixel block (orthogonal transform block) as a unit. More particularly, it relates to a picture decoding method and apparatus for decoding compressed picture data of the first resolution and for decimating the data to moving picture data of a second resolution lower than the first resolution.

2. Description of the Related Art

There is now going on the standardization of digital television signals employing the picture compression system, such as Moving Picture Experts Group Phase 2 (MPEG2). Among the standards for digital television broadcast, there are a standard for standard resolution pictures, such as those with the number of effective lines in the vertical direction of 576, and a standard for high-resolution pictures, such as those with the number of effective lines in the vertical direction of 1152. Recently, there is raised a demand for a downdecoder for decoding compressed picture data of a high-resolution picture and for reducing the resolution of the compressed picture data by ½ to generate picture data of the picture data of standard resolution to display the picture data on a television monitor adapted to cope with the standard resolution.

There is proposed in a publication entitled "Scalable Decoder free of low-range Drift" (written by Iwahashi, Kanbayashi and Takaya, Shingaku-Gihou CS94-186, DSP 94-108, 1995-01) a downdecoder for decoding a bitstream of, for example, MPEG2, obtained on predictive coding with motion prediction of a high-resolution picture and compression coding by discrete cosine transform, and for downsampling the picture to a picture of standard resolution. This Publication, referred to below as Publication 1, shows the following first to third downdecoders.

Referring to FIG. 1, this first downdecoder includes an inverse discrete cosine transform unit 1001, for processing a bitstream of a high resolution picture with 8 (number of coefficients as counted from the dc component in the horizontal direction) ×8 (number of coefficients as counted from the dc component in the vertical direction), an adder 1002 for adding a discrete cosine transformed high resolution picture and a motion-compensated reference picture, and a frame memory 1003 for transient storage of the reference picture. The first downdecoder also includes a motion compensation unit 1004 for motion-compensating the reference picture stored in the frame memory 1003 with ½ pixel precision, and a downsampling unit 1005 for converting the reference picture stored in the frame memory 1003 to a picture of standard resolution.

This first downdecoder reduces an output picture, obtained on decoding as a high resolution picture by inverse discrete cosine transform, by the downsampling unit 1005, to output resulting picture data with the standard resolution.

Referring to FIG. 2, the second downdecoder includes an inverse discrete cosine transform unit 1011 for performing 8×8 inverse discrete cosine transform, as it substitutes 0 for the high-frequency components of the discrete cosine transform (DCT) block of the high resolution picture, an adder 1012 for summing the discrete cosine transformed high resolution picture to the motion-compensated reference picture, and a frame memory 1013 for transient storage of the reference picture. The second downdecoder also includes a motion compensation unit 1014 for motion-compensating the reference picture stored in the frame memory 1013 with ½ pixel precision, and a downsampling unit 1015 for converting the reference picture stored in the frame memory 1013 to a picture of standard resolution.

This second downdecoder performs inverse discrete cosine transform to obtain a decoded output picture, as a high-resolution picture, as it substitutes 0 for coefficients of high-frequency components among the totality of coefficients of the DCT block, and reduces the output picture in size by the downsampling unit 1015 to output picture data of standard resolution.

Referring to FIG. 3, a third downdecoder includes a decimating inverse discrete cosine transform unit 102 for doing e.g., 4×4 inverse discrete cosine transform, using only the coefficients of the low-frequency components of the DCT block of the bitstream of the high resolution picture, for decoding to a standard resolution picture, and an adder 1022 for suiting the standard resolution picture processed with decimating inverse discrete cosine transform and the motion-compensated reference picture. The third downdecoder also includes a frame memory 1023 for transiently storing the reference picture and a motion compensation unit 1024 for motion-compensating the reference picture stored by the frame memory 1023 with a ¼ pixel precision.

In this third downdecoder, IDCT is executed using only low-frequency components of all coefficients of the DCT block to decode a picture of low resolution from a picture of high resolution.

The above-described first downdecoder performs inverse discrete cosine transform on the totality of the coefficients in the DCT block to obtain a high-resolution picture on decoding. Thus, the inverse discrete cosine transform unit 1001 of high processing capability and the frame memory 1003 of high capacity are needed. The second downdecoder performs discrete cosine transform on the coefficients in the DCT block to obtain a high-resolution picture on decoding, as it sets the high-frequency components of the coefficients to zero, so that a lower processing capacity of the inverse discrete cosine transform unit 1011 suffices. However, the frame memory 1003 of high capacity is yet needed. In contradistinction from these first and second downdecoders, the third downdecoder performs inverse discrete cosine transform on the totality of the coefficients in the DCT block, using only coefficients of the low-frequency components of the coefficients in the DCT block, so that a low processing capability of an inverse discrete cosine transform unit 1021 suffices. Moreover, since the reference picture of the standard resolution picture is decoded, a lower capacity of the frame memory 1023 suffices.

Meanwhile, the display system of a moving picture in television broadcast is classified into a sequential scanning system and an interlaced scanning system. The sequential scanning system sequentially displays a picture obtained on sampling the totality of pictures in a given frame at the same timing. The interlaced scanning system alternately displays pictures obtained on sampling pixels in a given frame at different timings from one horizontal line to another.

In this interlaced scanning system, one of the pictures obtained on sampling pixels in a frame at different timings from one horizontal line to another is termed a top field or a first field, with the other picture being termed a bottom field or a second field. The picture containing the leading line in the horizontal direction of a frame becomes the top field, while the picture containing the second line in the horizontal direction of a frame becomes the bottom field. Thus, in the interlaced scanning system, a sole frame is made up of two fields.

With the MPEG2, not only a frame but also a field can be allocated to a picture as a picture compressing unit in order to compress the moving picture signals efficiently in the interlaced scanning system.

If, in the MPEG2, a field is allocated to a picture, the resulting bitstream structure is termed a field structure, while if a frame is allocated to a picture, the resulting bitstream structure is termed a frame structure. In the field structure, a DCT block is constituted by pixels in the field and discrete cosine transform is applied on the field basis. The processing mode of performing field-based discrete cosine transform is termed the field DCT mode. In the frame structure, a DCT block is constituted by pixels in the frame and discrete cosine transform is applied on the frame basis. The processing mode of performing field-based discrete cosine transform is termed the frame DCT mode. In the field structure, a macro-block is constituted from pixels in a field and motion prediction is performed on the field basis. The processing mode of performing motion prediction on the field basis is termed the field motion prediction mode. In the frame structure, a macro-block is constituted from pixels in a frame and motion prediction is performed on the frame basis. The processing mode of performing motion prediction on the frame basis is termed the frame motion prediction mode.

Meanwhile, a picture decoding apparatus, adapted for decoding compressed picture data for the interlaced scanning system, using the third downdecoder shown in the Publication 1, is proposed in, for example, a Publication entitled in "A Compensation Method of Drift Errors in Scalability" written by N. Obikane, K. Tahara and J. Yonemitsu, HDTV Work Shop '93. This Publication is hereinafter termed the Publication 2.

Referring to FIG. 4, the conventional picture decoding device, shown in Publication 2, includes a bitstream analyzer 1031, fed with a bitstream obtained on compressing a high resolution picture in accordance with the MPEG2, for analyzing this bitstream, a variable length encoding/decoding unit 1032 for variable length encoding data for allocating codes of lengths corresponding to the data occurrence frequency and for decoding the variable length encoded bitstream, and a dequantizer 1033 for multiplying the respective coefficients of the DCT block with quantization steps. The conventional picture decoding device also includes a decimating inverse discrete cosine transform unit 1034 for decoding a standard resolution picture by e.g., 4×4 inverse discrete cosine transform using only coefficients of low-frequency components of the totality of the coefficients of the DCT block, and an adder 1035 for summing the standard resolution picture processed with decimating inverse discrete cosine transform to a motion-compensated reference picture. The conventional picture decoding device also includes a frame memory 1036 for transiently storing the reference picture and a motion compensation unit 1037 for motion compensating the reference picture stored in the frame memory 1036 to a ¼ pixel precision.

The decimating inverse discrete cosine transform unit 1034 of the conventional picture decoding device, shown in the Publication 2, performs the inverse discrete cosine transform, using only the coefficients of the low-frequency components of the totality of the coefficients in the DCT block. It is noted that the positions of the coefficients of the frame DCT mode, processed with the inverse discrete cosine transform, differ from those of the field DCT mode.

Specifically, in the field DCT mode, the decimating inverse discrete cosine transform 1034 applies the inverse discrete cosine transform only on the 4×4 of 8×8 coefficients in the DCT block, as shown in FIG. 5. On the other hand, in the frame DCT mode, the decimating inverse discrete cosine transform 1034 applies the inverse discrete cosine transform only on the 4×2+4×2 of 8×8 coefficients in the DCT block, as shown in FIG. 6.

Also, the motion compensation unit 1037 of the conventional picture decoding device performs motion compensation to ¼ pixel precision, adapted to cope with the field motion prediction mode or with the frame motion prediction mode, based on the information (motion vector) on the motion prediction performed on the high resolution picture. Specifically, while the MPEG2 usually provides that the motion compensation be preformed to ½ pixel precision, the number of pixels in a picture is thinned out to one-half if a standard resolution picture is to be decoded from a high resolution picture. Thus, the motion compensation unit 1037 performs motion compensation as it sets the pixel precision for motion compensation to ¼ pixel.

Therefore, the motion compensation device 1037 performs linear interpolation on the pixels of the reference picture stored in the frame memory 1036 as a standard resolution picture to generate pixels to a ¼ pixel accuracy.

Specifically, the processing for linear interpolation of pixels in the perpendicular direction for the field motion prediction mode and that for the frame motion prediction mode are explained with reference to FIGS. 7 and 8, in which the phase of pixels in the vertical direction is indicated in the perpendicular direction, with the phase of each pixel in a displayed picture being indicated by an integer.

Referring to FIG. 7, the processing for interpolation of a picture motion-predicted in the field motion prediction mode is explained. For a high resolution picture (upper layer), motion compensation is independently preformed to a ½ pixel precision, from field to field, as shown in FIG. 7A. On the other hand, for a standard resolution picture (lower layer), motion compensation is achieved by generating pixels dephased by ¼, ½ and ¾ pixel in the perpendicular direction by linear interpolation in a field based on the pixel of an integer number precision, as shown in FIG. 7B. That is, in the standard resolution picture (lower layer), pixels with ¼ pixel precision of the top field are generated by linear interpolation based on the pixels of the integer number precision of the top field, while those with ¼ pixel precision of the bottom field are generated by linear interpolation based on the pixels of the integer number precision of the bottom field. It is assumed for example that the value of a pixel of the top field, having the phase in the perpendicular direction at the 0-position, is a, with the value of a pixel having the phase in the perpendicular direction at the 1-position is b. In this case, the pixel of the top field with the phase in the perpendicular direction of ¼ is (3a+b)/4, while the pixel of the top field with the phase in the perpendicular direction of ½ is (a+b)/2, with the pixel of the top field with the phase in the perpendicular direction of ¾ being (a+3b)/4.

Referring to FIG. 8, the processing of interpolation of a picture motion-predicted in the frame motion prediction mode is explained. For a high resolution picture (upper layer), interpolation processing is performed across the fields, that is across the bottom field and the top field, as shown in FIG. 8A, with the motion compensation precision being ½ pixel precision. For a standard resolution picture (lower layer), motion compensation is achieved by generating pixels dephased by ¼, ½ and ¾ pixels in the perpendicular direction, based on the pixels of the integer number precision of two fields, that is the top field and the bottom field, as shown in FIG. 8B. For example, it is assumed that the value of a pixel of the bottom field having the phase in the perpendicular direction of −1 is a, the value of a pixel of the top field having the phase in the perpendicular direction of 0 is b, the value of a pixel of the bottom field having the phase in the perpendicular direction of 1 is c, the value of a pixel of the top field having the phase in the perpendicular direction of 2 is d, and a pixel of the top field having the phase in the perpendicular direction of 3 is e. In this case, the pixels of ¼ pixel precision, having the phase in the perpendicular direction in a range from 0 and 2, may be found as follows:

The pixel having the phase in the perpendicular direction of ¼ is (a+4b+3c)/8, while the pixel having the phase in the perpendicular direction of ½ is (a+3c)/4. The pixel having the phase in the perpendicular direction of ¾ is (a+2b+3c+2d)/8, while the pixel having the phase in the perpendicular direction of 5/4 is (2b+3c+2d+e )/8. The pixel having the phase in the perpendicular direction of 3/2 is (3c+e)/4, while the pixel having the phase in the perpendicular direction of 7/4 is (3c+4d+e)/8.

With the above-described picture decoding device, disclosed in the Publication 2, the compressed picture data of the high resolution picture, associated with the interlaced scanning system, can be decoded to standard resolution picture.

However, with the conventional picture decoding device, shown in the above Publication 2, the pixels of the standard resolution picture obtained with the field DCT mode are dephased with respect to the pixels of the standard resolution obtained with the frame DCT mode. Specifically, with the field DCT mode, the phases of the pixels in the perpendicular direction of the respective pixels of the top field of the lower layer are ½, 5/2, . . . , with the phases in the perpendicular direction of the respective pixels of the bottom field of the lower layer being 1, 3, . . . , as shown in FIG. 9. On the other hand, with the field DCT mode, the phases of the pixels in the perpendicular direction of the respective pixels of the top field of the lower layer are 0, 2, . . . , with the phases in the perpendicular direction of the respective pixels of the bottom field of the lower layer being 1, 3, . . . , as shown in FIG. 10. Thus, the pictures with different phases co-exist in the frame memory 1036, thus deteriorating the picture quality of the output picture.

With the conventional picture decoding device, shown in the Publication 2, correction is not made of phase deviations or dephasing of the pixels at the time of the motion compensation with the field motion prediction mode and the frame motion prediction mode resulting in the deteriorated picture quality.

SUMMARY OF THE INVENTION

It is therefore an object of the present invention to provide a picture decoding method and a picture decoding device for decoding standard resolution picture data from compressed picture data of the high resolution picture whereby phase deviations of pixels of output moving picture data may be eliminated without detracting from characteristics proper to a picture obtained on interlaced scanning.

In one aspect, the present invention provides a picture decoding apparatus for decoding moving picture data of a second resolution from compressed picture data of a first resolution, obtained on predictive coding by motion prediction in terms of a pre-set pixel block (macro-block) as a unit and on compression coding in terms of a pre-set pixel block (orthogonal transform block) as a unit, the second resolution being lower than the first resolution. The picture decoding apparatus includes first inverse orthogonal transform means for inverse orthogonal transforming an orthogonal transform block of the compressed picture data, orthogonal transformed by an orthogonal transform system (field orthogonal transform mode) associated with the interlaced scanning, second inverse orthogonal transform means for inverse orthogonal transforming an orthogonal transform block of the compressed picture data, orthogonal transformed in accordance with an orthogonal transform system (frame orthogonal transform mode) associated with the sequential scanning, addition means for summing the compressed picture data, inverse orthogonal transformed by the first inverse orthogonal transform means or the second inverse orthogonal transform means, to motion compensated reference picture data to output moving picture data of the second resolution, memory means for storing moving picture data outputted by the addition means as reference picture data, and motion compensation means for motion compensating the macro-block of the reference picture data stored in the memory means. The first inverse orthogonal transform means inverse orthogonal transforms coefficients of low-frequency components of respective coefficients of the orthogonal transform block and corrects the phase of a ¼ pixel for the vertical direction of respective pixels of the top field obtained on inverse orthogonal transform, the first inverse orthogonal transform means correcting the phase of a ¾ pixel for the vertical direction of respective pixels of the bottom field obtained on inverse orthogonal transform. The second inverse orthogonal transform means inverse orthogonal transforms the coefficients of the totality of the frequency components of the orthogonal transform block, separates the inverse orthogonal transformed block into two pixel blocks associated with the interlaced scanning, inverse orthogonal transforms low-frequency components of the coefficients of the two orthogonal transformed pixel blocks, corrects the phase of ¼ pixel for the vertical direction of respective pixels of the top field obtained on inverse orthogonal transform, corrects the phase of ¾ pixel for the vertical direction of respective pixels of the bottom field obtained on inverse orthogonal transform, and synthesizes the phase-corrected top and bottom fields.

In this picture decoding device, the coefficients of the totality of the frequency components of the orthogonal transform block are inverse orthogonal transformed, the inverse orthogonal transformed block are separated into two pixel blocks associated with the interlaced scanning, low-frequency components of the coefficients of the two orthogonal transformed pixel blocks are inverse orthogonal transformed, the phase of ¼ pixel for the vertical direction of respective pixels of the top field obtained on inverse orthogonal transform is corrected, the phase of ¾ pixel for the vertical direction of respective pixels of the bottom field obtained on inverse orthogonal transform is corrected, and the phase-corrected top and bottom fields are synthesized.

With the picture decoding device of the present invention, the motion compensation means includes first motion compensation means for motion compensating a macro-block of reference picture data motion-predicted in accordance with a motion prediction system associated with interlaced scanning (field motion prediction mode), and second motion compensation means for motion compensating a macro-block of reference picture data motion-predicted in accordance with a motion prediction system associated with sequential scanning (frame motion prediction mode). The first motion compensation means and the second motion compensation means interpolate respective pixels of the macro-block of reference picture data stored in the memory means to generate a macro-block constituted by pixels of the ¼ pixel precision for the reference picture data stored in the memory means to execute motion compensation on the generated macro-block.

The present picture decoding device interpolates the pixels of the macro-block od stored reference picture data to generate a macro-block constructed by pixels of the ¼ pixel precision.

In the present picture decoding device, the first and second motion compensation means switch the number of taps of a filter used for interpolating respective pixels of a macro-block of reference picture data stored in the memory means, every pre-set unit, to generate a macro-block constructed by pixels of ¼ pixel precision for reference picture data stored in the memory means.

In the present picture decoding device, the number of tapes of a filter is switched to interpolate respective pixels of a macro-block of stored reference picture data to generate a macro-block constructed from pixels of ¼ pixel precision.

In the present picture decoding device, the second motion compensation means interpolate respective pixels of the macro-block of reference picture data stored in the memory means between top and bottom fields to generate a macro-block constructed by pixels of ¼ pixel precision for reference picture data stored in the memory means.

In the present picture decoding device, respective pixels of the macro-block of reference picture data orthogonal transformed by the frame orthogonal transform mode are interpolated between top and bottom fields to generate a macro-block constructed by pixels of ¼ pixel precision.

In another aspect, the present invention provides a picture decoding method for decoding moving picture data of a second resolution from compressed picture data of a first resolution, obtained on predictive coding by motion prediction in terms of a pre-set pixel block (macro-block) as a unit and on compression coding in terms of a pre-set pixel block (orthogonal transform block) as a unit, the second resolution being lower than the first resolution. The picture decoding method includes inverse orthogonal transforming an orthogonal transform block of the compressed picture data, orthogonal transformed in accordance with an orthogonal transform system (field orthogonal transform mode) associated with the interlaced scanning, inverse orthogonal transforming an orthogonal transform block of the compressed picture data, orthogonal transformed in accordance with an orthogonal transform system (frame orthogonal transform mode) associated with the sequential scanning, summing the inverse orthogonal transformed compressed picture data to motion compensated reference picture data, storing moving picture data, obtained on summation, as reference picture data, motion compensating a macro-block of stored reference picture data, inverse orthogonal transforming coefficients of low-frequency components of respective coefficients of an orthogonal transform block orthogonal transformed in accordance with the field orthogonal transform mode, correcting the phase of a ¼ pixel for the vertical direction of respective pixels of the top field obtained on orthogonal transform, correcting the phase of a ¾ pixel for the vertical direction of respective pixels of the bottom field obtained on inverse orthogonal transform, inverse orthogonal transforming coefficients of the totality of frequency components of an orthogonal transform block in accordance with a frame orthogonal transform mode, separating the inverse orthogonal transformed orthogonal transform block into two pixel blocks associated with interlaced scanning, orthogonal transforming the separated two pixel blocks, inverse orthogonal transforming coefficients of the low-frequency components of respective coefficients of the two orthogonal transformed blocks, correcting the phase of a ¼ pixel for the vertical direction of respective pixels of the top field obtained on inverse orthogonal transform, correcting the phase of a ¾ pixel for the vertical direction of respective pixels of the bottom field obtained on inverse orthogonal transform, and synthesizing the phase-corrected top and bottom fields.

According to the present invention, an orthogonal transform block of the compressed picture data, orthogonal transformed in accordance with an orthogonal transform system (field orthogonal transform mode) associated with the interlaced scanning, is inverse orthogonal transformed, an orthogonal transform block of the compressed picture data, orthogonal transformed in accordance with an orthogonal transform system (frame orthogonal transform mode) associated with the sequential scanning, is inverse orthogonal transformed, and the inverse orthogonal transformed compressed picture data is summed to motion compensated reference picture data. The moving picture data, obtained on summation, are stored as reference picture data, a macro-block of stored reference picture data is motion compensated and coefficients of low-frequency components of respective coefficients of an orthogonal transform block orthogonal transformed in accordance with the field orthogonal transform mode are inverse orthogonal transformed. The phase of a ¼ pixel for the vertical direction of respective pixels of the top field obtained on orthogonal transform is corrected, and the phase of a ¾ pixel for the vertical direction of respective pixels of the bottom field obtained on inverse orthogonal transform is corrected. The coefficients of the totality of frequency components of an orthogonal transform block are inverse orthogonal transformed in accordance with a frame orthogonal transform mode. The inverse orthogonal transformed orthogonal transform block is separated into two pixel blocks associated with interlaced scanning. The separated two pixel blocks are respectively orthogonal transformed, and coefficients of the low-frequency components of respective coefficients of the two orthogonal transformed blocks are inverse orthogonal transformed, and the phase of a ¼ pixel for the vertical direction of respective pixels of the top field obtained on inverse orthogonal transform is corrected, while the phase of a ¾ pixel for the vertical direction of respective pixels of the bottom field obtained on inverse orthogonal transform is also corrected, and synthesizing the phase-corrected top and bottom fields. The present picture decoding device outputs moving picture data of a second resolution lower than a first resolution.

Thus, in accordance with the present invention, the processing volume necessary for decoding can be reduced, while dephasing of pixels of output moving picture data of the second resolution can be eliminated without impairing the characteristics proper to the interlaced picture. That is, output moving picture data can be displayed without filtering. In addition, the moving picture data of the second resolution can be improved in quality.

In the present picture decoding device, coefficients of the totality of frequency components of two orthogonal transform blocks in accordance with a frame orthogonal transform mode are inverse orthogonal transformed, and the inverse orthogonal transformed orthogonal transform blocks are separated into two pixel blocks associated with interlaced scanning. The separated two pixel blocks are orthogonal transformed, and the coefficients of the low-frequency components of respective coefficients of the two orthogonal transformed blocks are inverse orthogonal transformed. The phase of a ¼ pixel for the vertical direction of respective pixels of the top field obtained on inverse orthogonal transform is corrected, while the phase of a ¾ pixel for the vertical direction of respective pixels of the bottom field obtained on inverse orthogonal transform is also corrected, and the phase-corrected top and bottom fields are synthesized.

Thus, in accordance with the present invention, the processing volume necessary for decoding can be reduced, while dephasing of pixels of output moving picture data of the second resolution can be eliminated without impairing picture characteristics proper to the interlaced picture. Specifically, output moving picture data can be displayed without filtering. In addition, the moving picture data of the second resolution can be improved in quality.

In the present invention, pixels of a macro-block of stored reference picture data are interpolated to generate a macro-block constructed by pixels of ¼ pixel precision.

Thus, according to the present invention, dephasing of pixels between the field motion prediction mode and the frame motion prediction mode is eliminated to prevent deterioration of the picture quality ascribable to motion compensation.

According to the present invention, the number of filter taps can be switched to interpolate the pixels of the macro-block of the stored reference picture data to generate a macro-block constructed by pixels of ¼ pixel precision.

Thus, according to the present invention, the processing volume at the time of motion compensation can be reduced without deteriorating the picture quality to expedite the processing.

According to the present invention, the respective pixels of the macro-block of reference picture data orthogonal transformed by the frame orthogonal transform mode can be interpolated between the top and bottom fields to generate a macro-block constructed by pixels of the ¼ pixel precision.

In this manner, it is possible with the present invention to prevent deterioration of the picture quality ascribable to motion compensation.

BRIEF DESCRIPTION OF THE DRAWINGS

FIGS. 8A and 8B illustrate linear interpolation processing in the frame DCT mode of the conventional decoding device shown in FIG. 4.

FIGS. 10A and 10B illustrate the phase of the pixel obtained as a result of the frame DCT mode of the conventional decoding device shown in FIG. 4.

FIG. 15 illustrates a DCT block of luminance and chrominance components in a 420-format macro-block.

FIGS. 23A, 23B, 23C illustrate the frequency response of a prototype filter required for designing the 4×8 phase correcting IDCT matrix.

FIGS. 37A, 37B, 37C illustrate the interpolation processing in the motion compensation device for the frame mode of the picture decoding device shown in FIG. 35.

FIGS. 38A, 38B, 38C illustrate an alternative interpolation processing in the motion compensation device for the frame mode of the picture decoding device shown in FIG. 35.

FIGS. 40A, 40B, 40C illustrate interpolation processing in the motion compensation device for the field mode of the picture decoding device shown in FIG. 39.

DESCRIPTION OF THE PREFERRED EMBODIMENTS

Figure 1:
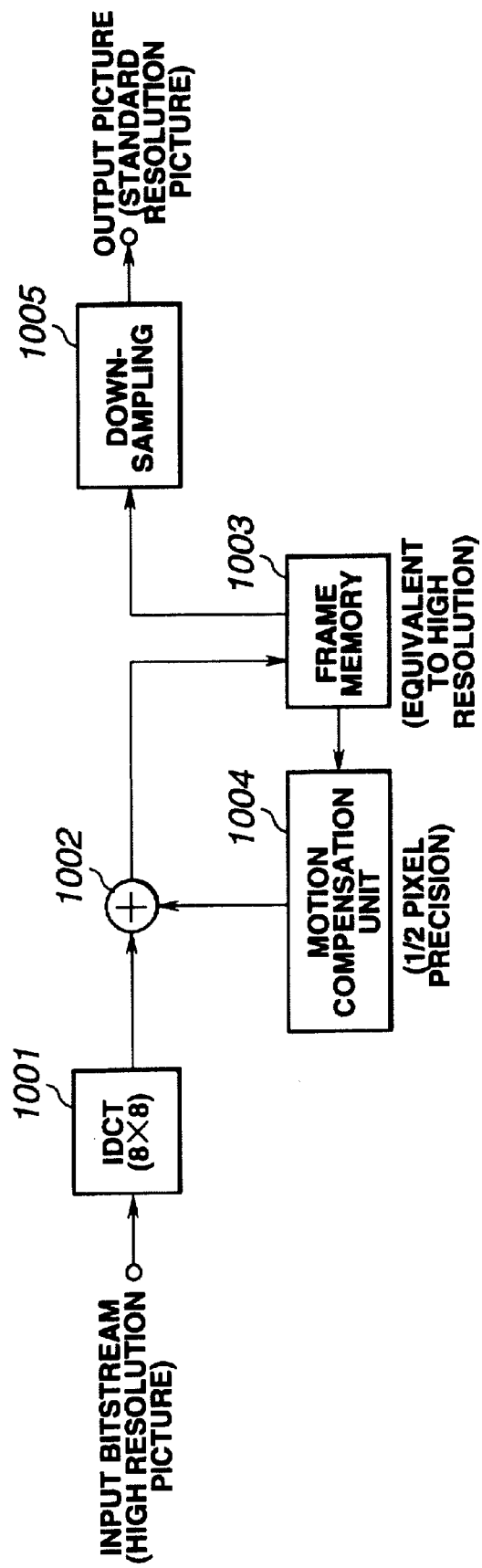
FIG. 1 is a block diagram showing a conventional first downdecoder.

Referring to the drawings, preferred embodiments of a picture decoding device according to the present invention will be explained in detail.

First Embodiment

First, a picture decoding device according to a first embodiment of the present invention is explained.

Figure 11:
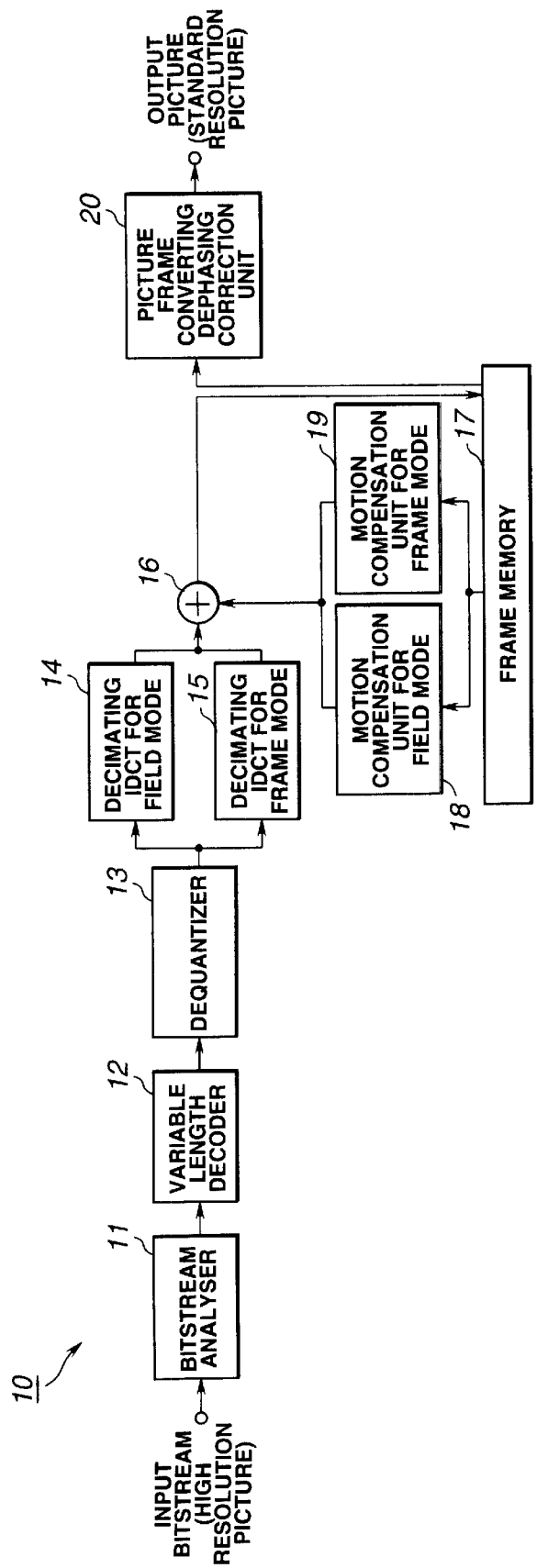
FIG. 11 is a block diagram showing a picture decoding device according to a first embodiment of the present invention.

Referring to FIG. 11, a picture decoding device 10 of the first embodiment of the present invention is designed and constructed so that a bitstream obtained on compressing a high resolution picture with the number of effective lines in the vertical direction of, for example, 1152, by MPEG2, is entered as an input, with the input bitstream being decoded and decimated to a resolution of ½ to output a standard resolution picture with the number of effective lines in the vertical direction of, for example, 576.

In the following explanation of the embodiments of the present invention, a high resolution picture is termed an upper layer and a standard resolution picture is termed a lower layer. It is noted that, if a DCT block having 8×8 discrete cosine coefficients is inverse discrete cosine transformed, there result decoded data made up of 8×8 pixels. The processing of inverse discrete cosine transform processing and simultaneously reducing the resolution, such as decoding 8×8 discrete cosine coefficients to obtain decoded data made up of 4×4 pixels, is termed the decimating inverse discrete cosine transform.

This picture decoding device 10 includes a bitstream analysis unit 11, fed with a bitstream of a compressed high resolution picture and adapted for analyzing the input bitstream, and a variable length decoding unit 12 for decoding the bitstream, processed with variable length encoding of allocating a code length associated with the data occurrence frequency. The picture decoding device 10 also includes a dequantizer 13 for multiplying the coefficients of the DCT block with quantization steps and a decimating inverse discrete cosine transform unit 14 for decimating inverse discrete cosine transforming the DCT block discrete cosine transformed with the field DCT mode to generate a standard resolution picture. The picture decoding device 10 also includes a decimating inverse discrete cosine transform unit for frame mode 15 for decimating inverse discrete cosine transforming the DCT block discrete cosine transformed in the frame DCT mode and an adder 16 for summing the standard resolution picture processed with decimating inverse discrete cosine transform to the motion compensated reference picture. The picture decoding device 10 also includes a frame memory 17 for temporarily storing the reference picture and a motion compensation unit for field mode 18 for motion compensating the reference picture stored in the frame memory 17 in meeting with the field motion predictive mode. The picture decoding device 10 also includes a motion compensation unit for frame mode 19 for motion compensating the reference picture stored in the frame memory 17 in meeting with the frame motion predictive mode, and a picture frame converting dephasing correction unit 20 for post-filtering a picture stored in the frame memory 17 for picture frame conversion and for correcting the dephasing of pixels for display on a television monitor etc.

Figure 5:
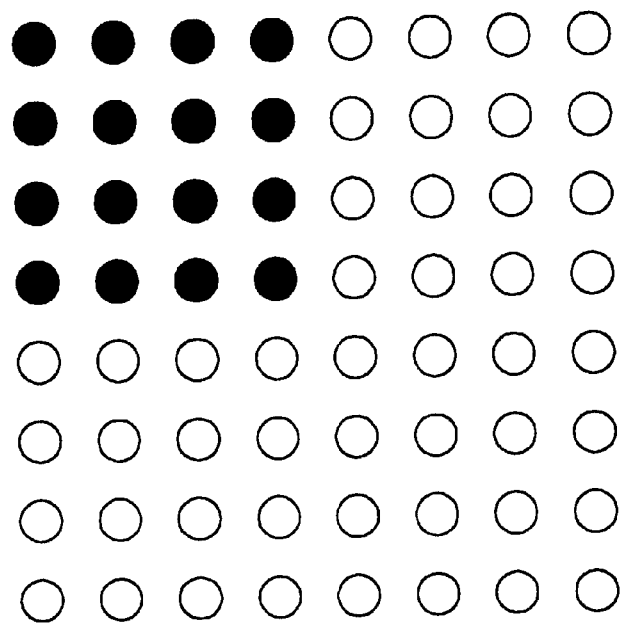
FIG. 5 illustrates the reducing inverse DCT in the field DCT mode of the conventional decoding device shown in FIG. 4.
Figure 6:
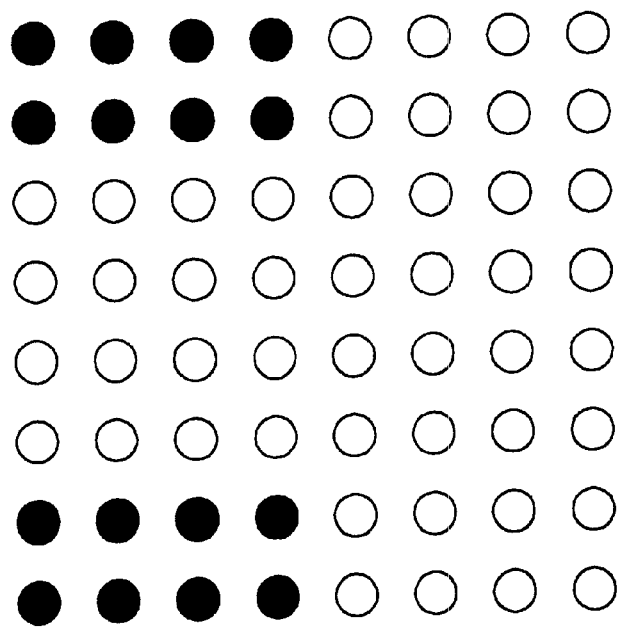
FIG. 6 is a view similar to FIG. 5 and illustrates the reducing inverse DCT in the field DCT mode of the conventional decoding device shown in FIG. 4.
Figures 7A, 7B:
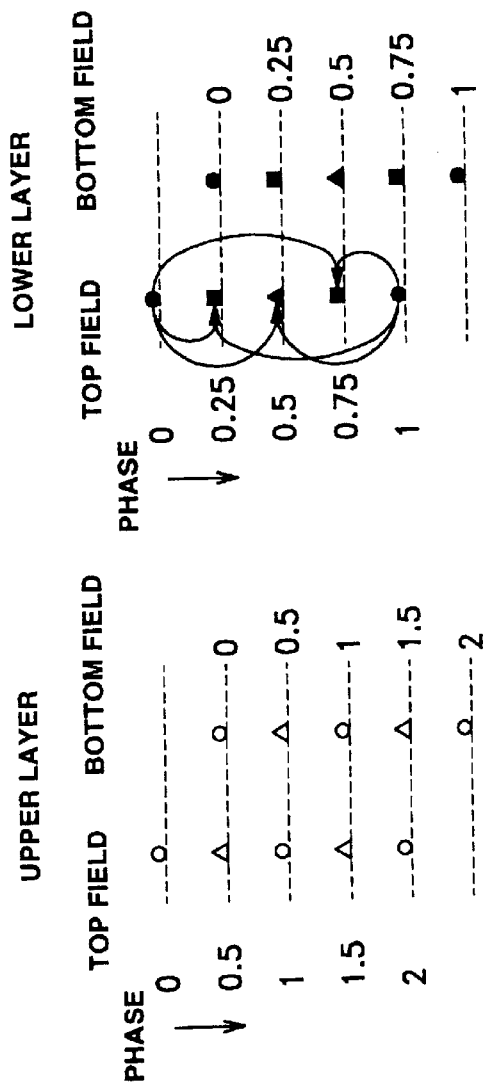
FIGS. 7A and 7B illustrate linear interpolation processing in the field DCT mode of the conventional decoding device shown in FIG. 4.
Figures 9A, 9B:
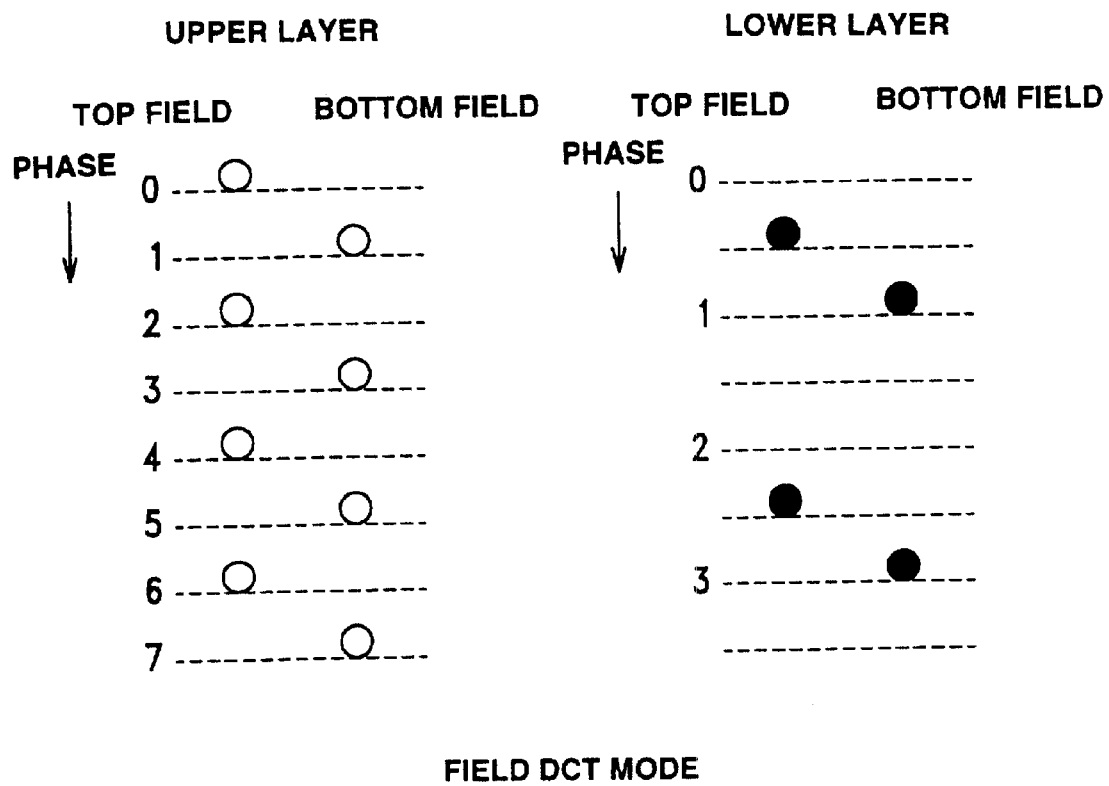
FIGS. 9A and 9B illustrate the phase of the pixel obtained as a result of the field DCT mode of the conventional decoding device shown in FIG. 4.
Figure 12:
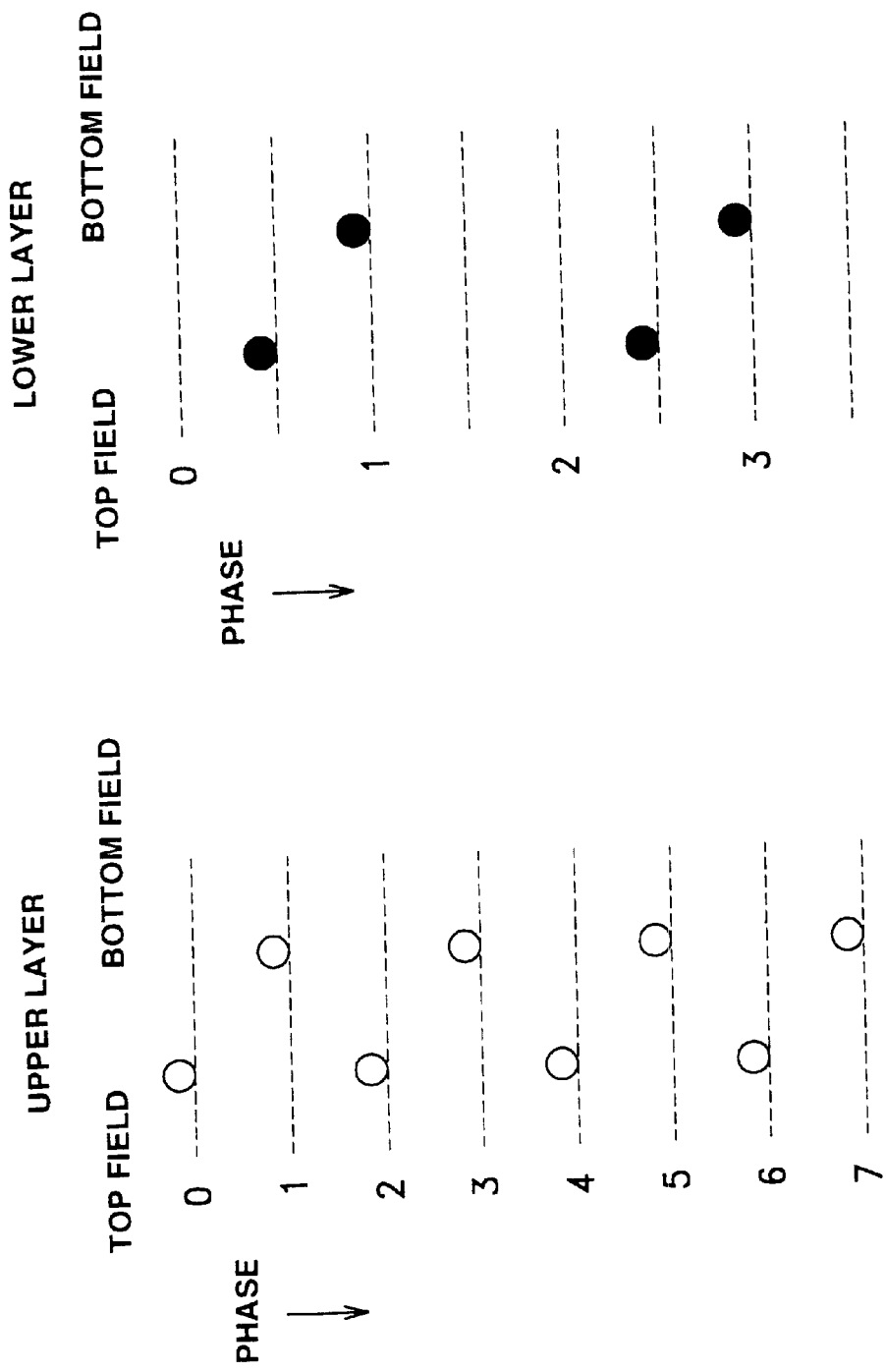
FIG. 12 illustrates the phase of pixels in the perpendicular direction of a reference picture stored in a frame memory of the picture decoding device shown in FIG. 1.

The decimating inverse discrete cosine transform unit 14 for field mode is used if the macro-block of an input bitstream is discrete cosine transformed in the field DCT mode. The decimating inverse discrete cosine transform unit 14 for field mode performs inverse discrete cosine transform only on the low-range 4×4 coefficients of the DCT block, showing 8×8 coefficients in the macro-block discrete cosine transformed in the field DCT mode, as shown in FIG. 5. That is, the decimating inverse discrete cosine transform unit 14 for field mode performs decimating inverse discrete cosine transform based on four point inverse discrete cosine coefficients in the horizontal direction and in the vertical direction. This decimating inverse discrete cosine transform unit 14 for field mode can decode the standard resolution picture, each DCT block of which is made up of 4×4 pixels, by the above-described decimating inverse discrete cosine transform. The phases of the pixels of the decoded picture data are ½, 5⁄2, . . . , in the per direction of the respective pixels of the top field, with the phases in the perpendicular direction of the respective pixels of the bottom field being 1, 3, . . . , as shown in FIG. 12. That is, in the top field of the decoded lower layer, the phase of the leading end pixel (pixel with the phase of ½) is intermediate between the first and second pixels (pixels with the phase 0 and the phase 2) as from the leading end of the top field of the upper layer, while the phase of the second pixel as from the leading end pixel (pixel with the phase of ⅔) is intermediate between the third and fourth pixels (pixels with the phase 4 and the phase 6) as from the leading end of the top field of the upper layer. On the other hand, in the bottom field of the decoded lower layer, the phase of the leading end pixel (pixel with the phase of 1) is intermediate between the first and second pixels (pixels with the phase 1 and the phase 3) as from the leading end of the bottom field of the upper layer, whereas the phase of the second pixel as from the leading end pixel (pixel with the phase of 3) is intermediate between the third and fourth pixels (pixels with the phase 5 and the phase 7) as from the leading end of the bottom field of the upper layer.

The decimating inverse discrete cosine transform unit for frame mode 15 is used when the macro-block of the input bitstream is discrete cosine transformed with the frame DCT mode. The decimating inverse discrete cosine transform unit for frame mode 15 performs decimating inverse discrete cosine transform on the DCT block showing 8×8 coefficients in the macro-block discrete cosine transformed in the frame DCT mode. The decimating inverse discrete cosine transform unit for frame mode 15 decodes the standard resolution picture, each DCT block of which is constituted by 4×4 pixels, while generating a picture of the same phase as the phase of the pixel of the standard resolution picture generated by the decimating inverse discrete cosine transform unit 14. That is, the phases in the perpendicular direction of the respective pixels of picture data decoded by the decimating inverse discrete cosine transform unit for frame mode 15 are such that the phases in the perpendicular direction of respective pixels of the top field are ½, 5/2, . . . , with the phases in the perpendicular direction of the respective pixels of the bottom field being 1, 3, . . . , as shown in FIG. 12.

The processing by the decimating inverse discrete cosine transform unit for frame mode 15 will be explained subsequently in detail.

If a macro-block processed with decimating inverse discrete cosine transform by the decimating inverse discrete cosine transform unit 14 or by the decimating inverse discrete cosine transform unit for frame mode 15 is an intra-picture, the adder 16 directly stores the intra-picture in the frame memory 17. If a macro-block processed with decimating inverse discrete cosine transform by the decimating inverse discrete cosine transform unit 14 or by the decimating inverse discrete cosine transform unit for frame mode 15 is an inter-picture, the adder 16 synthesizes the reference picture, motion compensated by the motion compensation unit for field mode 18 or by the motion compensation unit for frame mode 19, to the inter-picture, to store the synthesized picture in the frame memory 17.

The motion compensation unit for field mode 18 is used if the motion prediction mode for the macro-block is the field motion prediction mode. The motion compensation unit for field mode 18 performs pixel interpolation, employing orthogonal transform, on the standard resolution reference picture stored in the frame memory 17, to generate a virtual upper-order picture of the same resolution as the resolution of the high resolution picture. The motion compensation unit for field mode 18 performs motion compensation in meeting with the field motion prediction mode on the virtual upper-order picture and reduces the pixels of the motion compensated virtual upper-order picture using orthogonal transform to generate a reference picture of the standard resolution. The reference picture, motion compensated by the motion compensation unit for field mode 18, is sent to the adder 16 for synthesis to the inter-picture.

The motion compensation unit for frame mode 19 is used when the macro-block motion prediction mode is the frame motion prediction mode. The motion compensation unit for frame mode 19 performs pixel interpolation employing orthogonal transform on the reference picture of the standard resolution stored in the frame in memory 17 to generate the virtual upper-order picture of the same resolution as that of the high resolution picture. The motion compensation unit for frame mode 19 performs motion compensation in meeting with the field prediction mode on the virtual upper-order picture and reduces the number of pixels of the motion compensated virtual upper-order picture using orthogonal transform to generate the reference picture of the standard resolution. The reference picture, motion compensated by the motion compensation unit for frame mode 19, is routed to the adder 16 for synthesis to the inter-picture.

The picture frame converting dephasing correction unit 20 is fed with the standard resolution reference picture stored in the frame memory 17, or with the picture synthesized by the adder 16, and corrects the picture by post-filtering for phase deviation between the top and bottom fields, while converting the picture frame in meeting with the standard of the standard resolution television. Specifically, the picture frame converting dephasing correction unit 20 corrects the standard resolution picture, with the phases of the pixels of the top field in the perpendicular direction being ½, 5/2, . . . and with the phases in the perpendicular direction of the respective pixels of the bottom field being 1, 3, . . . , so that the phases in the perpendicular direction of the respective pixels of the top field will be 0, 2, 4, . . . and so that the phases in the perpendicular direction of the respective pixels of the bottom field will be 1, 3, 5, . . . The picture frame converting dephasing correction unit 20 also reduces the picture frame of the standard for high resolution television to ¼ for conversion to a picture frame of the standard for standard resolution television.

With the picture decoding device 10 of the first embodiment of the present invention, having the above-described structure, it is possible to decode a bitstream, obtained on picture compression of a high resolution picture by the MPEG2, and to reduce the resolution to ½, in order to output a standard resolution picture.

The processing contents of the decimating inverse discrete cosine transform unit for frame mode 15 will be explained subsequently in further detail.

Meanwhile, the decimating inverse discrete cosine transform unit for frame mode 15 is able to perform one or both of the one-block processing or the two-block processing as now explained. It is possible with the decimating inverse discrete cosine transform unit for frame mode 15 to switch between the one-block processing and the two-block processing as the occasion may demand or to perform only one of the processings.

Figure 13:
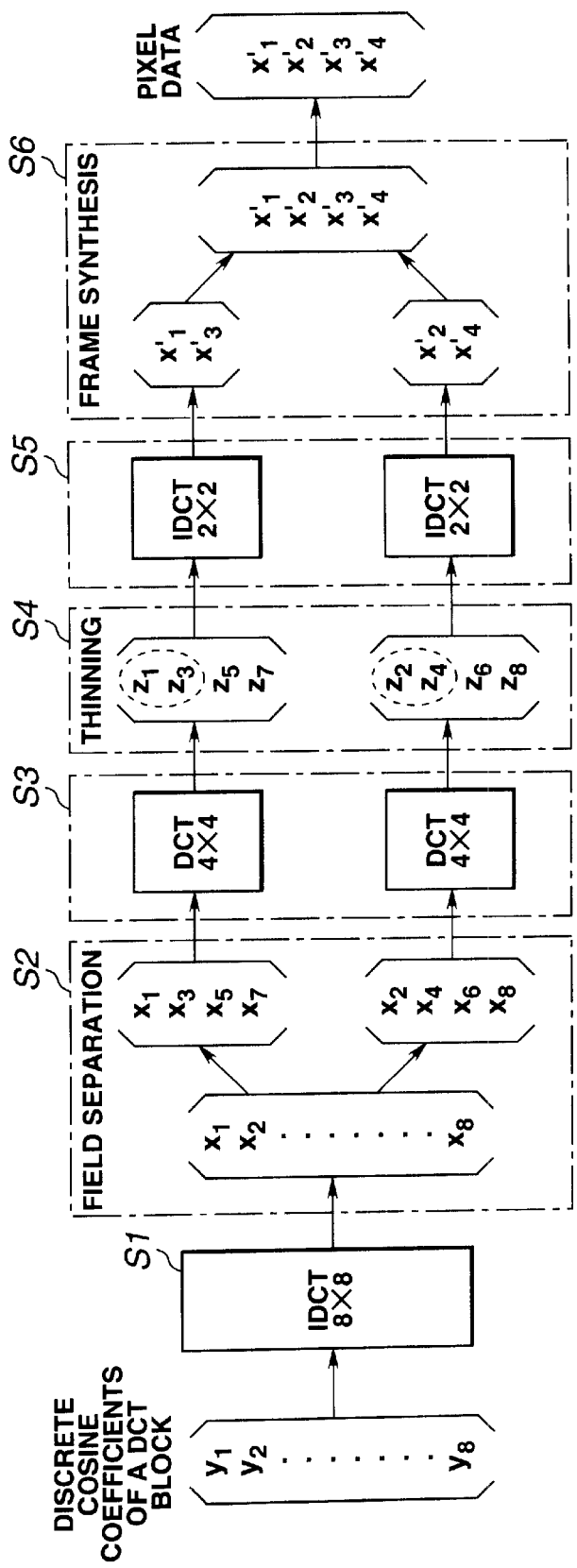
FIG. 13 illustrates the contents of processing of one block of a decimating inverse discrete cosine transform for a frame mode of a picture decoding device shown in FIG. 11.

First, the one-block processing is explained. FIG. 13 illustrates the contents of the one-block processing.

The decimating inverse discrete cosine transform unit for frame mode 15 is fed with a bitstream, obtained on compression encoding a high resolution picture, in terms of a DCT block as a unit, as shown in FIG. 13.

First, at step S1, 8×8 inverse discrete cosine transform (IDCT 8×8) is performed on the discrete cosine coefficients y of the DCT block. The coefficients in the perpendicular direction, among the totality of the discrete cosine coefficients of the DCT block, are indicated as $y_1$ to $y_8$ in the drawing. By this inverse discrete cosine transform, 8×8 decoded pixel data x are produced. It is noted that pixel data in the perpendicular direction of the totality of pixel data of the DCT block are indicated as $x_1$ to $x_8$ in the drawing.

At the next step S2, the 8×8 pixel data x are retrieved alternately on the line basis in the perpendicular direction, and are separated into two pixel blocks, namely a pixel block of the 4×4 top field in meeting with the interlaced scanning and a pixel block of the 4×4 bottom field in meeting with the interlaced scanning. That is, the pixel data x, on the first line, pixel data $x_3$ on the third line, pixel data $x_5$ on the fifth line and pixel data $x_7$ on the seventh line in the vertical direction are retrieved to generate a pixel block for the top field. On the other hand, the pixel data $x_2$ on the second line, pixel data $X_4$ on the fourth line, pixel data $x_6$ on the sixth line and pixel data $x_8$ on the eighth line in the vertical direction are retrieved to generate a pixel block for the bottom field. The processing for separating pixels of a DCT block into two pixel blocks in meeting with the interlaced scanning is referred to below as field separation.

Then, at step S3, each of the two pixel blocks, resulting from field separation, is processed with 4×4 discrete cosine transform (DCT 4×4).

Next, at step S4, high-frequency components of discrete cosine coefficients of the pixel block for the top field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the top field, are shown as $z_1$, $z_3$, $z_5$ and $z_7$ in the drawing. Also, high-frequency components of discrete cosine coefficients of the pixel block for the bottom field, obtained on 4×4 discrete cosine transform, are thinned out to give a pixel block made up of 2×2 discrete cosine coefficients. It is noted that discrete cosine coefficients in the perpendicular direction, among the totality of the coefficients of the pixel block for the bottom field, are shown as $z_2$, $z_4$, $z_6$ and $z_8$ in the drawing.

Then, at step S5, 2×2 inverse discrete cosine transform (IDCT 2×2) is performed on the pixel blocks, from which the discrete cosine coefficients of the high-frequency components have been thinned out. 2×2 decoded pixel data x' can be obtained on 2×2 inverse discrete cosine transform. The pixel data in the perpendicular direction, among the totality of pixel data of the pixel block of the top field are shown as $x'_1$ and $x'_3$, while the pixel data in the perpendicular direction, among the totality of pixel data of the pixel block of the bottom field, are shown as $x'_2$ and $x'_4$.

Then, at step S6, pixel data of the pixel block for the top field and pixel data of the pixel block for the bottom field are alternately synthesized along the perpendicular direction on the line basis to generate a DCT block. The processing of alternately synthesizing pixels of the two pixel blocks for the top and bottom fields along the perpendicular direction is referred to below as frame synthesis.

By performing the one-block processing, shown in the above steps S1 to S6, the decimating inverse discrete cosine transform unit for frame mode 15 is able to generate a 4×4 DCT block, constituted by pixels of the same phase as the phase of the pixels of the standard resolution picture generated by the decimating inverse discrete cosine transform unit 14, as shown in FIG. 12.

On the other hand, the decimating inverse discrete cosine transform unit for frame mode 15 performs the one-block processing from the above steps S1 to S6 using a sole matrix. Specifically, the decimating inverse discrete cosine transform unit for frame mode 15 performs matrix processing on a matrix [FS'], shown in the following equations 1:

$$[FS'] = \frac{1}{\sqrt{2}} \begin{bmatrix} A & B & D & -E & F & G & H & I \\ A & -C & -D & E & -F & -G & -H & -J \\ A & C & -D & -E & -F & G & -H & J \\ A & -B & D & E & F & -G & H & -I \end{bmatrix} \quad (1)$$

obtained on expansion computations of the above processing using the addition theorem, and on discrete cosine coefficients ($y_1$ to $y_8$) of a sole DCT block to obtain pixel data x' ($x'_1$ to $x'_4$) of the decimating inverse discrete cosine transformed DCT block.

In the above equation (1), A to J are given as follows:

$$A = \frac{1}{\sqrt{2}}$$

$$D = \frac{1}{4}$$

$$H = \frac{1}{4} + \frac{1}{2\sqrt{2}}$$

$$B = \frac{\cos\frac{\pi}{16} + \cos\frac{3\pi}{16} + 3\cos\frac{5\pi}{16} - \cos\frac{7\pi}{16}}{4}$$

$$E = \frac{\cos\frac{\pi}{16} - \cos\frac{3\pi}{16} - 3\cos\frac{5\pi}{16} - \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$F = \frac{\cos\frac{\pi}{8} - \cos\frac{3\pi}{8}}{4}$$

$$C = \frac{\cos\frac{\pi}{16} - 3\cos\frac{3\pi}{16} - \cos\frac{5\pi}{16} - \cos\frac{7\pi}{16}}{4}$$

$$G = \frac{\cos\frac{\pi}{16} - 3\cos\frac{3\pi}{16} + \cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

Figure 14:
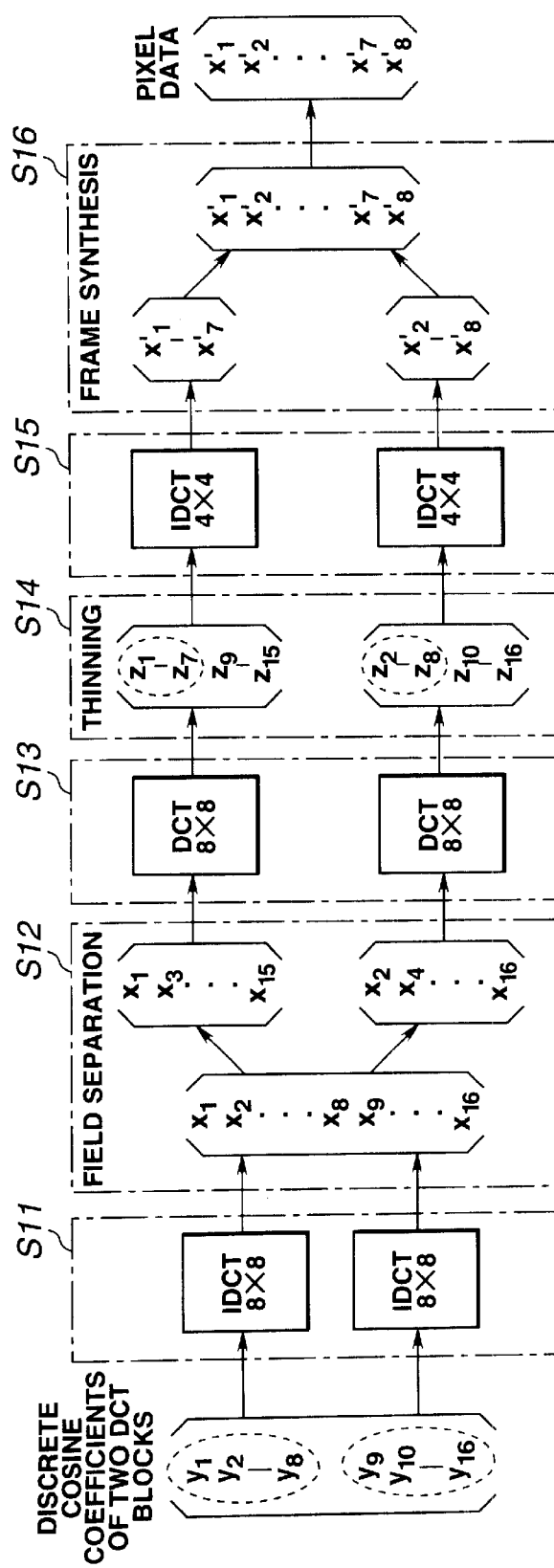
FIG. 14 illustrates the contents of processing of two blocks of a decimating inverse discrete cosine transform for a frame mode of a picture decoding device shown in FIG. 11.

The two-block processing is now explained. FIG. 14 illustrates the contents of the two-block processing.

To the decimating inverse discrete cosine transform unit for frame mode 15, a bitstream obtained on compression encoding a high resolution picture is inputted in terms of two DCT blocks as a unit, as shown in FIG. 14. If, for example, a macro-block is made up of four DCT blocks of the luminance components and two DCT blocks of the chroma components, in accordance with the so-called 420 format, two DCT blocks of luminance components, neighboring to each other along the perpendicular direction, are inputted. If a macro-block is constituted as shown in FIG. 15, DCT blocks 0 and 2 of the luminance components (Y) are inputted as a pair, whilst DCT blocks 1 and 3 of the luminance components (Y) are also inputted as a pair.

First, at step S11, 8×8 inverse discrete cosine transform (IDCT 8×8) is executed independently on discrete cosine coefficients y of the two DCT blocks. The coefficients along the perpendicular direction, among the totality of the discrete cosine coefficients of the temporally previous DCT block, are indicated as $y_1$ to $y_8$, whilst the coefficients along the perpendicular direction, among the totality of the discrete cosine coefficients of the temporally previous DCT blocks, are indicated as $y_9$ to $y_{16}$. The inverse discrete cosine transform yields 8×8 decoded pixel data x. The pixel data along the perpendicular direction, among the totality of the pixel data of the temporally previous DCT block, are indicated as $x_1$ to $x_8$, whilst the pixel data along the perpendicular direction, among the totality of the pixel data of the temporally posterior DCT blocks, are indicated as $x_9$ to $x_{16}$.

Then, at step S12, 8×8 pixel data x of two DCT blocks are alternately retrieved on the line basis in the perpendicular direction for field separation into two blocks, namely an 8×8 pixel block of the top field for interlaced scanning and an 8×8 pixel block of the bottom field for interlaced scanning. That is, the pixel data $x_1$ on the first line, pixel data $x_3$ on the third line, pixel data $x_5$ on the fifth line and pixel data $X_7$ on the seventh line in the vertical direction are retrieved from the temporally previous DCT block, while the pixel data $x_9$ on the first line, pixel data $x_{11}$ on the second line, pixel data $x_{13}$ on the third line and pixel data $x_{15}$ on the fourth line in the vertical direction are retrieved from the temporally posterior DCT block to generate an 8×8 pixel block for the top field. On the other hand, the pixel data $x_2$ on the second line, pixel data $x_4$ on the fourth line, pixel data $x_6$ on the sixth line and pixel data $x_8$ on the eighth line in the vertical direction are retrieved from the temporally previous DCT block, while the pixel data $x_{10}$ on the second line, pixel data $x_{12}$ on the fourth line, pixel data $x_{14}$ on the sixth line and pixel data $x_{16}$ on the eighth line in the vertical direction are retrieved from the temporally posterior DCT block to generate an 8×8 pixel block for the bottom field.

Then, at step S13, 8×8 discrete cosine transform (DCT 8×8) is executed on each of the field-separated two 8×8 pixel blocks.

Then, at step S14, high-frequency components of discrete cosine coefficients z of the pixel blocks for the top field, obtained on 8×8 discrete cosine transform, are thinned out at step S14 to constitute a pixel block constituted by 4×4 discrete cosine coefficients. The discrete cosine coefficients in the perpendicular direction, among the totality of the coefficients of the pixel blocks for the top field, are indicated as $z_1$, $z_3$, $z_5$, $z_7$, $z_9$, $z_{11}$, $z_{13}$, $z_{15}$. Also, high-frequency components of discrete cosine coefficients z of the pixel blocks for the bottom field, obtained on 8×8 discrete cosine transform, are thinned out to constitute a pixel block constituted by 4×4 discrete cosine coefficients. The discrete cosine coefficients in the perpendicular direction, among the totality of the coefficients of the pixel blocks for the bottom field, are indicated as $z_2$, $z_4$, $z_6$, $z_8$, $z_{10}$, $z_{12}$, $z_{14}$, $z_{16}$.

Then, at step S15, 4×4 inverse discrete cosine transform (IDCT 4×4) is performed on each of the 4×4 pixel blocks, from which the discrete cosine coefficients of the high-frequency components have been thinned out. 2×2 decoded pixel data x' can be obtained on 2×2 inverse discrete cosine transform, to yield 4×4 decoded pixel data x'. The pixel data in the perpendicular direction, among the totality of pixel data of the pixel block of the top field, are shown as $x'_1$, $x'_3$, $x'_5$ and $x'_7$, while the pixel data in the perpendicular direction, among the totality of pixel data of the pixel block of the bottom field, are shown as $x'_2$, $x'_4$, $x'_6$ and $x'_8$.

Next, at step S16, pixel data of the pixel block for the top field and pixel data of the pixel block for the bottom field are alternately frame-synthesized on the line basis in the perpendicular direction to generate a DCT block processed with decimating inverse discrete cosine transform and which is made up of 8×8 pixel data.

By executing the two-block processing as shown by the above steps S11 to S16, the decimating inverse discrete cosine transform unit for frame mode 15 is able to generate a DCT block constituted by pixels of the same phase as the phase of the pixels of the standard resolution picture generated by the decimating inverse discrete cosine transform unit 14 as shown in FIG. 12.

The decimating inverse discrete cosine transform unit for frame mode 15 also executes the two-block processing from the above step S11 up to the step S16 using a sole matrix. Specifically, the decimating inverse discrete cosine transform unit for frame mode 15 performs matrix processing on a matrix [FS"], indicated by the following equation (2):

$$[FS''] = \frac{1}{8\sqrt{2}}[A \quad B \quad C \quad D] \tag{2}$$

obtained on expansion computation of the above processing using an addition theorem, and discrete cosine coefficients y ($y_1$ to $y_{16}$) of two DCT blocks, to obtain pixel data x' ($x'_1$ to $x'_8$) of the reducing inverse discrete cosine transformed DCT block.

In the equation (2), A to D denote the following:

| A | | | |
|---|---|---|---|
| 4a + 3d − e + f + g | 1 + a + 2b + c + d + e + 3f − g | 1 + d + 2 − f + g | −2 a + 2b + c − d + e + f + g |
| 4a + 3d − e + f + g | 2 − a + b − d + 3e + f + g | −1 − d + e − f + g | −b + d − e − f − g |
| 4a + d + e + f + g | −a − b + d − 3e − f − g | −1 − d − 3e + f + g | −b + 2c − d + e + f + g |
| 4a + d + e + f + g | −1 − a − 3c − d − e − 3f + g | 1 + d − e − f − 3g | −2a + 2b + c + d − e − f − g |
| 4a − d − e − f − g | a + b + d − 3e − f − g | 1 + d + 3e − f − g | b − 2c − d + e + f + g |
| 4a − d − e − f − g | 1 + a + 3c − d − e − 3f + g | 1 − d + e + f + 3g | 2a − 2b − c + d − e − f − g |
| 4a − 3d + e − f − g | −1 − a − 2b + c + d + e + 3f − g | 1 − d − e + f − g | 2a − 2b − c − d + e + f + g |
| 4a − 3d + e − f − g | −2 + a − b − d + 3e + f + g | −1 + d − e + f − g | b + d − e − f − g |

| B | | | |
|---|---|---|---|
| 2b − 2c − d + e + f + 3g | −1 + 2a + b + d − e + f + g | 1 + 2a + d + e + f − g | 1 + a + b − 2c + d − e + 3f + g |
| −2b + 2c + d − e − f − 3g | −1 − 2a + 3c − d + e − f − g | −1 − 2a − d − e − f − g | −a − 2b − c − d − 3e + f − g |
| −2b + 2c − d + e − f + g | −1 − 2a + 2b − c + d − e + f + g | −1 − 2a + d − e + 3f + g | 2 − a + 2b + c + d + 3e − f + g |
| 2b − 2c + d − e + f − g | 1 − 2a + b − d + e − f − g | 1 + 2a + 3d − e + f + g | −1 − a − b − d + e − 3f − g |
| −2b + 2c + d − e + f − g | 1 + 2a − 2b + c + d − e + f + g | −1 − 2a − d + e + 3f − g | −2 + a − 2b − c + d + 3e − f + g |
| 2b − 2c − d + e − f + g | −1 + 2a − b − d + e − f − g | 1 + 2a − 3d + e − f − g | 1 + a + b − d + e − 3f − g |
| 2b − 2c + d − e − f − 3g | 1 + 2a − b + d − e + f + g | 1 + 2a − d − e + f + g | −1 − a − b + 2c − d + e + 3f + g |
| −2b + 2c − d + e + f + 3g | 1 + 2a − 3c − d + e − f − g | −1 − 2a + d + e + f − g | a + 2b + c − d − 3e + f − g |

-continued

C

| | | | |
|---|---|---|---|
| 4a − 3d + e − f − g | 2 − a + b + d − 3e − f − g | −1 + d − e + f − g | −b − d + e + f + g |
| 4a − 3d + e − f − g | 1 + a + 2b − c − d − e − 3f + g | 1 − d − e + f − g | −2a + 2b + c + d − e − f − g |
| 4a − d + e − f − g | −1 − a − 3c + d + e + 3f − g | 1 − d + e + f + 3g | −2a + 2b + c − d + e + f + g |
| 4a − d + e − f − g | −a − b − d + 3e + f + g | −1 + d − 3e − f − g | −b + 2c + d − e − f − g |
| 4a + d + e + f + g | 1 + a + 3e + d + e + 3f − g | 1 + d − e − f − 3g | 2a − 2b − c − d + e + f + g |
| 4a + d + e + f + g | a + b − d + 3e + f + g | −1 − d − 3e + f + g | b − 2c + d − e − f − g |
| 4a + 3d − e + f + g | −2 + a − b + d − 3e − f − g | −1 − d + e − f + g | b − d + e + f + g |
| 4a + 3d − e + f + g | −1 − a − 2b + c − d − e − 3f + g | 1 + d + e − f + g | 2a − 2b − c + d − e − f − g |

D

| | | | |
|---|---|---|---|
| −2b + 2c − d + e + f + 3g | −1 − 2a + 3c + d − e + f + g | −1 − 2a + d + e + f + g | −a − 2b − c + d + e3 − f + g |
| 2b − 2c + d − e − f − 3g | −1 + 2a + b − d + e − f − g | 1 + 2a − d − e − f + g | 1 + a + b − 2c − d + e − 3f − g |
| 2b − 2c − d + e − f + g | 1 − 2a + b + d − e + f + g | 1 + 2a − 3d + e − f − g | −1 − a − b + d − e + 3f + g |
| −2b + 2c + d − e + f − g | −1 − 2a + 2b − c − d + e − f − g | −1 − 2a − d + e + 3f − g | 2 − a + 2b + c − d − 3e + f − g |
| 2b − 2c + d − e + f − g | −1 + 2a − b + d − e + f + g | 1 + 2a + 3d − e + f + g | 1 + a + b + d − e + 3f + g |
| −2b + 2c − d + e − f + g | 1 + 2a − 2b + c − d + e − f − g | −1 − 2a + d − e − 3f + g | −2 + a − 2b − c − d − 3e + f − g |
| −2b + 2c + d − e − f − 3g | 1 + 2a − 3c + d − e + f + g | −1 − 2a − d − e − f − g | a + 2b + c + d + 3e − f + g |
| 2b − 2c − d + e + f + 3g | 1 − 2a − b − d + e − f − g | 1 + 2a + d + e + f − g | −1 − a − b + 2c − d + e − 3f − g |

In the above equation (2), a to g are defined as follows:

$$a = \cos\frac{\pi}{4}$$

$$b = \cos\frac{\pi}{8}$$

$$c = \cos\frac{3\pi}{8}$$

$$d = \cos\frac{\pi}{16}$$

$$e = \cos\frac{3\pi}{16}$$

$$f = \cos\frac{5\pi}{16}$$

$$g = \cos\frac{7\pi}{16}$$

If, in the decimating inverse discrete cosine transform unit for frame mode 15, a so-called 420-format macro-block shown in FIG. 15 is inputted, two-block processing as indicated by the above steps S11 to S16 is executed on the luminance components by way of performing a decimating inverse discrete cosine transform, while one-block processing as indicated by the above steps S11 to S16 is executed on the chroma components by way of performing a decimating inverse discrete cosine transform.

With the picture decoding device 10 of the first embodiment of the present invention, 4×4 decimating inverse discrete cosine transform is applied to each of the top field and the bottom field in the field DCT mode to decode the standard resolution picture. In the frame DCT mode, a standard resolution picture is decoded on frame separation and on decimating inverse discrete cosine transform. With the present picture decoding device 10, in which different processing is performed for the field DCT mode and the frame DCT mode, the interlacing character proper to the picture obtained on interlaced scanning is not degraded. In addition, the picture decoded in the field DCT mode can be rendered equal in phase to that decoded in the frame DCT mode, while the output picture is not deteriorated in picture quality.

Meanwhile, in the picture decoding device 10, decimating inverse discrete cosine transform by the decimating inverse discrete cosine transform unit 14, decimating inverse discrete cosine transform by one-block processing at steps S1 to S6 of the decimating inverse discrete cosine transform unit for frame mode 15 and the discrete cosine transform by the motion compensation unit for field mode 18 and the motion compensation unit for frame mode 19 can be executed using a high-speed algorithm.

For example, the processing speed can be enhanced by employing the Wang algorithm (Zhong D E Wang., "Fast Algorithms for the Discrete W Transform and for the Discrete Fourier Transform", IEEE Tr. ASSP-32, No. 4, predicted upper-order picture. 803 to 816, August 1984).

The matrix used by the decimating inverse discrete cosine transform unit 14 for processing may be resolved by the Wang algorithm as indicated by the following equation (3):

$$[C_4^{II}]^{-1} = [C_4^{III}] = \frac{1}{\sqrt{2}}\begin{bmatrix} 1 & 0 & 0 & 1 \\ 0 & 1 & 1 & 0 \\ 0 & 1 & -1 & 0 \\ 1 & 0 & 0 & -1 \end{bmatrix}\begin{bmatrix} C_2^{III} & \\ & \overline{C}_2^{IV} \end{bmatrix}\begin{bmatrix} 1 & 0 & 0 & 1 \\ 0 & 0 & 1 & 0 \\ 0 & 0 & 0 & 1 \\ 0 & 1 & 0 & 0 \end{bmatrix} \quad (3)$$

$$[C_2^{III}] = [C_2^{II}]^T = \begin{bmatrix} \frac{1}{\sqrt{2}} & \frac{1}{\sqrt{2}} \\ \frac{1}{\sqrt{2}} & -\frac{1}{\sqrt{2}} \end{bmatrix} = \frac{1}{\sqrt{2}}\begin{bmatrix} 1 & 1 \\ 1 & -1 \end{bmatrix} C_r = \cos(r\pi)$$

$$[\overline{C}_2^{IV}] = \begin{bmatrix} -C_{\frac{1}{8}} & C_{\frac{3}{8}} \\ C_{\frac{3}{8}} & C_{\frac{1}{8}} \end{bmatrix}$$

$$= \begin{bmatrix} 1 & 0 & -1 \\ 0 & 1 & 1 \end{bmatrix}\begin{bmatrix} -C_{\frac{1}{8}} + C_{\frac{3}{8}} & 0 & 0 \\ 0 & C_{\frac{1}{8}} + C_{\frac{3}{8}} & 0 \\ 0 & 0 & C_{\frac{3}{8}} \end{bmatrix}\begin{bmatrix} 1 & 0 \\ 0 & 1 \\ 1 & -1 \end{bmatrix}.$$

Figure 16:
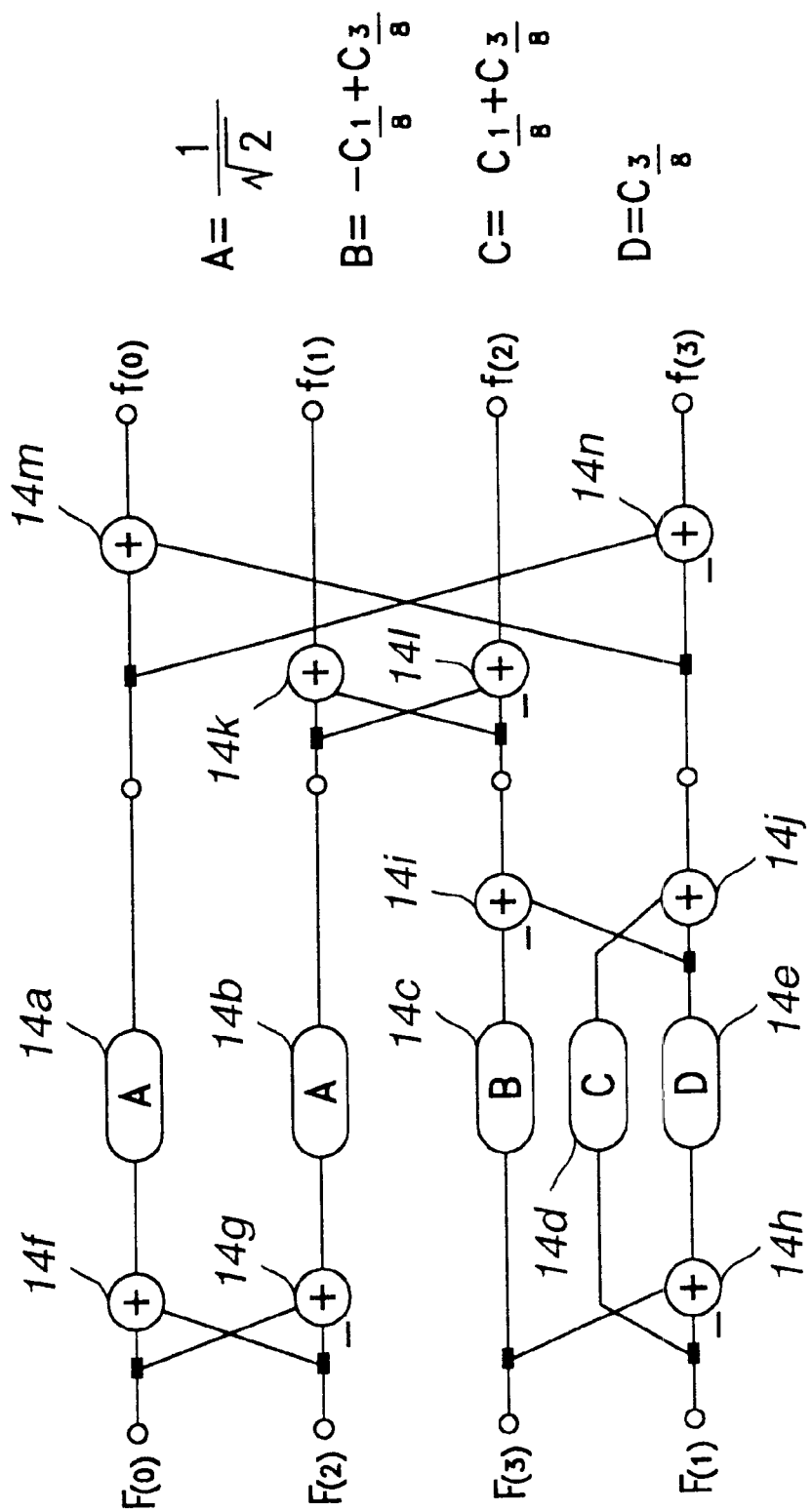
FIG. 16 shows processing flow in case of application of the Wang's algorithm to the processing of the decimating inverse discrete cosine transform device for field mode of the picture decoding device shown in FIG. 11.

FIG. 16 shows the processing flow in the case of applying the Wang algorithm to the processing by the decimating inverse discrete cosine transform unit 14. As may be seen form this processing flow, a high processing speed can be realized using first to fifth multipliers 14a to 14e and first to ninth adders 14f to 14n.

The matrix [FS'] used by the decimating inverse discrete cosine transform unit 15 for processing may be resolved by the Wang algorithm as indicated by the following equation (4):

$$[FS'] = \frac{1}{\sqrt{2}} \begin{bmatrix} 1 & 0 & 0 & 0 \\ 0 & 0 & 0 & 1 \\ 0 & 1 & 0 & 0 \\ 0 & 0 & 1 & 0 \end{bmatrix} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \begin{bmatrix} [M_1] & \\ & [M_2] \end{bmatrix} \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 1 & 0 & 0 \\ 0 & 1 & 0 & 0 & 0 & 0 & 0 & 0 \\ 0 & 0 & 0 & 0 & 0 & 0 & 0 & 1 \end{bmatrix} \quad (4)$$

$$[M_1] = \begin{bmatrix} 1 & 1 \\ -1 & -1 \end{bmatrix} \begin{bmatrix} 1 & 0 & 0 & 0 \\ 0 & 1 & 1 & 1 \end{bmatrix} \begin{bmatrix} A & 0 & 0 & 0 \\ 0 & D & 0 & 0 \\ 0 & 0 & F & 0 \\ 0 & 0 & 0 & H \end{bmatrix}$$

$$[M_2] = \begin{bmatrix} 1 & 1 & 0 \\ 1 & 0 & 1 \end{bmatrix} \begin{bmatrix} -1 & 1 & 0 & 0 & 0 & 0 \\ 0 & 0 & 1 & 0 & 1 & 0 \\ 0 & 0 & 0 & 1 & 0 & 1 \end{bmatrix} \begin{bmatrix} E & 0 & 0 & 0 \\ 0 & G & 0 & 0 \\ 0 & 0 & B & 0 \\ 0 & 0 & C & 0 \\ 0 & 0 & 0 & I \\ 0 & 0 & 0 & J \end{bmatrix}.$$

In the equation (4), A to J are defined as follows:

$$A = \frac{1}{\sqrt{2}}$$

$$F = \frac{\cos\frac{\pi}{8} - \cos\frac{3\pi}{8}}{4}$$

$$D = \frac{1}{4}$$

$$H = \frac{1}{4} + \frac{1}{2\sqrt{2}}$$

$$B = \frac{\cos\frac{\pi}{16} + \cos\frac{3\pi}{16} + 3\cos\frac{5\pi}{16} - \cos\frac{7\pi}{16}}{4}$$

$$C = \frac{\cos\frac{\pi}{16} - 3\cos\frac{3\pi}{16} - \cos\frac{5\pi}{16} - \cos\frac{7\pi}{16}}{4}$$

$$E = \frac{\cos\frac{\pi}{16} - \cos\frac{3\pi}{16} - \cos\frac{5\pi}{16} - \cos\frac{7\pi}{16}}{4}$$

$$G = \frac{\cos\frac{\pi}{16} - \cos\frac{3\pi}{16} + \cos\frac{5\pi}{16} + \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

Figure 17:
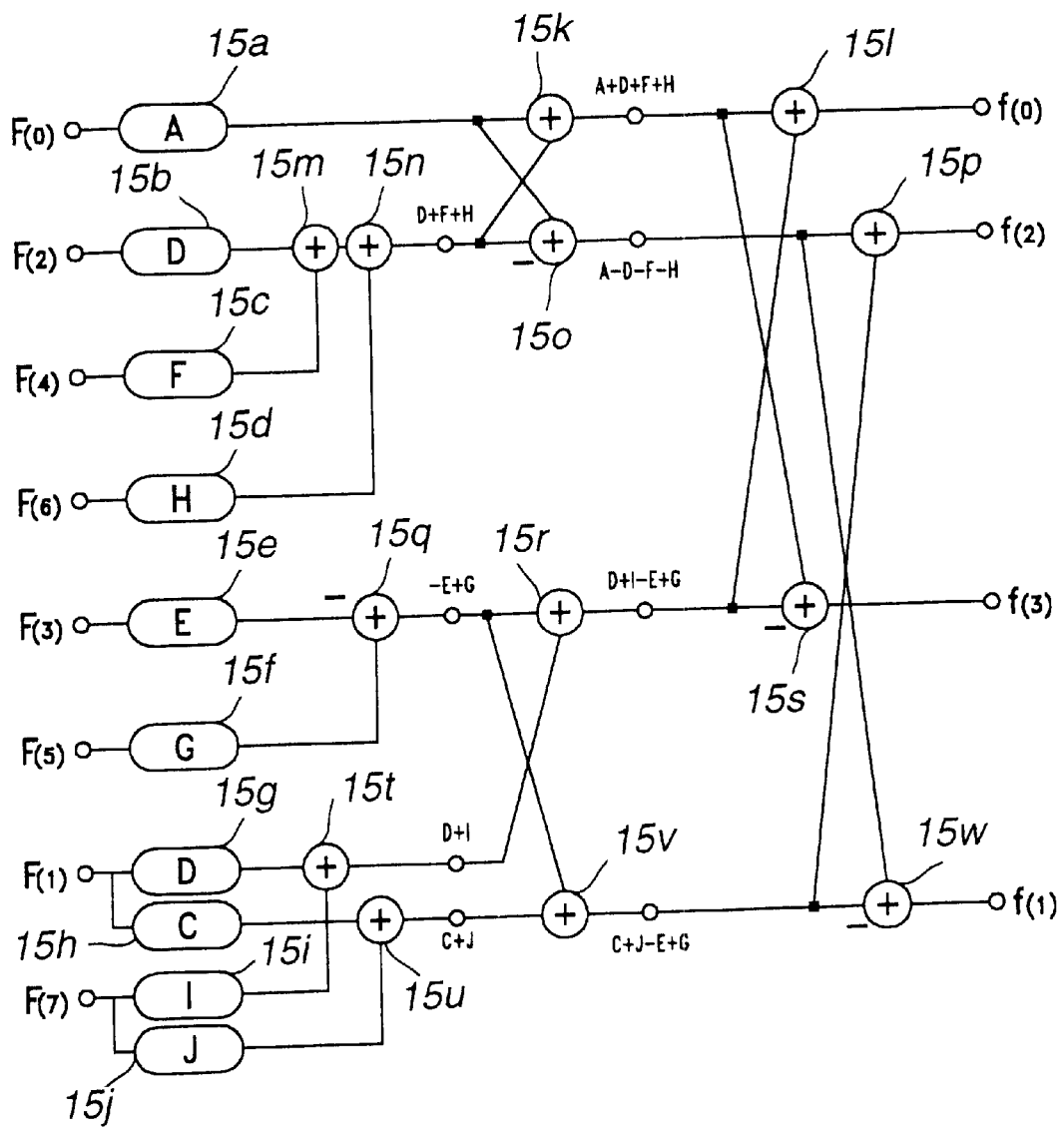
FIG. 17 shows processing flow in case of application of the Wang's algorithm to the processing of one block by a decimating inverse discrete cosine transform device for field in mode of the picture decoding device shown in FIG. 11.

The processing flow in the case of applying the Wang algorithm to the processing by the decimating inverse discrete cosine transform unit for frame mode 15 is shown in FIG. 17. As may be seen from this processing flow, the processing speed can be enhanced by employing first to tenth multipliers 15a to 15j and first to thirteenth adders 15k to 15w.

Second Embodiment

A picture decoding device of a second embodiment of the present invention is hereinafter explained. In the following explanation of the picture decoding device of the present second embodiment, parts or components which are the same as those of the picture decoding device 10 of the first embodiment are depicted by the same reference numerals and are not explained specifically. Also, in the third and following embodiments, parts or components similar to those of the previous embodiments are depicted by the same reference numerals and are not explained specifically.

Figure 18:
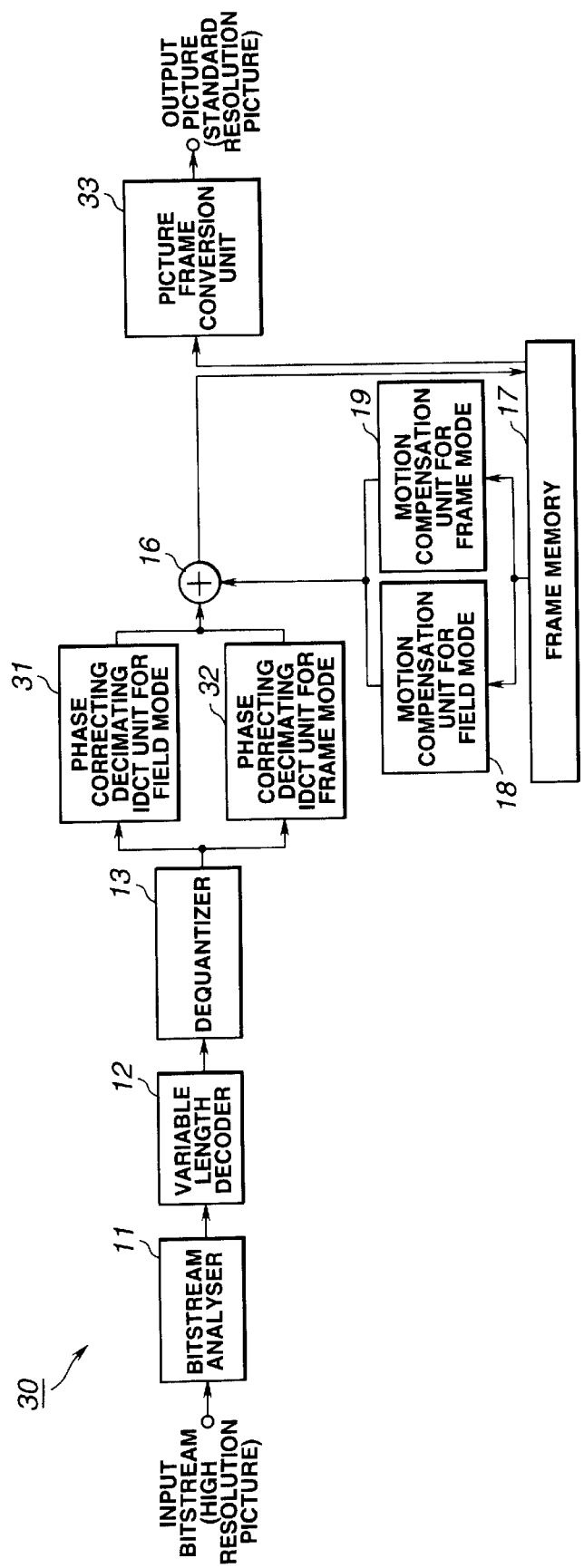
FIG. 18 is a block diagram showing a picture decoding device according to the present invention.

Referring to FIG. 18, a picture decoding device 30 according to the second embodiment of the present invention is fed with a bitstream corresponding to a high resolution picture with the number of effective lines in the vertical direction of, for example, 1152, obtained on picture compression with MPEG2, and decodes this input bitstream as it reduces the resolution to one half to output a standard resolution picture with the number of effective lines in the vertical direction of, for example, 576.

This picture decoding device 30 includes a bitstream analysis unit 11 for analyzing a bitstream of a compressed high resolution picture, and a variable length decoder 12 for decoding the bitstream encoded with variable length encoding of allocating a code length corresponding to the data occurrence frequency. The picture decoding device 30 also includes a dequantizer 13 for multiplying respective coefficients of the DCT block with quantization steps, and a phase-correcting decimating inverse discrete cosine transform unit for field mode 31 for executing decimating inverse discrete cosine transform on the DCT block discrete cosine transformed by the field DCT mode to generate a standard resolution picture. The picture decoding device 30 also includes a phase-correcting decimating inverse discrete cosine transform unit for frame mode 32 for executing decimating inverse discrete cosine transform on the DCT block discrete cosine transformed by the frame DCT mode to generate a standard resolution picture, and an addition unit 16 for summing the decimating inverse discrete cosine transformed standard resolution picture to the motion-compensated reference picture. The picture decoding device 30 also includes a frame memory 17 for transiently storing the reference picture, and a motion compensation unit for field mode 18 for motion-compensating the reference picture stored by the frame memory 17 in meeting with the field motion prediction mode. The picture decoding device 30 also includes a motion compensation unit for frame mode 19 for motion-compensating the reference picture stored in the frame memory 17 in meeting with the frame motion prediction mode and a picture frame conversion unit 33 for outputting picture data of the standard resolution for converting the picture frame of a picture stored in the frame memory 17 for display on e.g., a monitor.

The phase-correcting decimating inverse discrete cosine transform unit for field mode 31 is used in the event that a macro-block of an input bitstream is discrete cosine transformed with the field motion prediction mode. In the phase-correcting decimating inverse discrete cosine transform unit for field mode 31, inverse discrete cosine transform, in which has been corrected the dephasing of pixels in the vertical direction of the top and bottom fields, is applied to only 4×8 coefficients, among the totality of the coefficients of the DCT block with 8×8 coefficients in the macro-block discrete cosine transformed with the field DCT mode. That is, the phase-correcting decimating inverse discrete cosine transform unit for field mode 31 effects inverse discrete cosine transform in the horizontal direction based on the four low-range point discrete cosine coefficients, while effecting inverse discrete cosine transform corrected for de-phasing in the vertical direction based on the eight point discrete cosine coefficients. Specifically, the phase-correcting decimating inverse discrete cosine transform unit for field mode 31 corrects the phase in an amount corresponding to ¼ pixel for each pixel of the top field in the vertical direction, while correcting the phase in an amount corresponding to ¾ pixel for each pixel of the bottom field in the vertical direction. By performing the above-described decimating inverse discrete cosine transform, a standard resolution picture (lower layer) is generated in which the phases of the respective pixels of the top field in the vertical direction are ¼, ⁹⁄₄, . . . , with the phases of the respective pixels of the bottom field in the vertical direction being ⁵⁄₄, ¹³⁄₄, . . . .

The phase-correcting decimating inverse discrete cosine transform unit for frame mode 32 is used if a macro-block of an input bitstream has been discrete cosine transformed with the frame DCT mode. In the phase-correcting decimating inverse discrete cosine transform unit for frame mode 32, decimating inverse discrete cosine transform, in which the pixel dephasing along the vertical direction of the top field and the bottom field has been corrected, is applied to the DCT block with 8×8 coefficients in the macro-block discrete cosine transformed with the frame DCT mode. The phase-correcting decimating inverse discrete cosine transform unit for frame mode 32 generates a picture of the same phase as the phase of the pixels of the standard resolution picture generated by the phase-correcting decimating inverse discrete cosine transform unit for field mode 31. That is, the phase-correcting decimating inverse discrete cosine transform unit for frame mode 32 executes decimating inverse discrete cosine transform with one-block or two-block processing to generate a standard resolution picture (lower layer) in which the phases in the vertical direction of the respective pixels of the top field are ¼, ⁹⁄₄, . . . , with the phases in the vertical direction of the respective pixels of the bottom field being ⁵⁄₄, ¹³⁄₄, . . . , as shown in FIG. 10.

The motion compensation unit for field mode 18 is used if the motion prediction mode of the macro-block is the field motion prediction mode. The motion compensation unit for field mode 18 applies pixel interpolation employing orthogonal transform to the reference picture of the standard resolution picture stored in the frame memory 17 to generate a virtual upper-order picture having the same resolution as that of the high resolution picture. The motion compensation unit for field mode 18 motion-compensates the virtual upper-order picture in meeting with the field motion prediction mode and reduces the resolution of the motion-compensated virtual upper-order picture by employing orthogonal transform to generate a reference picture of the standard resolution. The reference picture, motion-compensated by the motion compensation unit for field mode 18, is sent to the addition unit 16, where it is synthesized to an inter-picture.

The motion compensation unit for frame mode 19 is used if the motion prediction mode of the macro-block is the frame motion prediction mode. The motion compensation unit for frame mode 19 applies pixel interpolation employing orthogonal transform to the reference picture of the standard resolution picture stored in the frame memory 17 to generate a virtual upper-order picture having the same resolution as that of the high resolution picture. The motion compensation unit for frame mode 19 motion-compensates the virtual upper-order picture in meeting with the field motion prediction mode and reduces the resolution of the motion-compensated virtual upper-order picture by employing orthogonal transform to generate a reference picture of the standard resolution. The reference picture, motion-compensated by the motion compensation unit for frame mode 19, is sent to the addition unit 16, where it is synthesized to an inter-picture.

The picture frame conversion unit 33 is fed with a reference picture of the standard resolution stored in the frame memory 17 and converts the picture frame of this reference picture by post-filtering for conformity to the a standard for a standard resolution television. That is, the picture frame conversion unit 33 converts the picture frame of the high resolution television standard to the picture frame of the standard resolution television reduced in size to ¼. Meanwhile, with the present picture frame conversion unit 33, since the picture stored in the frame memory 17 is not subjected to dephasing between the top and bottom fields, it is unnecessary to effect the correction for pixel dephasing in contradistinction from the picture frame converting dephasing correction unit 20 of the above-described first embodiment.

With the picture decoding device 30 of the second embodiment, constructed as described above, the bitstream of a high resolution picture, compressed in accordance with MPEG2, can be decoded and simultaneously reduced in resolution to ½ in order to output a standard resolution picture.

The processing contents of the phase-correcting decimating inverse discrete cosine transform unit for field mode31 will be explained in further detail.

Figure 20:
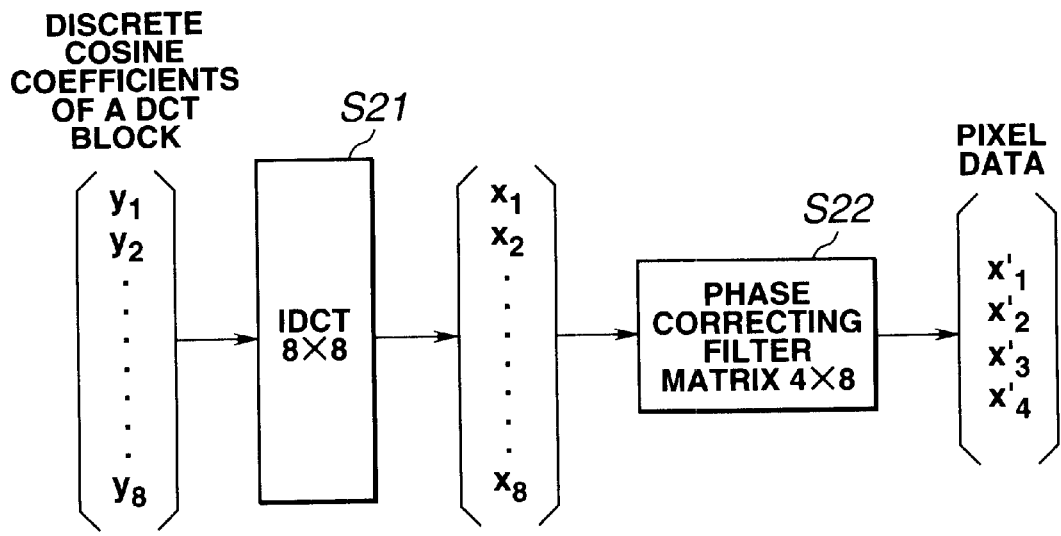
FIG. 20 illustrates the contents of processing of a phase correcting decimating inverse discrete cosine transform device for a field mode of a picture decoding device shown in FIG. 11.

The phase-correcting decimating inverse discrete cosine transform unit for field mode31 is fed with a bitstream, compression-coded from a high resolution picture, in terms of a DCT block as a unit, as shown in FIG. 20.

First, at step S21, 8×8 inverse discrete cosine transform (IDCT8×8) is applied to the discrete cosine coefficients y of the sole DCT block. It is noted that the coefficients in the vertical direction, among the totality of the discrete cosine coefficients in the DCT block, are denoted as $y_1$ to $y_8$ in the drawing. By the inverse discrete cosine transform, 8×8 decoded pixel data x are obtained. It is noted that pixel data along the vertical direction, among the totality of pixel data of the DCT block, are indicated as $x_1$ to $x_8$ in the drawing.

Then, at step S22, these 8×8 pixel data are processed with transform closed in the DCT block, by a 4×8 phase-correcting filter matrix, in order to produce phase-corrected pixel data x'. It is noted that the pixel data along the vertical direction, among the totality of pixel data, are denoted as $x'_1$, $x'_2$, $x'_3$, $x'_4$ in the drawing.

By performing the processing of steps S21 and S22, the phase-correcting decimating inverse discrete cosine transform unit for field mode 31 can generate a picture not subjected to dephasing between the top and bottom fields.

Figure 21:
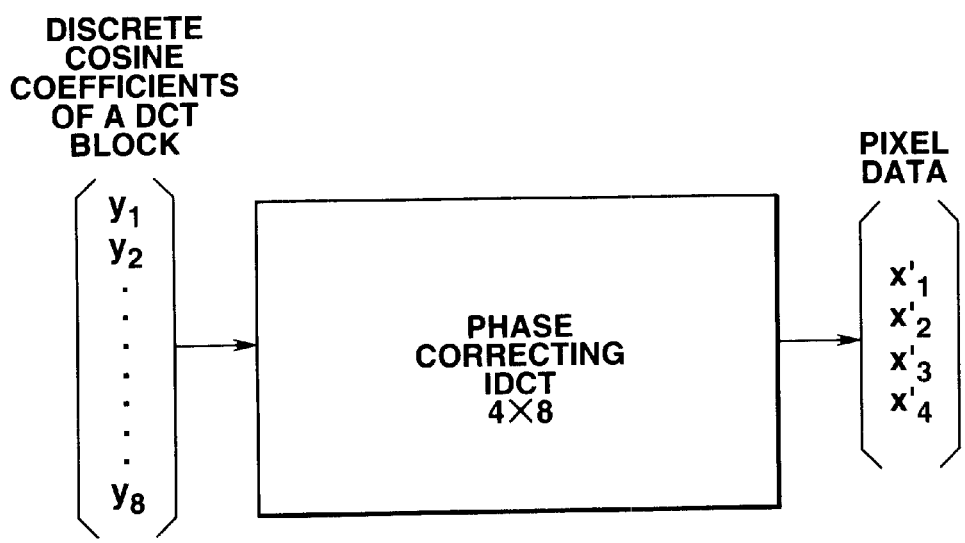
FIG. 21 illustrates the processing contents of a phase correcting decimating inverse discrete cosine transform device for a field mode in case of processing by a sole matrix.

It is also possible with the phase-correcting decimating inverse discrete cosine transform unit for field mode 31 to perform the above processing using a sole matrix (4×8 phase-correcting IDCT matrix), as shown in FIG. 21.

Figure 22:
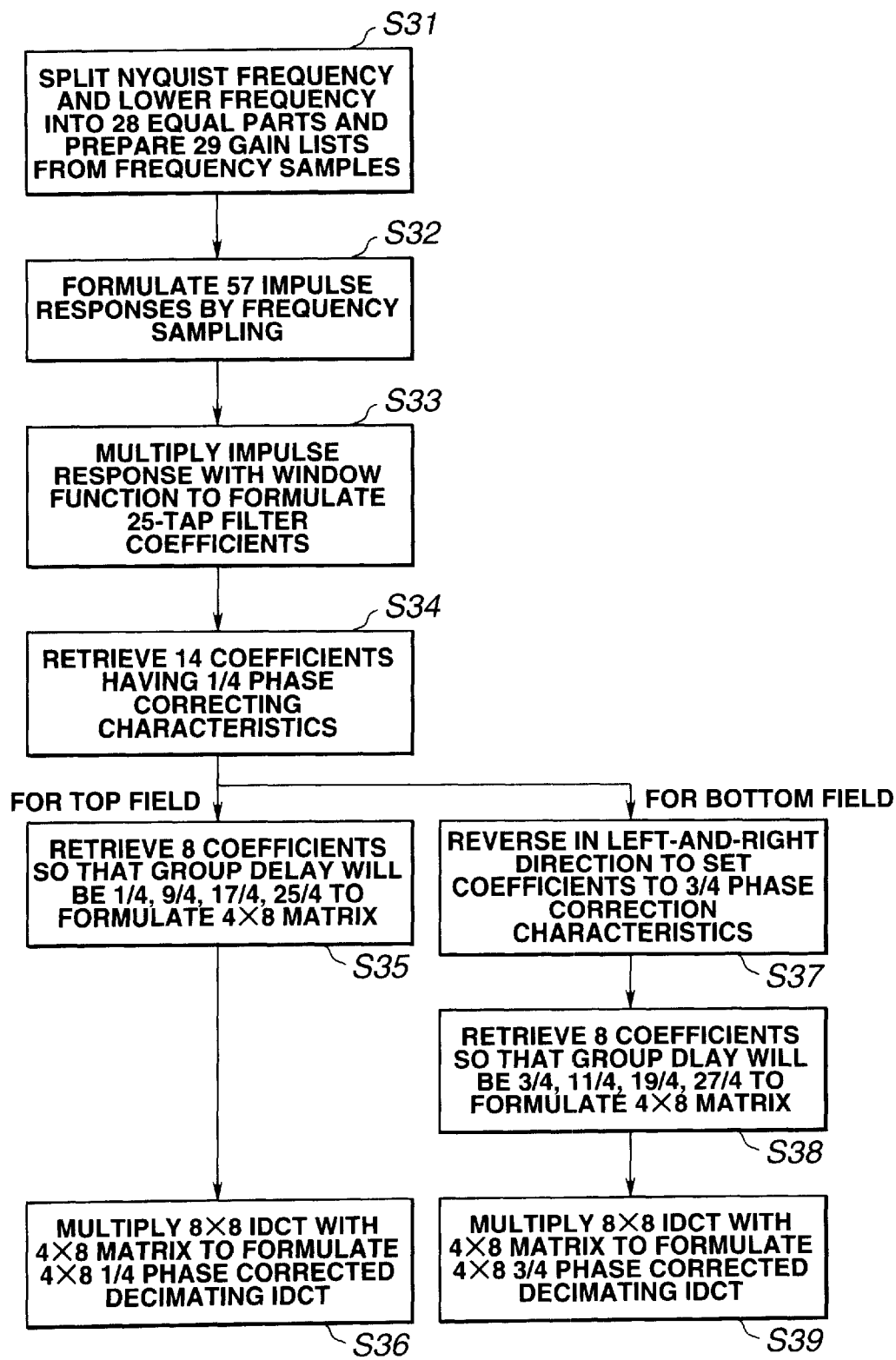
FIG. 22 is a flowchart for illustrating the designing contents of a 4×8 phase correcting IDCT matrix in which processing is preformed by the phase correcting decimating inverse discrete cosine transform device for the field mode.

FIG. 22 shows the designing procedure of the 4×8 phase correcting IDCT matrix, in which commutations are executed by the above-described phase-correcting decimating inverse discrete cosine transform unit for field mode 31. This 4×8 phase correcting IDCT matrix is hereinafter explained. This 4×8 phase correcting IDCT matrix is formulated by polyphase resolution of a prototype filter.

The picture decoding device 30 downdecodes the high resolution picture having the frequency response as shown in FIG. 23A to a standard resolution picture of a one-half resolution, having the frequency characteristics as shown in FIG. 23B. Thus, the frequency characteristics required of the prototype filter result from the 4-tupled oversampling, as shown in FIG. 23C, in order to obtain a pixel value of the ¼ phase of the standard resolution picture.

Figure 24:
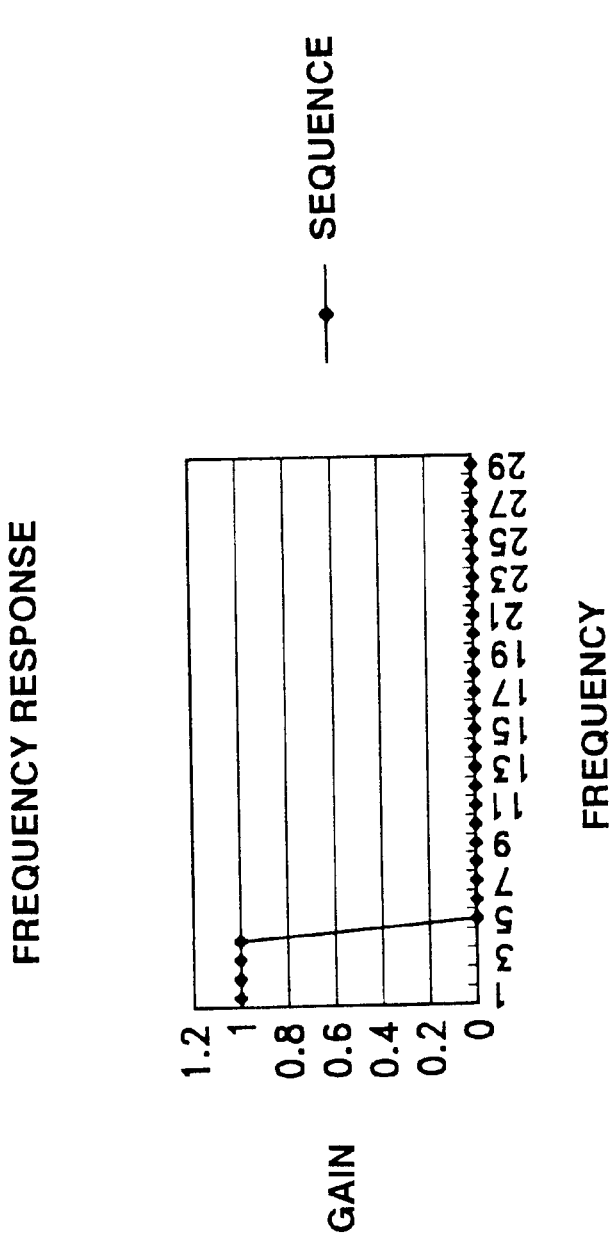
FIG. 24 illustrates a gain list formulated from frequency samples obtained on splitting the Nyquist frequency and the lower frequency into {(N−1)/2} at equal intervals.

First, at step S31, the Nyquist frequency and the lower frequency are divided into {(N−1)/2} equal intervals, and a gain list is formulated from the frequency samples. For example, the Nyquist frequency and the lower frequency are divided into equal (57−1)/2=28 intervals to formulate 29 gain lists, as shown for example in FIG. 24.

Figure 25:
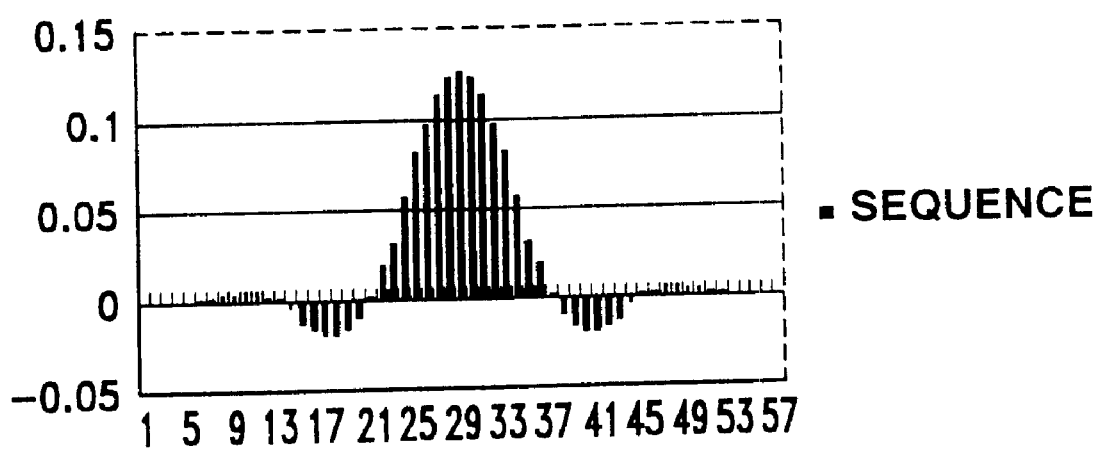
FIG. 25 illustrates the impulse response formulated by inverse discrete Fourier transforming the gain list.

Then, at step S32, 57 impulse responses are formulated by the frequency sampling method. That is, 29 gain lists ate inverse discrete cosine transformed to formulate 57 FIR impulse responses. These 57 impulse responses are shown in FIG. 25.

Next, at step S33, these impulse responses are multiplied with a window function to formulate 57-tap filter coefficients c1 to c57.

The filter prepared at this step S33 serves as the prototype filter.

Then, at step S34, the prototype filter, having the 57 filter coefficients c1 to c57, is polyphase-resolved to retrieve only 14 filter coefficients c'1 to c'14 having the ¼ phase correction characteristics to formulate a polyphase filter.

Figure 26:
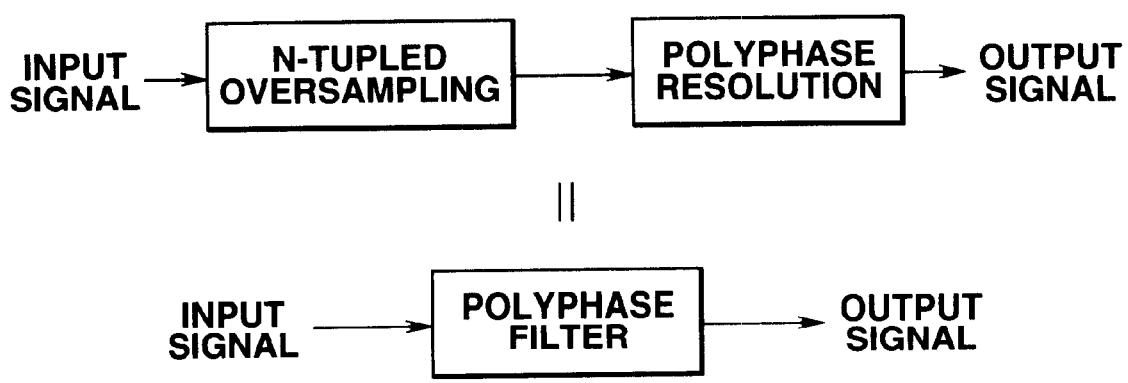
FIG. 26 illustrates a polyphase filter.
Figure 27:
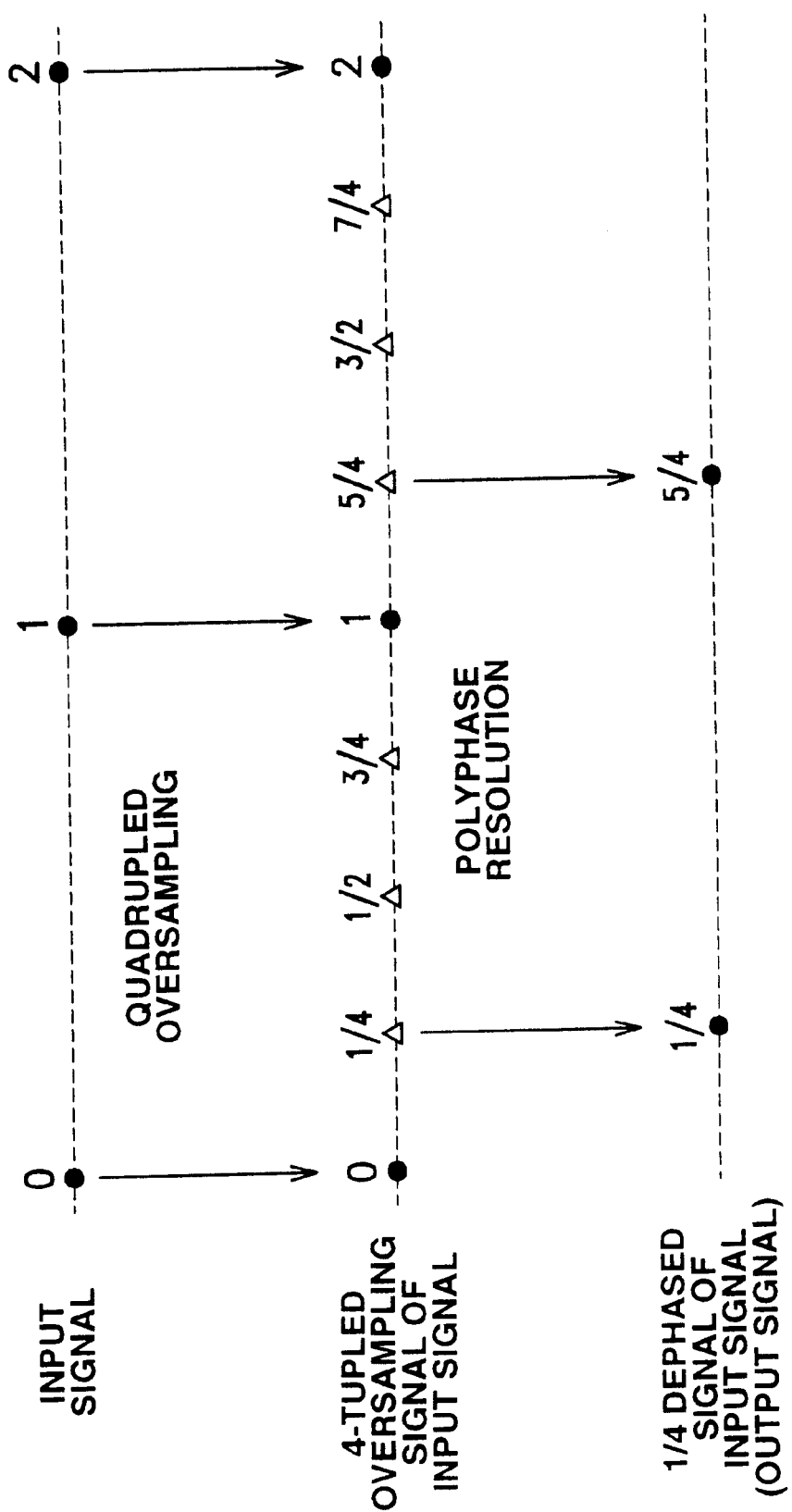
FIG. 27 illustrates the polyphase filter outputting a signal dephased by ¼ with respect to the input signal.

This polyphase filter is such a filter for oversampling an input signal to N times, and extracting pixels at an interval of N pixels from the oversampled signals, by way of polyphase resolution, for outputting signals dephased 1/N with respect to the input signal, as shown in FIG. 26. If desired to obtain a signal ¼ dephased with respect to the input signal, it suffices if the input signal is oversamples by a factor of four to retrieve a signal dephased by ¼ from the oversampled signal, as shown in FIG. 27.

Specifically, the 14 filter coefficients, formulated from the prototype filters c1 to c57 having 57 coefficients, are those having the following equation (5):

| −0.000413627 | 0.0039878 | 0.00229913 | −0.015080 | −0.00939227 | 0.0561242 | 0.119497 |
|---|---|---|---|---|---|---|
| 0.095091 | 0.0017216 | −0.0190084 | −0.00554409 | 0.00518009 | 0.0014488 | −0.00122162 |

After formulating the polyphase filter, the design processing is split between the 4×8 phase correction IDCT matrix for the top field and the 4×8 phase correction IDCT matrix for the bottom field.

Figure 28:
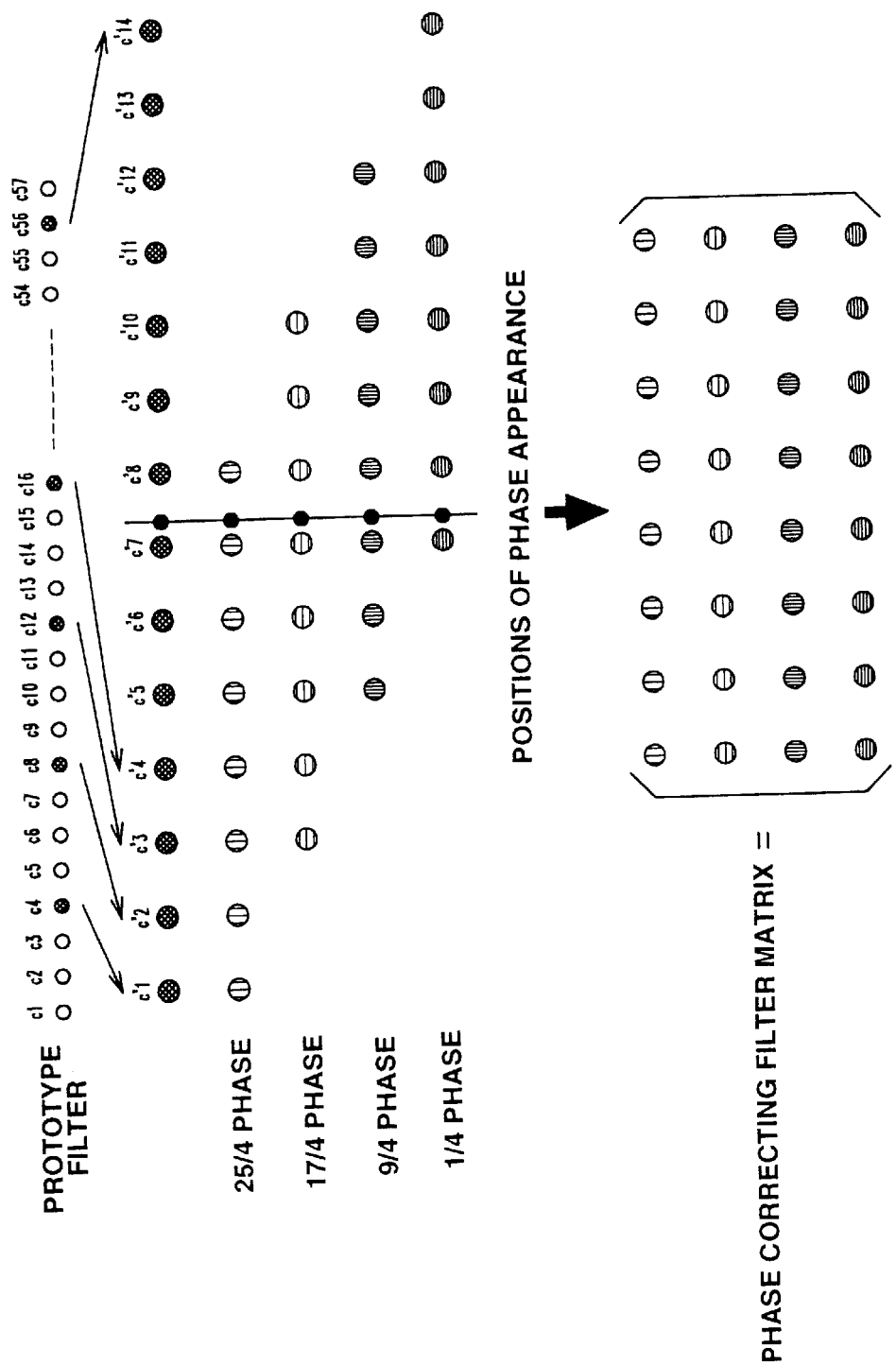
FIG. 28 illustrates the 4×8 phase correcting IDCT matrix for field mode in which processing is preformed by the phase correcting decimating inverse discrete cosine transform device for the field mode.

First, in formulating the 4×8 phase correction IDCT matrix for the top field, eight coefficients with the group delay of ¼, 9/4, 17/4 and 25/4 phase are retrieved at step S35 from the polyphase-resolved 14 filter coefficients c'1 to c'14, so that the filter characteristics will be ¼ phase correction characteristics, to formulate a 4×8 phase correction filter matrix. The 4×8 phase correction filter matrix, thus prepared, is shown in FIG. 28.

From the 14 filter coefficients c'1 to c'14 of the equation (5), the coefficients shown by the following equation (7) are retrieved:

| | | | | | | | |
|---|---|---|---|---|---|---|---|
| 25/4 phase | −0.000413627 | 0.0039878 | 0.00229913 | −0.015080 | −0.00939227 | 0.0561242 | 0.119497 |
| 17/4 phase | | | 0.00229913 | −0.015080 | −0.00939227 | 0.0561242 | 0.119497 |
| 9/4 phase | | | | | −0.00939227 | 0.0561242 | 0.119497 |
| 1/4 phase | | | | | | | 0.119497 |
| | 0.095091 | | | | | | |
| | 0.095091 | 0.017216 | −0.0190084 | | | | |
| | 0.095091 | 0.017216 | −0.0190084 | −0.00554409 | −0.00518009 | | |
| | 0.095091 | 0.017216 | −0.0190084 | −0.00554409 | −0.00518009 | 0.0014488 | −0.00122162 |

... (6)

If a 4×8 phase correcting IDCT matrix is found from the coefficients of the equation (6), a matrix shown in the following equation (7) is found:

$$\begin{array}{cccccccc}
0.119497 & 0.095091 & 0.017216 & -0.0190084 & -0.00554409 & 0.00518009 & 0.0014488 & -0.00122162 \\
-0.00939227 & 0.0561242 & 0.119497 & 0.095091 & 0.017216 & -0.0190084 & -0.00554409 & 0.00518009 \\
0.00229913 & -0.015080 & -0.00939227 & 0.0561247 & 0.119497 & 0.095091 & 0.017216 & -0.0190084 \\
-0.000413627 & 0.0039878 & 0.00229913 & -0.015080 & -0.00939227 & 0.0561242 & 0.119497 & 0.095091
\end{array} \quad \ldots (7)$$

If the 4×8 phase correcting IDCT matrix of the equation (7) is normalized, a matrix shown in the following equation (8) is obtained:

$$\begin{array}{cccccccc}
0.561919 & 0.447153 & 0.809559 & -0.0893847 & -0.0260704 & 0.0243587 & 0.0068128 & -0.00574453 \\
-0.0382407 & 0.216559 & 0.461087 & 0.368915 & 0.066429 & -0.0733453 & -0.0213923 & 0.0199877 \\
0.00931777 & -0.0611172 & -0.0380645 & 0.227457 & 0.484291 & 0.38538 & 0.069772 & -0.0770364 \\
-0.00164064 & 0.0158176 & 0.00911943 & -0.0598162 & -0.0372542 & 0.222615 & 0.473982 & 0.377176
\end{array} \quad \ldots (8).$$

At step S36, the 8×8 IDCT matrix is multiplied with this 4×8 phase correcting filter matrix to formulate a 4×8 phase correcting IDCT matrix for the top field.

The 4×8 phase correcting IDCT matrix, obtained on multiplying the 8×8 IDCT matrix with the 4×8 phase correcting filter matrix of the equation (8) is shown in the following equation (9):

$$\begin{array}{cccccccc}
0.353553 & 0.470989 & 0.376964 & 0.182877 & -0.0419176 & -0.0790523 & -0.0325452 & -0.0123689 \\
0.353553 & 0.249119 & -0.244534 & -0.39214 & -0.0586254 & 0.0447449 & 0.00293145 & 0.0032419 \\
0.353553 & -0.154747 & -0.424867 & 0.327667 & 0.101844 & -0.0599048 & 0.00729624 & -0.0053086 \\
0.353553 & -0.437751 & 0.267694 & -0.00183147 & -0.156649 & 0.0892455 & -0.0287812 & 0.0126261
\end{array} \quad \ldots (9).$$

For formulating a 4×8 phase correcting IDCT matrix for the bottom field, polyphase-resolved 14 filter coefficients c'1 to c'14 are inverted at step S37 in the left-and-right direction so that the filter coefficients will be ¾ phase correcting characteristics.

Then, at step S38, eight coefficients which will give the group delay of ¾, 11/4, 19/4 and 27/4 phase are retrieved at step S38 from the left-to-right inverted 14 filter coefficients c'1 to c'14 to formulate a 4×8 phase-correcting filter matrix.

Next, at step S39, the 8×8 IDCT matrix is multiplied with the 4×8 phase-correcting filter matrix to formulate a 4×8 phase correcting IDCT matrix for the bottom field.

By executing the processing of steps S31 to S39, it is possible to formulate a 4×8 phase correcting IDCT matrix worked on by the phase-correcting decimating inverse discrete cosine transform unit for field mode 31.

Figure 29:
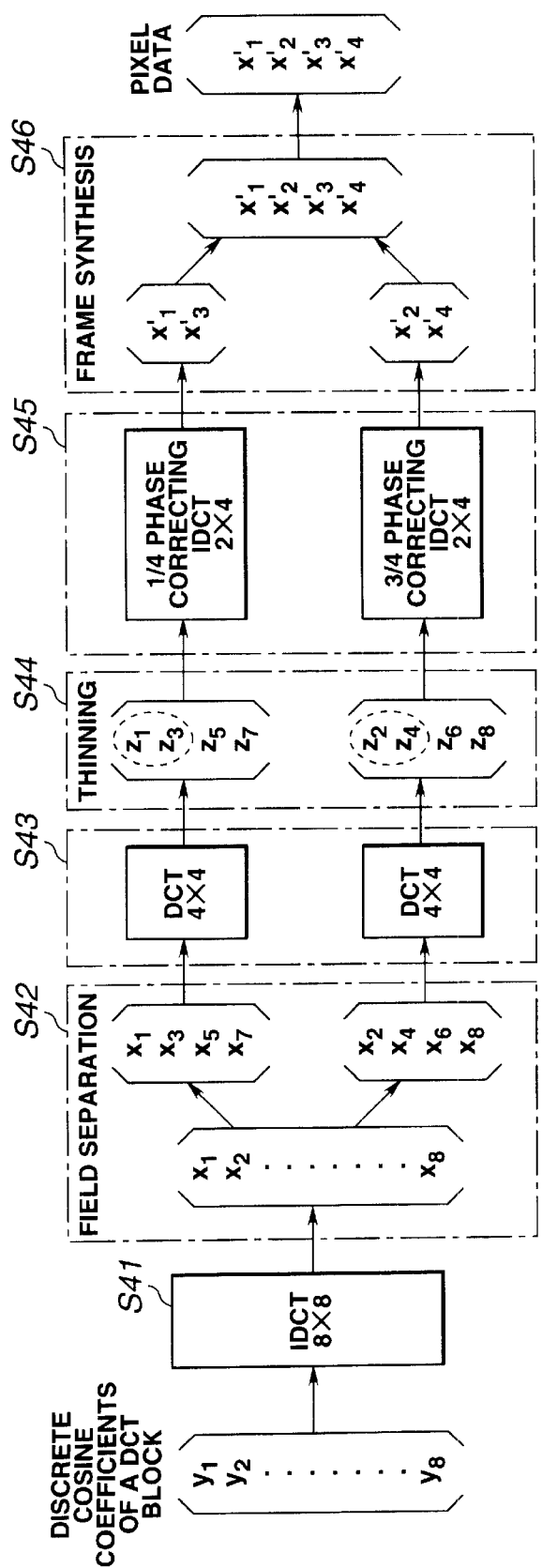
FIG. 29 illustrates the contents of one block processing of the phase correcting decimating inverse discrete cosine transform device for the frame mode of the picture decoding device shown in FIG. 9.

By the phase-correcting decimating inverse discrete cosine transform unit for field mode 31 performing matrix processing on the 4×8 phase-correcting filter matrix and on the input DCT coefficients discrete cosine transformed with the field DCT mode, a standard resolution picture devoid of dephasing between the top and bottom field can be produced on decoding. That is, with the phase-correcting decimating inverse discrete cosine transform unit for field mode 31, it is possible to generate a standard resolution picture (lower layer) which will give the phases in the vertical direction of the respective pixels of the top field of ¼, ⁹⁄₄, . . . and the phases in the vertical direction of the respective pixels of the bottom field of ⁵⁄₄, ¹³⁄₄, . . . , as shown in FIG. 29.

The processing contents of the phase-correcting decimating inverse discrete cosine transform unit for frame mode 32 are explained in further detail.

Meanwhile, it is possible for the phase-correcting decimating inverse discrete cosine transform unit for frame mode 32 to execute the one-block processing and/or the two-block processing which will be explained subsequently. If necessary, it is possible to switch between the one-block processing and the two-block processing or to execute one of these processings.

First, the one-block processing is explained. FIG. 29 illustrates the contents of the one-block processing.

The phase-correcting decimating inverse discrete cosine transform unit for frame mode 32 is fed with a bitstream, corresponding to a compression-encoded high resolution picture, in terms of a DCT block as a unit, as shown in FIG. 29.

First, at step S41, 8×8 inverse discrete cosine transform is applied to discrete cosine coefficients y of the sole DCT block. Then, at step S42, the 8×8 pixel data are field-separated into two pixel blocks. Then, at step S43, 4×4 discrete cosine transform is applied to each of the field-separated two pixel blocks. Next, at step S44, high-frequency components of the discrete cosine coefficients z of the respective pixel blocks are thinned out to give pixel blocks each made up of 2×2 discrete cosine coefficients. The processing as from the step S41 to the step S44 is the same as that from step S1 to step S4 for the one-block processing shown in FIG. 13.

Then, at step S45, inverse discrete cosine transform, correcting the pixel dephasing in the vertical direction, is preformed on the pixel block corresponding to the top field, using a 2×4 phase correcting IDCT matrix adapted for performing ¼ pixel phase correction. On the other hand, inverse discrete cosine transform, correcting the pixel dephasing in the vertical direction, is performed on the pixel block corresponding to the bottom field, using a 2×4 phase correcting IDCT matrix adapted for performing for ¾ pixel phase correction. By performing the above-described decimating inverse discrete cosine transform, it is possible to produce 2×2 pixel data x', it being noted that pixel data in the vertical direction, among the totality of the pixel data of the pixel block corresponding to the top field, are denoted as $x'_1$ and $x'_3$, with pixel data in the vertical direction, among the totality of the pixel data of the pixel block corresponding to the bottom field, being denoted as $x'_2$, $x'_4$ in the drawing. These pixel data x' give a standard resolution picture (lower layer) in which the phases in the vertical direction of the respective pixels of the top field are ¼, 9/4 and those in the vertical direction of the respective pixels of the bottom field are 5/4, 13/4. The method for designing the 2×4 phase correcting IDCT matrix will be explained subsequently in detail.

Then, at step S46, pixel data of the pixel block corresponding to the top field and pixel data of the pixel block corresponding to the bottom field are synthesized to a frame. The processing at step S46 is the same as the processing at step S6 in the one-block processing shown in FIG. 13.

Specifically, the 14 filter coefficients, formulated from the prototype filters c1 to c25, having 25 coefficients c'1 to c'6, are as shown in the following equation (10):

$$-0.00236073\ \ 0.042655\ \ 0.115645\ \ 0.0850711\ \ 0.0105276$$
$$0.00328948 \tag{10}$$

In this manner, the designing processing is split after formulating the polyphase filter, into a 2×4 phase-correcting IDCT matrix for the top field and a 2×4 phase-correcting IDCT matrix for the bottom field.

Figure 33:
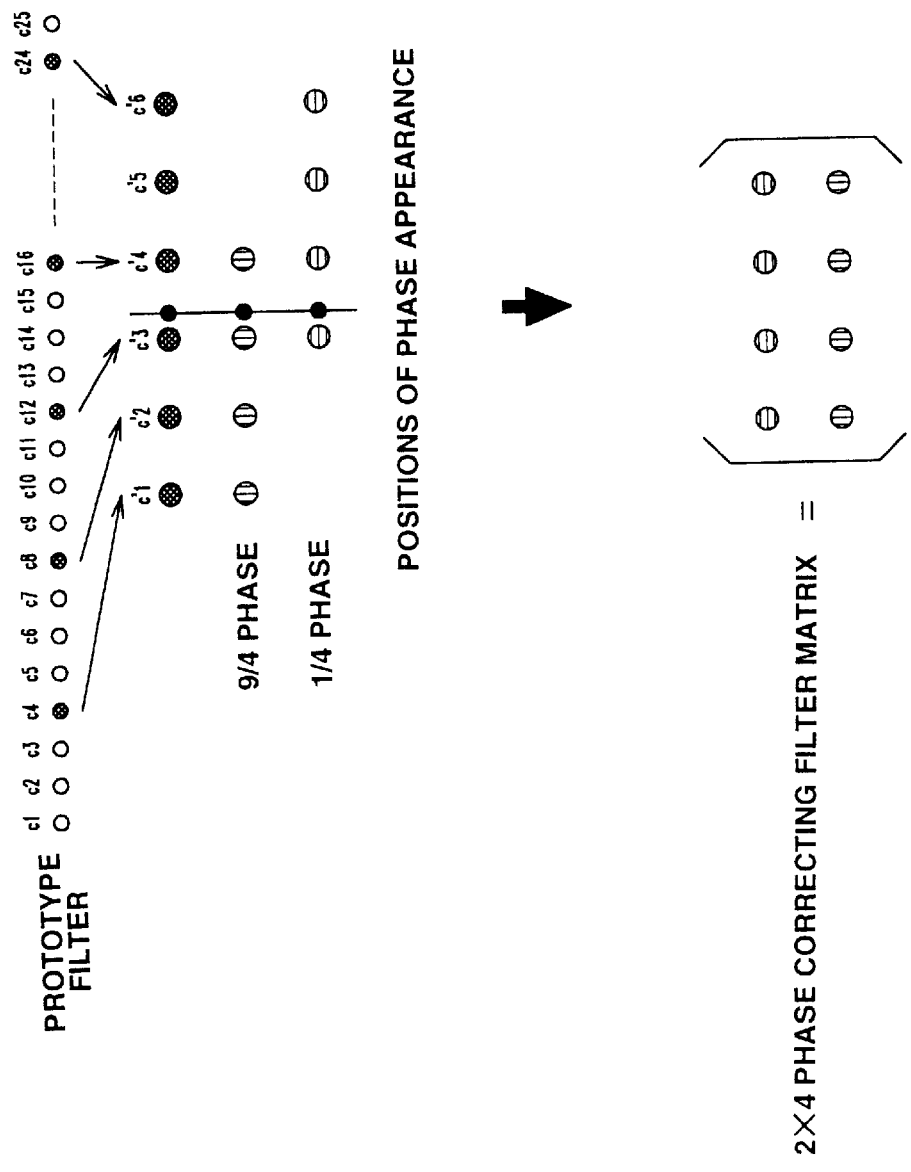
FIG. 33 illustrates a 2×4 phase correcting IDCT matrix in which processing is performed by the phase correcting decimating inverse discrete cosine transform device for the frame mode.

First, in formulating the 2×4 phase-correcting IDCT matrix for the top field, four coefficients are retrieved from each of the six polyphase-resolved filter coefficients c'1 to c'6, so that the group delay will be ¼ and 9/4, respectively, to formulate a 2×4 phase-correcting filter matrix. The 2×4 phase-correcting filter matrix, thus formulated, is shown in FIG. 33.

For example, from the six filter coefficients c'1 to c'6 of the equation (10), the coefficients shown by the following equation (11) are retrieved:

| | | | | |
|---|---|---|---|---|
| 9/4 phase | −0.00236073 | 0.042655 | 0.115645 | 0.0850711 |
| 1/4 phase | | 0.115645 | 0.0850711 | 0.0105276 | 0.00328948 |

By performing the processing of steps S41 to S46, the phase-correcting decimating inverse discrete cosine transform unit for frame mode 32 is able to generate a picture free of phase deviation between respective pixels. On the other hand, the phase-correcting decimating inverse discrete cosine transform unit for field mode 31 is able to generate a picture free of dephasing with respect to the picture obtained on decoding by the phase-correcting decimating inverse discrete cosine transform unit for field mode 31.

It is also possible for the phase-correcting decimating inverse discrete cosine transform unit for frame mode 32 to execute the processing from step S41 to step S46 using a sole matrix.

Figure 30:
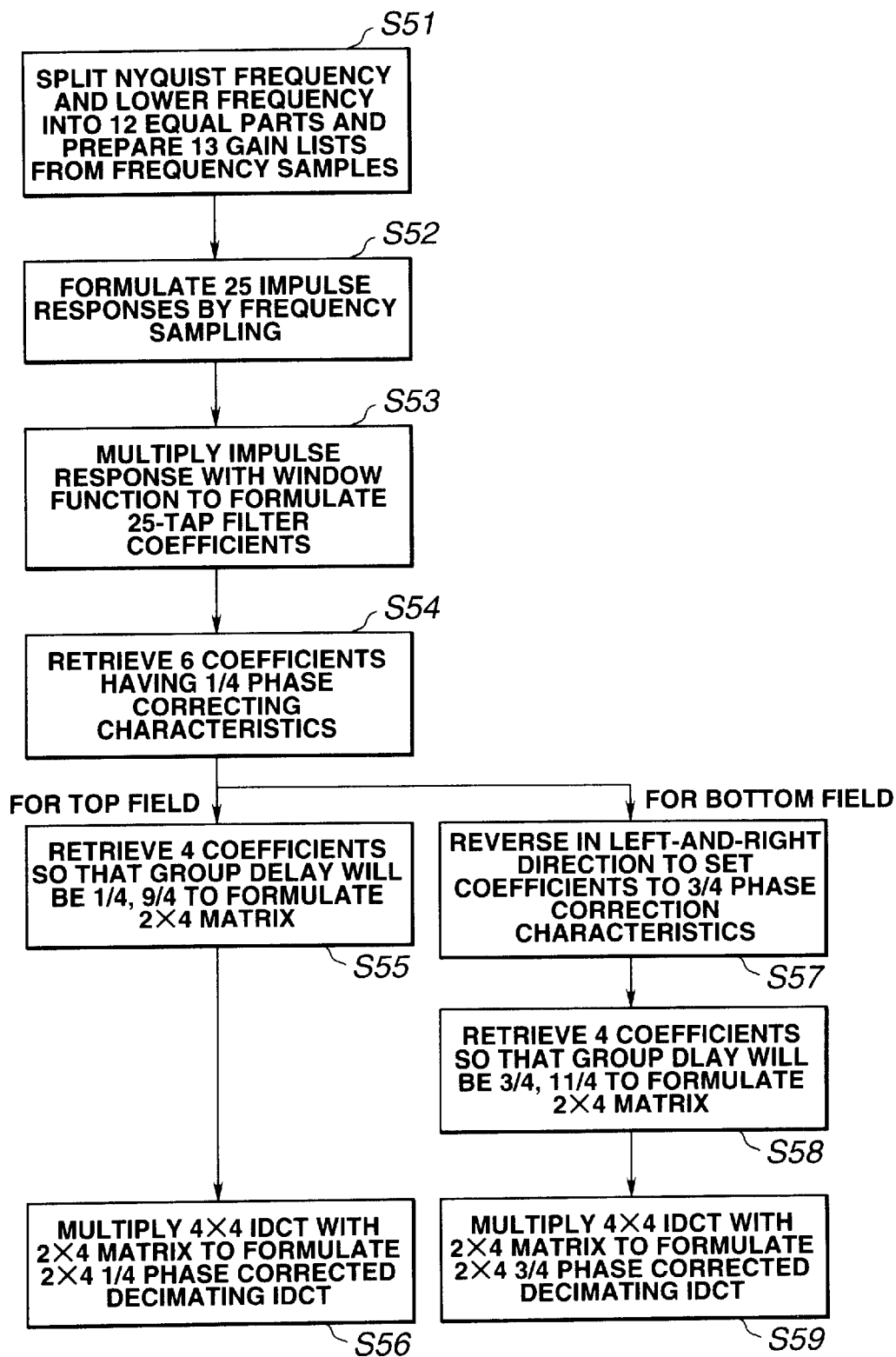
FIG. 30 is a flowchart for illustrating the designing contents of a 2×4 phase correcting IDCT matrix in which processing is performed by the phase correcting decimating inverse discrete cosine transform device for the frame mode.

The designing procedure for the 2×4 phase correcting IDCT matrix, processed at step S45 of the phase-correcting decimating inverse discrete cosine transform unit for frame mode 32, is shown in FIG. 30. This 2×8 phase correcting IDCT matrix is now explained.

Figure 31:
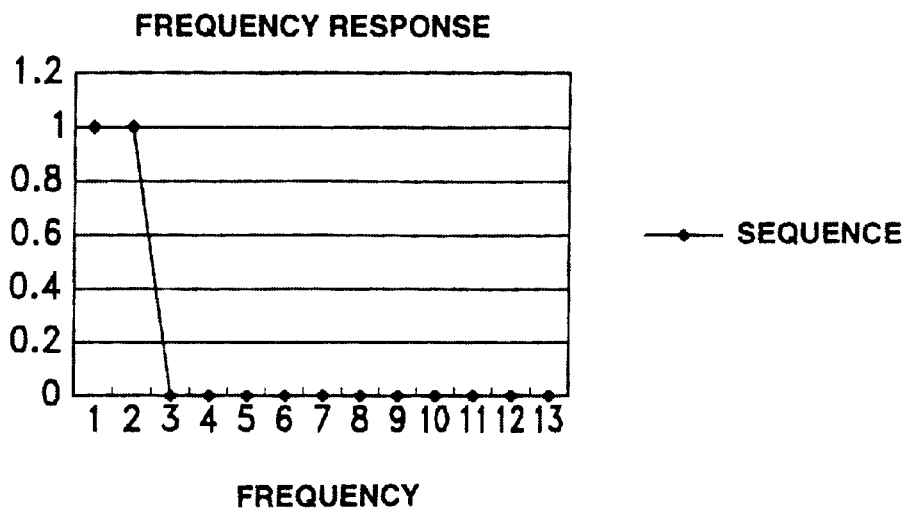
FIG. 31 illustrates a gain list formulated from frequency samples obtained on splitting the Nyquist frequency and the lower frequency into $\{(N-1)/2\}$ at equal intervals.

First, at step S51, the Nyquist frequency and the lower frequency are divided into {(N−1)/2} equal intervals, and gain lists are formulated from the frequency samples. For example, the Nyquist frequency and the lower frequency are divided into equal (25−1)/2=12 intervals to formulate 13 gain lists, as shown in FIG. 31.

Figure 32:
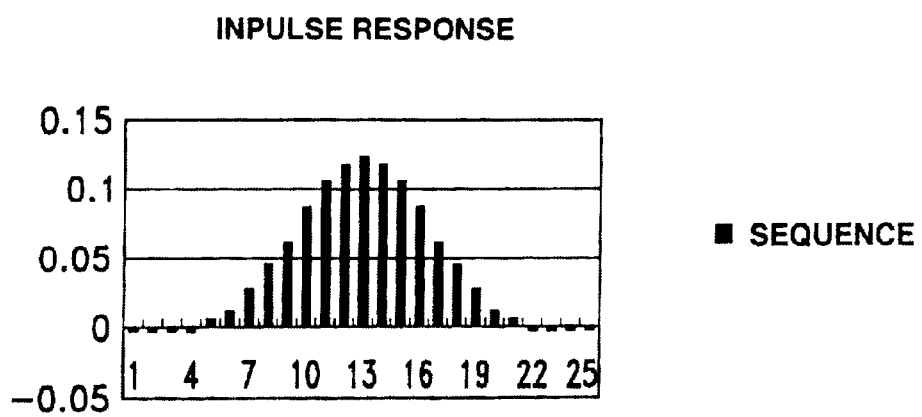
FIG. 32 illustrates the unpulse response formulated by inverse discrete cosine transforming the gain list.

Then, at step S52, 25 impulse responses are formulated by the frequency sampling method. That is, 13 gain lists are inverse discrete cosine transformed to formulate 25 FIR impulse responses. These 25 impulse responses are shown in FIG. 32.

Next, at step S53, these impulse responses are multiplied with a window function to formulate 25-tap filter coefficients c1 to c25.

The filter prepared at this step S53 serves as the prototype filter.

Then, at step S54, the prototype filter, having the 25 filter coefficients c1 to c25, is polyphase-resolved to retrieve only 6 filter coefficients c'1 to c'6 having the ¼ phase correction characteristics to formulate a polyphase filter.

If a 2×4 phase-correcting filter matrix is found from the coefficients of the equation (11), the matrix indicated by the following equation (12) is obtained:

| | | | |
|---|---|---|---|
| 0.115645 | 0.0850711 | 0.0105276 | 0.00328948 |
| −0.00236073 | 0.042655 | 0.115645 | 0.0850711 |

If the 2×4 phase-correcting filter matrix, shown by the equation (12), is normalized, the matrix shown by the following equation (13) is obtained:

| | | | |
|---|---|---|---|
| 0.556108 | 0.409085 | 0.0506245 | −0.0158183 |
| −0.00979515 | 0.176984 | 0.479834 | 0.352977 |

At step S56, the 4×4 IDCT matrix is multiplied with this 2×4 phase-correcting filter matrix to formulate a 2×4 phase-correcting IDCT matrix for the top field.

The 2×4 phase-correcting IDCT matrix, obtained on multiplying the 2×4 IDCT matrix with the 2×4 phase-correcting filter indicated by the above equation (13), is as shown in the following equation (14):

| | | | |
|---|---|---|---|
| 0.5 | 0.470628 | 0.0402901 | −0.0794137 |
| 0.5 | −0.318943 | −0.156819 | 0.0996811 |

On the other hand, in formulating a 2×4 phase-correcting IDCT matrix for the bottom field, the six polyphase-resolved filter coefficients c'1 to c'6 are inverted at step S57 in the left-and-right direction so that the filter coefficients will be of the ¾ phase correcting characteristics.

Then, at step S58, two coefficients are retrieved from each of the six polyphase-resolved filter coefficients c'1 to c'6, so that the group delay will be ¾ and 11/4, respectively, to formulate a 2×4 phase-correcting filter matrix.

At step S59, the 4×4 IDCT matrix is multiplied at step S59 with the 2×4 phase-correcting filter matrix to formulate the 2×4 phase-correcting filter matrix for the bottom field.

By performing the processing of the steps S51 to S59 as described above, it is possible to formulate the 2×4 phase-correcting filter matrix which the phase-correcting decimating inverse discrete cosine transform unit for frame mode 32 uses to perform the computations at step S45.

Figure 34:
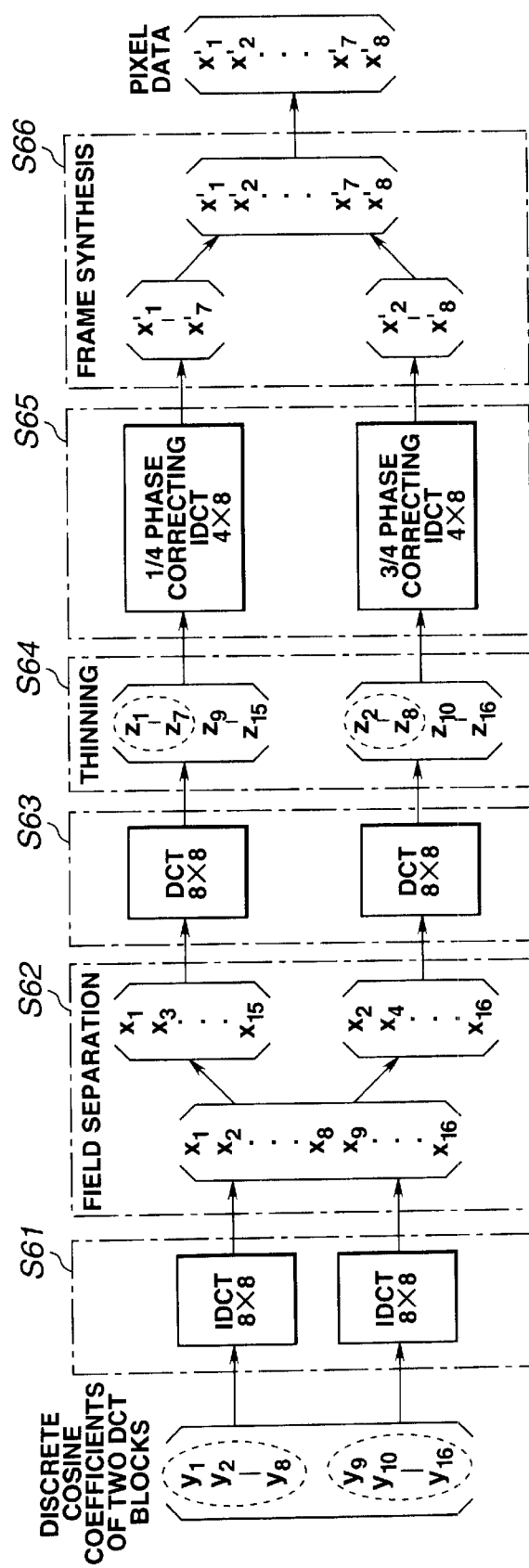
FIG. 34 illustrates the contents of two block processing of the phase correcting decimating inverse discrete cosine transform device for the frame mode of the picture decoding device shown in FIG. 11.

The two-block processing is now explained with reference to FIG. 34 illustrating the contents of the two-block processing.

The phase-correcting decimating inverse discrete cosine transform unit for frame mode 32 is fed with a bitstream, corresponding to the compression-coded high resolution picture, in terms of two DCT blocks as a unit, as shown in FIG. 34. If, for example, a macro-block is made up of four DCT blocks of luminance components and two DCT blocks of chroma components, two DCT blocks neighboring along the vertical direction are inputted. If, for example, a macro-block is constituted as shown in FIG. 15, DCT blocks 0 and 2 of the luminance component (Y) are inputted as pairs, while DCT blocks 1 and 3 are also inputted as a pair.

First, at step S61, 8×8 inverse discrete cosine transform is applied independently to discrete cosine coefficients y of the two DCT blocks. The inverse discrete cosine transform gives 8×8 decoded pixel data x. Then, at step S62, two 8×8 pixel data are separated into respective fields. At the next step S63, 8×8 discrete cosine transform is executed on each of the two 8×8 pixel blocks separated into the respective fields. At the next step S64, high-frequency components of the discrete cosine coefficients z of the pixel block of the top field obtained on 8×8 discrete cosine transform are thinned out to give a pixel block constituted by 4×4 discrete cosine coefficients. Also, high-frequency components of the discrete cosine coefficients z of the pixel block of the bottom field obtained on 8×8 discrete cosine transform are thinned out to give a pixel block constituted by 4×4 discrete cosine coefficients.

The above-described processing from the step S61 to the step S64 is the same as the processing from step S11 to step S14 in the two-block processing shown in FIG. 14.

Then, at step S65, inverse discrete cosine transform, corrected for dephasing of pixels in the vertical direction, is performed on the pixel blocks of the top field, using a 4×8 phase-correcting IDCT matrix adapted for correcting the phase by ¼ pixel. Similarly, inverse discrete cosine transform, corrected for dephasing of pixels in the vertical direction, is performed on the pixel blocks of the bottom field, using a 4×8 phase-correcting IDCT matrix adapted for correcting the phase by ¾ pixel. By executing the above-described decimating inverse discrete cosine transform, it is possible to produce 4×4 pixel data x', it being noted that the pixel data along the vertical direction, among the totality of the pixel data of the pixel blocks of the top field are denoted as $x'_1$, $x'_3$, $x'_5$, $x'_7$, with the pixel data along the vertical direction, among the totality of the pixel data of the pixel blocks of the bottom field, being denoted as $x'_2$, $x'_4$, $x'_6$, $x'_8$. These pixel data x' generate a standard resolution picture (lower layer) in which the phases of the respective pixels of the top field in the vertical direction are ¼, ⁹⁄₄, . . . , with the phases of the respective pixels of the bottom field in the vertical direction being ⁵⁄₄, ¹³⁄₄, . . . , This designing method of the 4×8 phase-correcting IDCT matrix is the same as the matrix used in the processing by the phase-correcting decimating inverse discrete cosine transform unit for field mode 31.

Then, at step S66, pixel data of the pixel blocks of the top field and those of the pixel blocks of the bottom field are alternately taken on the line basis along the vertical direction and synthesized into a frame to generate decimating inverse discrete cosine transformed DCT blocks made up of 8×8 pixel data.

By the above-described two-block processing of the steps S61 to S66, it is possible with the phase-correcting decimating inverse discrete cosine transform unit for frame mode 32 to generate a picture free of dephasing between respective pixels. It is also possible to generate a picture free of dephasing with respect to the picture obtained on decoding by the phase-correcting decimating inverse discrete cosine transform unit for field mode 31.

It is also possible for the phase-correcting decimating inverse discrete cosine transform unit for frame mode 32 to perform the processing from the step S61 to the step S66 using a sole matrix.

In the above-described picture decoding device 30, 4×4 decomating IDCT is applied to each of the top and bottom fields, while executing phase correction to decode a standard resolution picture, for the field DCT mode, while executing frame separation, decimating IDCT and phase correction to decode a standard resolution picture, for the frame DCT mode. In the present picture decoding device 30, since the processing is effected for each of the field DCT mode and for the frame DCT mode, interlacing properties of the picture obtained by interlaced scanning are not deteriorated, while the dephasing between the top field and the bottom field produced on decimating IDCT is eliminated to evade picture quality deterioeration of the output picture. That is, in this picture decoding device 30, there is no necessity for phase correction when outputting a decoded picture stored in the frame memory 17 to simplify the processing without degrading the picture quality.

Third Embodiment

A picture decoding device according to a third embodiment of the present invention will be hereinafter explained.

Figure 35:
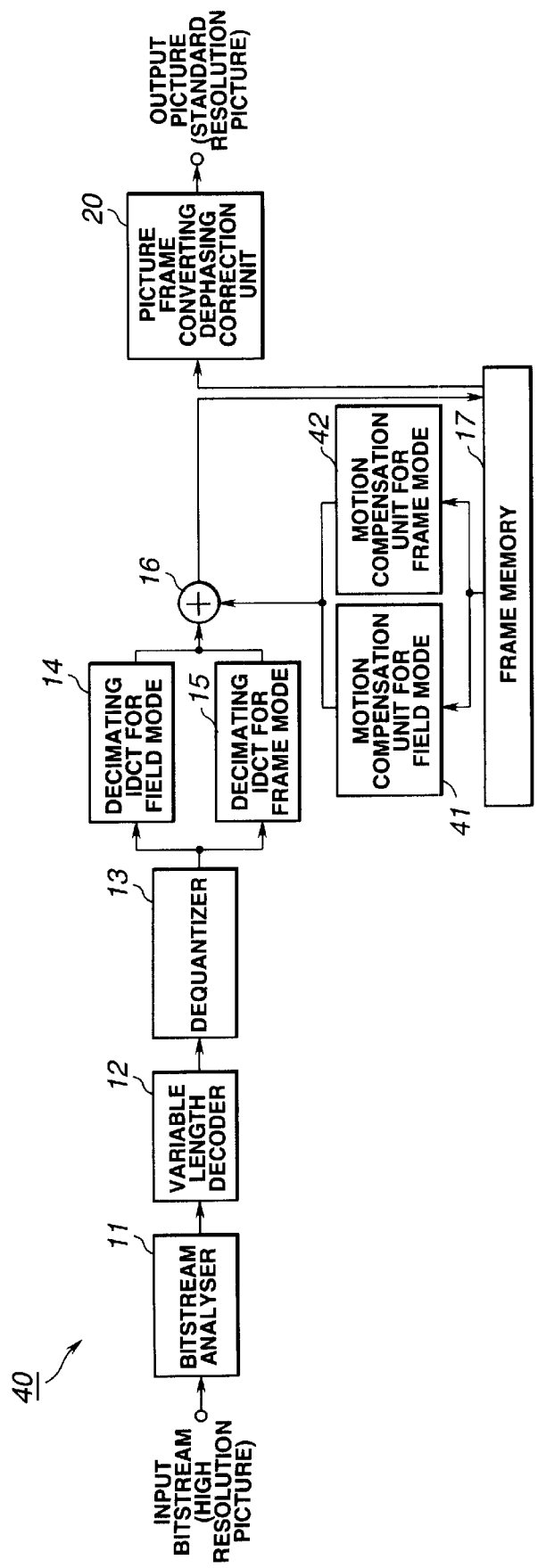
FIG. 35 is a block diagram of a picture decoding device according to a third embodiment of the present invention.

Referring to FIG. 35, a picture decoding device 40 of the present third embodiment is fed with a bitstream, obtained on compressing a high resolution picture, with the effective number of vertical lines of, for example, 1152, in accordance with the MPEG2, decodes this input bitstream and reduces the resolution to ½ to output a standard resolution picture with the number of effective lines in the vertical direction of, for example, 576.

This picture decoding device 40 includes a bitstream analysis unit 11, fed with a bitstream of a compressed high resolution picture and which is adapted for analyzing the input bitstream, and a variable length decoding unit 12 for decoding the bitstream, processed with variable length encoding of allocating a code length associated with the data occurrence frequency. The picture decoding device 10 also includes a dequantizer 13 for multiplying the coefficients of the DCT block with quantization steps and a decimating inverse discrete cosine transform unit 14 for decimating inverse discrete cosine transforming the DCT block discrete cosine transformed with the field DCT mode to generate a standard resolution picture. The picture decoding device 10 also includes a decimating inverse discrete cosine transform unit for frame mode 15 for decimating inverse discrete cosine transforming the DCT block discrete cosine transformed in the frame DCT mode and an adder 16 for summing the decimating inverse discrete cosine transformed standard resolution picture to the motion compensated reference picture. The picture decoding device 10 also includes a frame memory 17 for temporarily storing the reference picture and a motion compensation unit for field mode 41 for motion compensating the reference picture stored in the frame memory 17 in meeting with the field motion predictive mode. The picture decoding device 10 also includes a motion compensation unit for frame mode 42 for motion compensating the reference picture stored in the frame memory 17 in meeting with the frame motion predictive mode, and a picture frame converting dephasing correction unit 20 for post-filtering a picture stored in the frame memory 17 for picture frame conversion and for correcting the dephasing of pixels for display on a television monitor etc.

The decimating inverse discrete cosine transform unit 14 for field mode is used if the macro-block of an input bitstream is discrete cosine transformed in the field DCT mode. The decimating inverse discrete cosine transform unit 14 for field mode performs inverse discrete cosine transform only on the low-range 4×4 coefficients of the DCT block, showing 8×8 coefficients in the macro-block discrete cosine transformed in the field DCT mode, as shown in FIG. 5. That is, the decimating inverse discrete cosine transform unit 14 for field mode performs decimating inverse discrete cosine transform based on four point inverse discrete cosine coefficients in the horizontal direction and in the vertical direction. This decimating inverse discrete cosine transform unit 14 for field mode can decode the standard resolution picture, each DCT block of which is made up of 4×4 pixels, by executing the above-described decimating inverse discrete cosine transform. The phases of the pixels of the decoded picture data are ½, $\frac{5}{2}$, . . . , in the perpendicular direction of the respective pixels of the top field, with the phases in the perpendicular direction of the respective pixels of the bottom field being 1, 3, . . . , as shown in FIG. 12.

Figure 2:
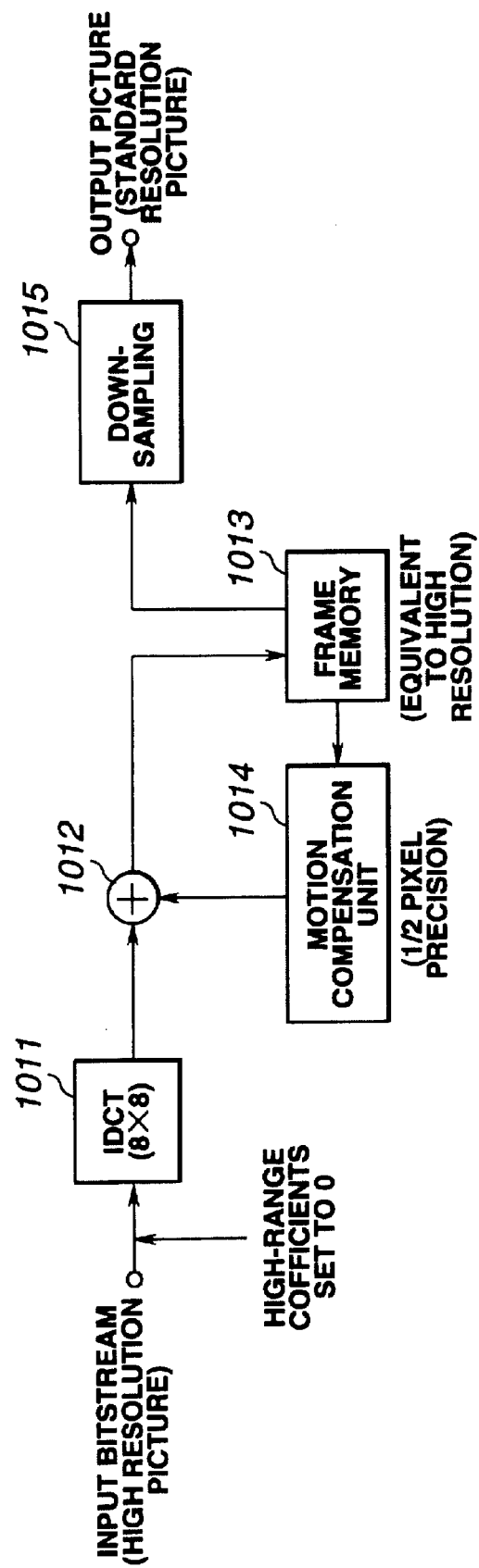
FIG. 2 is a block diagram showing a conventional second downdecoder.
Figure 3:
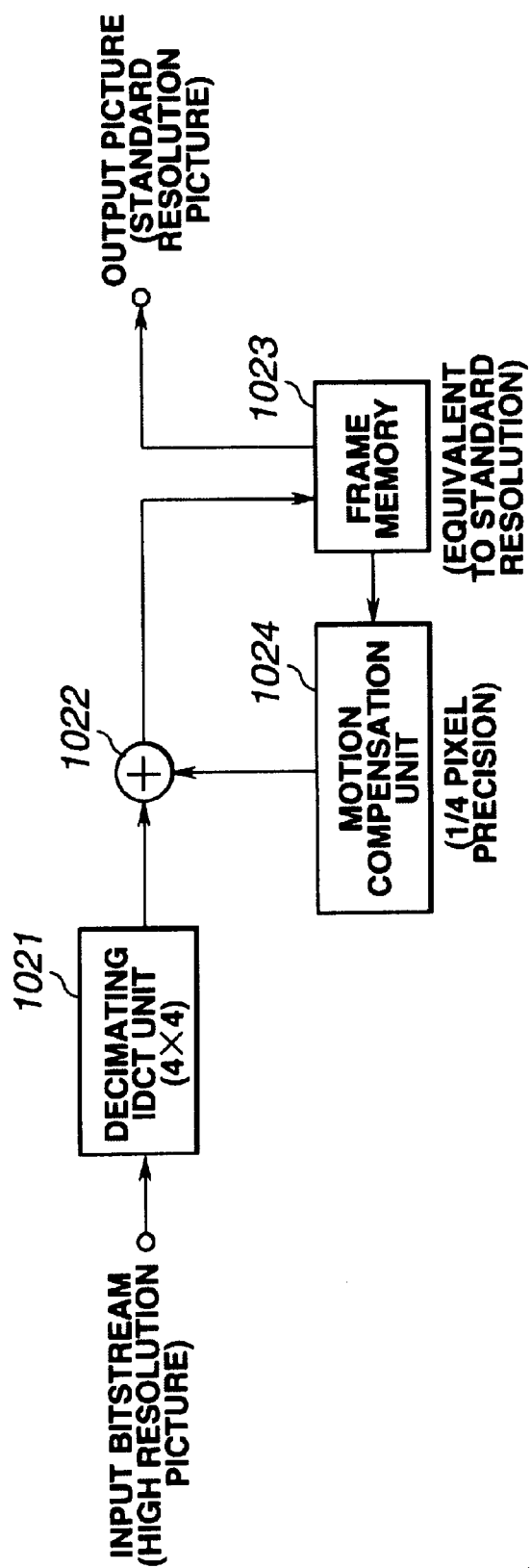
FIG. 3 is a block diagram showing a conventional third downdecoder.
Figure 4:
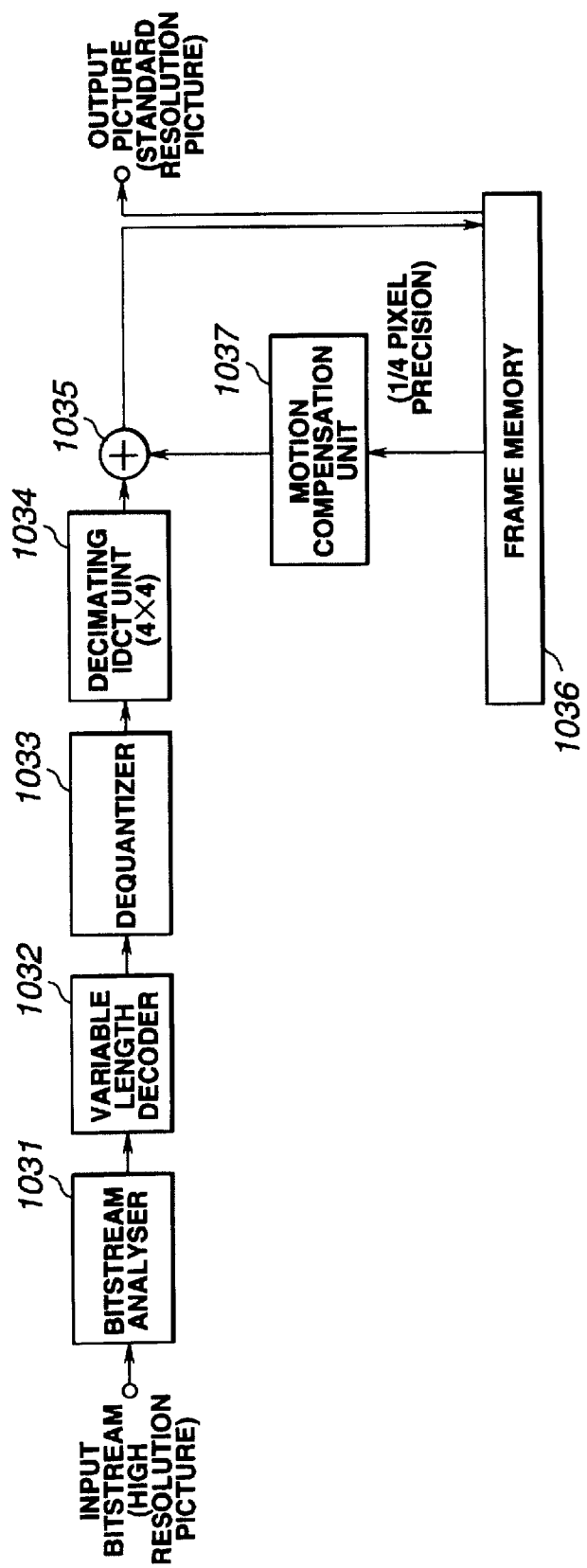
FIG. 4 is a bd of a conventional picture decoding device.

The decimating inverse discrete cosine transform unit for frame mode 15 is used when the macro-block of the input bitstream is discrete cosine transformed with the frame DCT mode. The decimating inverse discrete cosine transform unit for frame mode 15 performs decimating inverse discrete cosine transform on the DCT block showing 8×8 coefficients in the macro-block discrete cosine transformed in the frame DCT mode. The decimating inverse discrete cosine transform unit for frame mode 15 decodes the standard resolution picture, each DCT block of which is constituted by 4×4 pixels, while generating a picture of the same phase as the phase of the pixel of the standard resolution picture generated by the decimating inverse discrete cosine transform unit 14. That is, the phases in the perpendicular direction of the respective pixels of picture data decoded by the decimating inverse discrete cosine transform unit for frame mode 15 are such that the phases in the perpendicular direction of respective pixels of the top field are ½, $\frac{5}{2}$, . . . , with the phases in the perpendicular direction of the respective pixels of the bottom field being 1, 3, . . . , as shown in FIG. 2.

The motion compensation unit for field mode 41 is used if the motion prediction mode for the macro-block is the field motion prediction mode. The motion compensation unit for field mode 41 performs pixel interpolation, employing orthogonal transform, on the standard resolution reference picture stored in the frame memory 17, taking into account the dephasing between the top and bottom fields, to perform motion compensation in meeting with the field motion prediction mode. The reference picture, motion compensated by the motion compensation unit for field mode 41, is sent to the adder 16 for synthesis to the inter-picture.

The motion compensation unit for frame mode 42 is used when the macro-block motion prediction mode is the frame motion prediction mode. The motion compensation device for frame mode interpolates the reference picture of the standard resolution picture stored in the frame memory 17, to ¼ pixel precision, taking into account the dephasing between the top and bottom fields, by way of performing motion compensation in meeting with the frame motion prediction mode. The reference picture, motion compensated by this motion compensation unit for frame mode 42, is sent to the adder 16 for synthesis to an inter-picture.

With the above-described picture decoding device 40 according to the third embodiment of the present invention, the bitstream corresponding to the high resolution picture compressed in accordance with the MPEG2, can be decoded and reduced in resolution to ½, so as to be outputted as a standard resolution picture.

The motion compensation unit for field mode 41 and the motion compensation unit for frame mode 42 are explained in more detail.

First, the interpolation processing by the motion compensation unit for field mode 41 is explained. This motion compensation unit for field mode 41 interpolates pixels of the standard resolution picture stored in the frame memory 17, in meeting with the motion compensation of ½ pixel precision of the high resolution picture, to generate pixels of ¼ pixel precision.

As for pixels in the horizontal direction, pixels of ½ pixel precision are generated from the pixels of the integer-number precision stored in the frame memory 17. The motion compensation unit for field mode 41 generates pixels to ½ pixel precision, using a half-band filter. Then, using a linear interpolation filter, the motion compensation unit for field mode 41 then generates pixels to ¼ pixel precision, from the pixels of the ½ pixel precision, generated using a double interpolation filter. By using the double interpolation filter, such as the half-band filter, the motion compensation unit for field mode 41 is able to output pixels of the same phase as that of the pixels of the standard resolution picture stored in the frame memory 17, as a reference picture corresponding to the high resolution picture. Thus, the present motion compensation unit for field mode 41 is able to perform high-speed processing. It is also possible with the motion compensation unit for field mode 41 to calculate the above processing using a sole matrix, or to generate pixels of ¼ precision from the integer-number precision pixel, using a quadrupled interpolation filter.

Figures 36A, 36B, 36C:
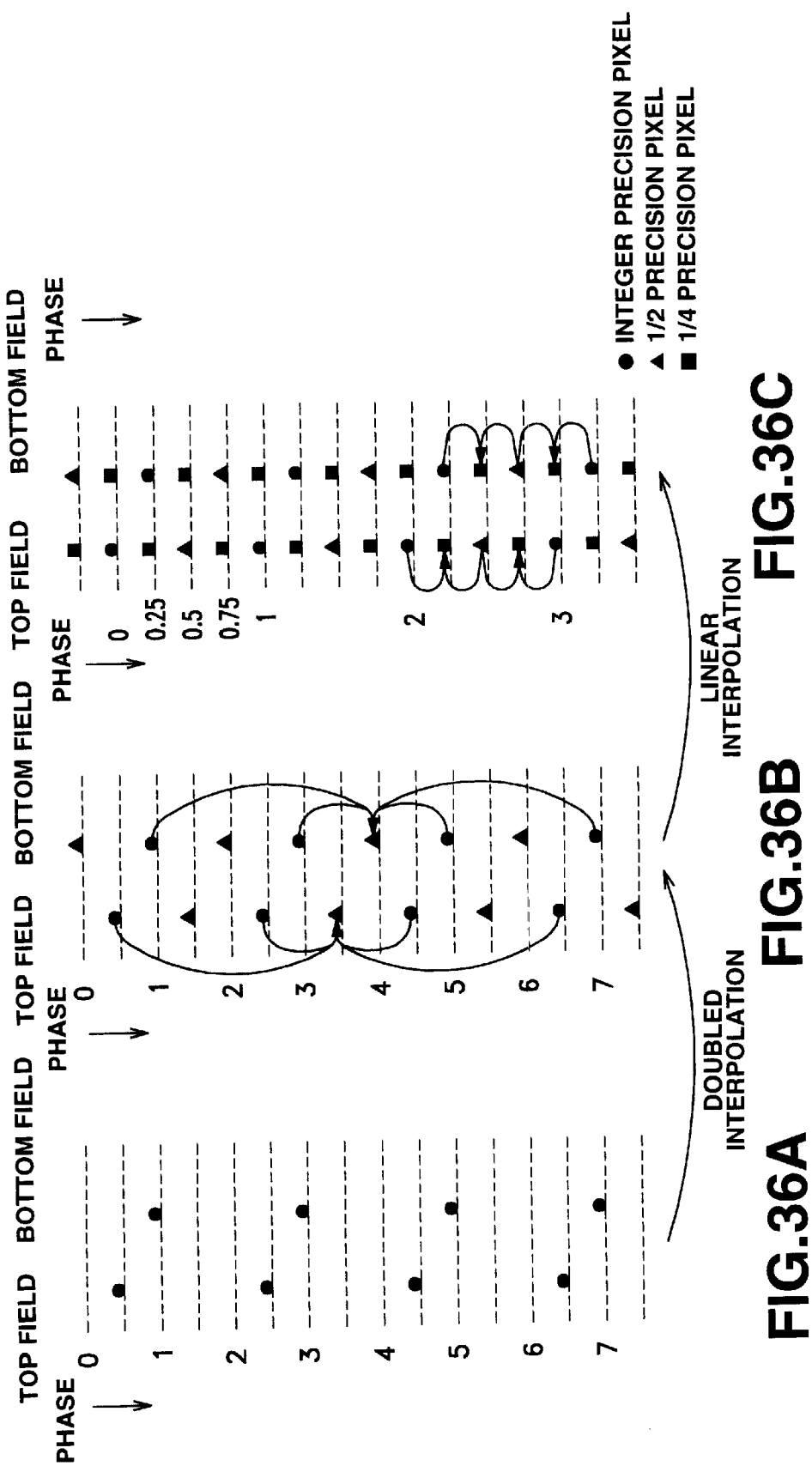
FIGS. 36A, 36B, 36C illustrate the interpolation processing in the motion compensation device for the field mode of the picture decoding device shown in FIG. 35.

As for the pixels in the vertical direction, those pixels of the integer-nw-number precision of a standard resolution picture, including dephasing between the top and bottom fields such that the pixels of the top field will have the phases in the vertical direction equal to ½, $\frac{5}{2}$, . . . and those of the bottom field will have the phases in the horizontal direction equal to 1, 3, . . . , are retrieved from the frame memory 17, as shown in FIG. 36A.

Then, as for the pixels in the vertical direction, those pixels of the ½ pixel precision are generated in a field, from the pixels of the integer-number precision taken out from the frame memory 17, using a double interpolation filter, such as a half-band filter, as shown in FIG. 36B. That is, pixels of the ½ pixel precision of the top field are generated on the basis of the pixels of the top field of the integer-number precision, while those of the ½ pixel precision of the bottom field are generated on the basis of the pixels of the bottom field of the integer-number precision. For example, the pixels of the top field, whose phase in the vertical direction is at a position of $\frac{7}{2}$, are generated by doubled/interpolation from pixels of the top field at the positions of ½, $\frac{5}{2}$, $\frac{9}{2}$, $\frac{13}{2}$, . . . , as shown in FIG. 36B. On the other hand, the bottom field pixels whose phase in the vertical direction is at a position of 4, are generated by doubled interpolation from the bottom field pixels at the positions of 1, 3, 5, 7, . . . .

Then, as for the pixels in the vertical direction, the pixels of the ¼ pixel precision are generated in a field, using a linear interpolation filter, from the pixels of the ½ pixel precision generated using a doubled interpolation filter, as shown in FIG. 36C. That is, ¼ pixel precision pixels of the top field are generated, based on the ½ pixel precision pixels of the top field, while ¼ pixel precision pixels of the bottom field are generated, based on the ½ pixel precision pixels of the bottom field. For example, the pixel of the top field, whose phase in the vertical direction is at a ¾ position, is generated by linear interpolation from the top field pixel lying at the position of $^{2.5}/_2$, as shown in FIG. 36C. The bottom field pixel, whose phase in the vertical direction is $^{10}/_4$, is generated by linear interpolation from the bottom field pixels lying at the positions of $^9/_4$ and $^{11}/_4$.

By doing interpolation in the vertical direction in this manner, it is possible with the motion compensation unit for field mode 41 to output the pixel of the same phase as that of the pixel of the standard resolution picture stored in the frame memory 17, with the aid of a doubled interpolation filter, such as a half-band filter, without performing product and sum computing operations corresponding to the number of taps, as a reference picture corresponding to the high resolution picture. Thus, the present motion compensation unit for field mode 41 is able to perform high-speed processing. It is also possible with the motion compensation unit for field mode 41 to calculate the above processing using a sole matrix, or to generate ¼ precision pixels from the integer-number precision pixels using a quadrupled interpolation filter.

The interpolation processing performed by the motion compensation unit for frame mode 42 is now explained. The motion compensation unit for frame mode 42 interpolates pixels of the standard resolution picture, stored in the frame memory 17, in meeting with the motion compensation of the ½ pixel precision of the high resolution picture, to generate pixels of the ¼ pixel precision, as will be explained subsequently.

As for pixels in the horizontal direction, pixels of ½ pixel precision are generated, using a doubled interpolation filter, from the pixels of the standard precision stored in the frame memory 17. The motion compensation unit for frame mode 42 generates pixels of ½ pixel precision, using, for example, a half band filter. The motion compensation unit for frame mode 42 then generates, using a linear interpolation filter, pixels of ¼ pixel precision from the pixels of the ½ pixel precision generated using the double interpolation filter. The motion compensation unit for frame mode 42 is able to output the pixel of the same phase as that of the pixel of the standard resolution picture stored in the frame memory 17, with the aid of a doubled interpolation filter, such as a half-band filter, without performing product and sum computing operations corresponding to the number of taps, as a reference picture corresponding to the high resolution picture. Thus, the present motion compensation unit for frame mode 42 is able to perform high-speed processing. It is also possible with the motion compensation unit for frame mode 42 to calculate the above processing using a sole matrix, or to generate ¼ precision pixels from the integer-number precision pixels using a quadrupled interpolation filter.

As for the pixels in the vertical direction, those pixels of the integer-number precision of a standard resolution picture, including dephasing between the top and bottom fields such that the pixels of the top field will have the phases in the vertical direction equal to ½, $^5/_2$, . . . and those of the bottom field will have the phases in the horizontal direction equal to 1, 3, . . . , as shown in FIG. 37A.

Then, as for the pixels in the vertical direction, those pixels of the ½ pixel precision are generated in a field, from the pixels of the integer-number precision taken out from the frame memory 17, using a double interpolation filter, such as a half-band filter, as shown in FIG. 37B. That is, pixels of the ½ pixel precision of the top field are generated on the basis of the pixels of the top field of the integer-number precision, while those of the ½ pixel precision of the bottom field are generated on the basis of the pixels of the bottom field of the integer-number precision. For example, the pixels of the top field, whose phase in the vertical direction is at a position of $^7/_2$, are generated by doubled interpolation from pixels of the top field at the positions of ½, $^5/_2$, $^9/_2$, $^{13}/_2$, . . . , as shown in FIG. 37B. On the other hand, the bottom field pixels whose phase in the vertical direction is at a position of 4 are generated by doubled interpolation from the bottom field pixels at the positions of 1, 3, 5, 7, . . . .

Then, as for the pixels in the vertical direction, the pixels of the ¼ pixel precision are generated from pixels of ½ pixel precision, generated using the doubled interpolation filter, between the top and bottom fields, as shown in FIG. 37C. For example, the pixels whose phase in the vertical direction is at the ¼ precision are generated by linear interpolation from the top field pixel at the 0 position and the bottom field pixel at the ½ position, as shown in FIG. 37C. On the other hand, the pixels whose phase in the vertical direction is at the ¾ precision are generated by linear interpolation from the bottom field pixel at the ½ position and the top field pixel at the 1 position.

By doing interpolation in the vertical direction in this manner, it is possible with the motion compensation unit for frame mode 42 to output the pixel of the same phase as that of the pixel of the standard resolution picture stored in the frame memory 17, with the aid of a doubled interpolation filter, such as a half-band filter, without performing product and sum computing operations corresponding to the number of taps, as a reference picture corresponding the high resolution picture. Thus, the present motion compensation unit for field mode 41 is able to perform high-speed processing. There is produced no dephasing between the top field and the bottom field to prevent so-called field inversion or field mixing and resulting deterioration in the picture quality. It is also possible with the motion compensation unit for frame mode 42 to calculate the above processing using a sole matrix, or to generate ¼ precision pixels from the integer-number precision pixels using a quadrupled interpolation filter.

With the picture decoding device 40 of the first embodiment of the present invention, 4×4 decimating inverse discrete cosine transform is applied to each of the top field and the bottom field in the field DCT mode to decode a standard resolution picture. In the frame DCT mode, a standard resolution picture is decoded on frame separation and on executing decimating inverse discrete cosine transform. With the present picture decoding device 10, in which different processing is performed for the field DCT mode and the frame DCT model picture characteristics proper to a picture obtained on interlaced scanning is not degraded. Moreover, the with the present picture decoding device 40, it is possible to prevent deterioration of the picture quality. In addition, with the present picture decoding device 40, high-speed processing can be realized by interpolating the picture stored in the frame memory 17, using the doubled interpolation filter at the time of motion compensation, without the necessity of performing product and sum processing associated with the number of taps.

Meanwhile, it is possible with the present picture decoding device 40 to generate only required pixels depending on the value of the motion vector in the input bitstream. It is also possible to prepare filter coefficient to associated with the values of the motion vectors in the horizontal direction and in the vertical direction and to perform interpolation in the vertical and horizontal directions at a time.

Meanwhile, with the motion compensation unit for frame mode 42 of the third embodiment of the picture decoding device 40, interpolation processing can be performed on the pixels in the vertical direction without making distinctions between the top and bottom fields, as will be explained subsequently.

Also, those pixels of the integer-number precision of a standard resolution picture, including dephasing between the top and bottom fields such that the pixels of the top field will have the phases in the vertical direction equal to ½, 5/2, ... and those of the bottom field will have the phases in the vertical direction equal to 1, 3, . . . , are taken out from the frame memory 17, as shown in FIG. 38A. It is noted that, in FIG. 38, pixel values are stated without making distinctions between the top and bottom fields.

Then, using a filter generating interpolated values from sampling points of unequal intervals, the pixels in the vertical direction are interpolated between the top and bottom fields to generate pixels of ¼ pixel precision, as shown in FIG. 38C. The filter for generating interpolation values from these sampling points of unequal intervals can be designed using, for example, an order-N curve approximation system. By using such filter, designed using the order-N curve approximation system, processing can be expedited, without the necessity of performing calculations, if pixels taken out from the frame memory 17 are directly outputted.

As for pixels in the vertical direct ion, it is possible to generate pixels of ½ pixel precision, by interpolating pixels between the top and bottom fields, as shown in FIG. 38B, and to generate pixels of ¼ precision between the top and bottom fields, using a linear interpolation filter, as shown in FIG. 38C. In this case, it is possible to provide coefficients corresponding to two-stage filtering from the outset and to make direct computations of pixel values taken out from the frame memory 17 to expedite the processing of motion compensation.

It is possible with the motion compensation unit for frame mode 42 to switch between interpolation processing of doubled interpolation in a field as shown in FIG. 37 and interpolation processing devoid of field distinction as shown in FIG. 38, under a pre-set condition, to realize optimum interpolation processing depending on picture contents.

Fourth Embodiment

A picture decoding device according to a fourth embodiment of the present invention is hereinafter explained.

Figure 39:
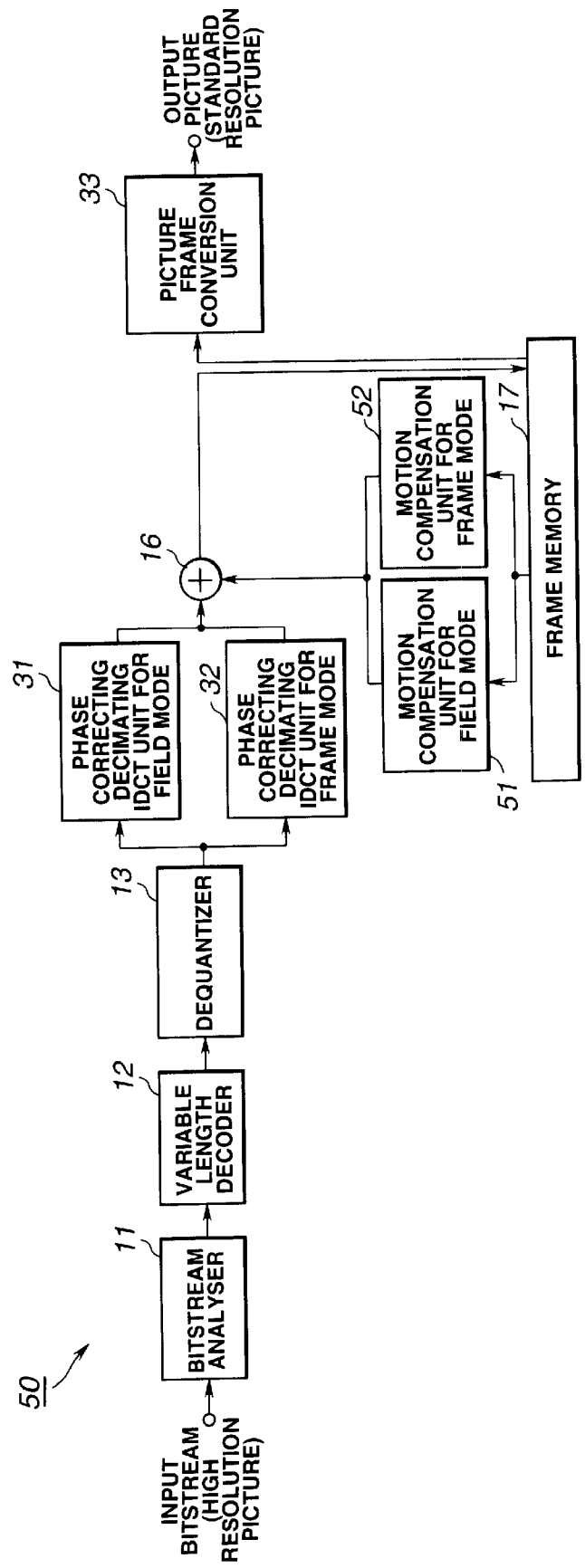
FIG. 39 is a block diagram showing a picture decoding device according to a fourth embodiment of the present invention.

Referring to FIG. 39, a picture decoding device 50 of the present fourth embodiment is fed with a bitstream, obtained on compressing a high resolution picture, with the effective number of vertical lines of, for example, 1152, in accordance with the MPEG2, decodes this input bitstream and reduces the resolution to ½ to output a standard resolution picture with the number of effective lines in the vertical direction of, for example, 576.

This picture decoding device 50 includes a bitstream analysis unit 11, fed with a bitstream of a compressed high resolution picture and which is adapted for analyzing the input bitstream, and a variable length decoding unit 12 for decoding the bitstream, processed with variable length encoding of allocating a code length associated with the data occurrence frequency. The picture decoding device 10 also includes a dequantizer 13 for multiplying the coefficients of the DCT block with quantization steps and a phase correcting decimating inverse discrete cosine transform unit 31 for field mode for executing decimating inverse discrete cosine transform on the DCT block discrete cosine transformed with the field DCT mode to generate a standard resolution picture. The picture decoding device 10 also includes a phase correcting decimating inverse discrete cosine transform unit for frame mode 32 for decimating inverse discrete cosine transforming the DCT block discrete cosine transformed in the frame DCT mode to generate a standard resolution picture and an adder 16 for summing the standard resolution picture processed with decimating inverse discrete cosine transform to the motion compensated reference picture. The picture decoding device 10 also includes a frame memory 17 for temporarily storing the reference picture and a motion compensation unit for field mode 51 for field mode for motion compensating the reference picture stored in the frame memory 17 in meeting with the field motion predictive mode. The picture decoding device 10 also includes a motion compensation unit for frame mode 52 for motion compensating the reference picture stored in the frame memory 17 in meeting with the frame motion predictive mode, and a picture frame converting unit 33 for picture-frame-converting a picture stored in the frame memory 17 for picture frame conversion and for outputting picture data of standard resolution for display on a television monitor etc.

The phase-correcting decimating inverse discrete cosine transform unit 31 for field mode is used if the macro-block of an input bitstream is discrete cosine transformed in the field DCT mode. The phase correcting decimating inverse discrete cosine transform unit 31 for field mode performs inverse discrete cosine transform with correction of pixel dephasing in the vertical direction between the top and bottom fields, only on the 4×8 coefficients of the DCT block, showing 8×8 coefficients in the macro-block discrete cosine transformed in the field DCT mode. That is, the phase-correcting decimating inverse discrete cosine transform unit 31 for field mode performs inverse discrete cosine transform based on low range side four point inverse discrete cosine coefficients in the horizontal direction and in the vertical direction, while performing inverse discrete cosine transform, with dephasing correction, based on eight point discrete cosine transform coefficients in the vertical direction. Specifically, the phase-correcting decimating inverse discrete cosine transform unit 31 corrects the phase for a ¼ pixel for respective pixels in the vertical direction of the top field, while correcting the phase for a ¾ pixel for respective pixels in the vertical direction of the bottom field. By the above-described decimating inverse discrete cosine transform, there is generated a standard resolution picture (lower layer) in which the phase in the vertical direction of each pixel of the top field is ¼, 9/4, . . . , and that in the vertical direction of each pixel of the bottom field is 5/4, 13/4, . . . .

Figure 19:
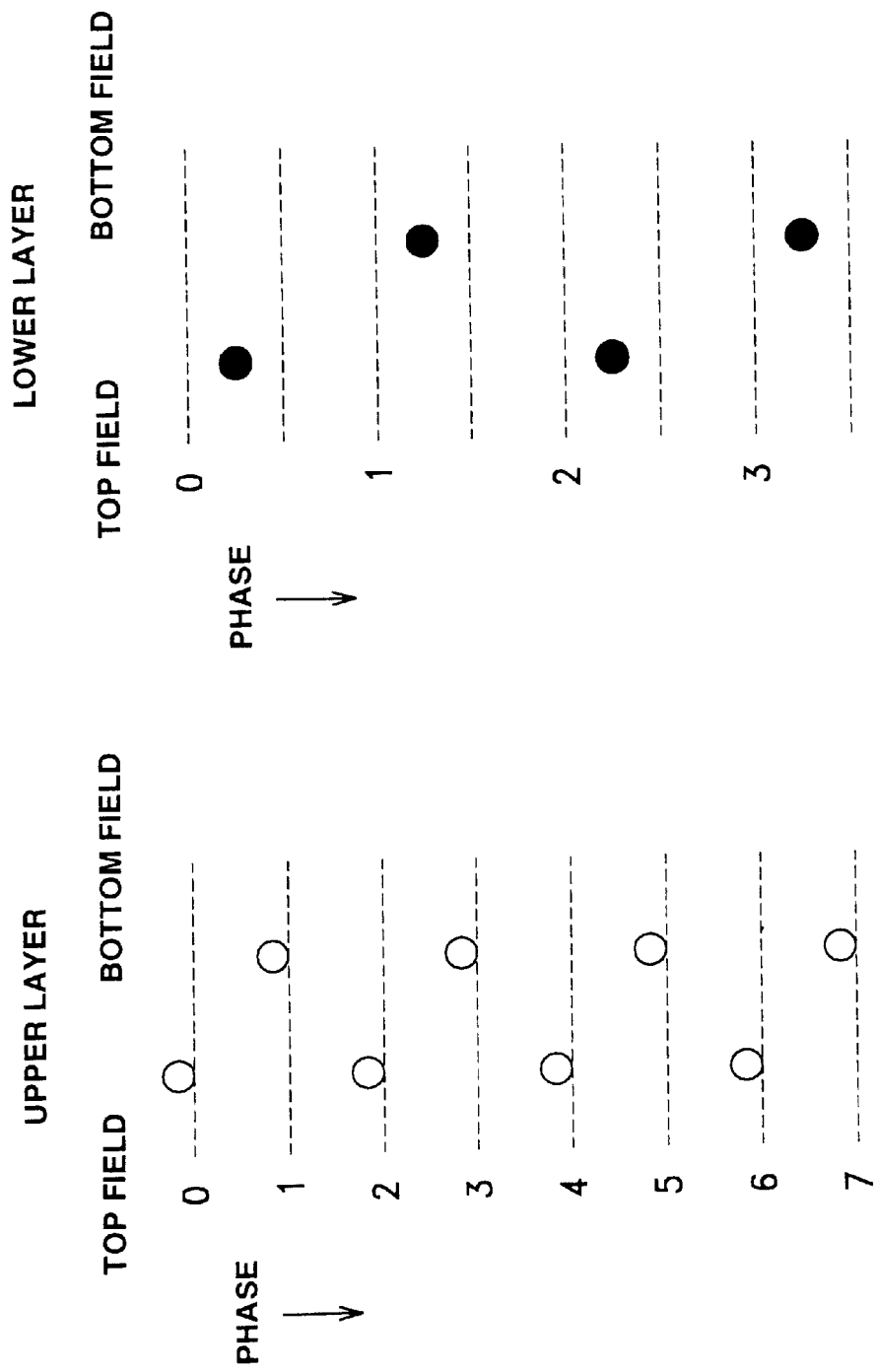
FIG. 19 illustrates the phase of a pixel in the perpendicular direction of the reference picture stored in a frame memory of a picture decoding device according to the second embodiment of the present invention.

The phase-correcting decimating inverse discrete cosine transform unit for frame mode 32 is used when the macro-block of the input bitstream is discrete cosine transformed with the frame DCT mode. The phase-correcting decimating inverse discrete cosine transform unit for frame mode 32 performs decimating inverse discrete cosine transform, in which dephasing of the pixels in the vertical direction between the top and bottom fields is corrected by one-block or two-block processing, on the DCT block showing 8×8 coefficients in the macro-block discrete cosine transformed in the frame DCT mode. The phase-correcting decimating inverse discrete cosine transform unit for frame mode 32 generates a picture of the same phase as the phase of the pixel of the standard resolution picture generated by the phase-correcting decimating inverse discrete cosine transform unit 31 for field mode. That is, there is produced a standard resolution picture (lower layer) in which the phase in the vertical direction of each pixel of the top field is ¼, ⁹⁄₄, . . . , with the phase in the vertical direction of each pixel of the bottom field being ⁵⁄₄, ¹³⁄₄, . . . , as shown in FIG. 19.

The motion compensation unit for field mode 51 is used if the motion prediction mode for the macro-block is the field motion prediction mode. The motion compensation unit for field mode 51 interpolates the reference picture of the standard resolution picture stored in the frame memory 17 to ¼ pixel precision to perform motion compensation in meeting with the field motion prediction mode. The reference picture, motion compensated by the motion compensation unit for field mode 51, is sent to the adder 16 for synthesis to the inter-picture.

The motion compensation unit for frame mode 52 is used when the macro-block motion prediction mode is the frame motion prediction mode. The motion compensation device for frame mode 52 interpolates the reference picture of the standard resolution picture stored in the frame memory 17, to ¼ pixel precision, taking into account the dephasing between the top and bottom fields, by way of performing motion compensation in meeting with the frame motion prediction mode. The reference picture, motion compensated by this motion compensation unit for frame mode 52, is sent to the adder 16 for synthesis to an inter-picture.

With the above-described picture decoding device 40 according to the fourth embodiment of the present invention, the bitstream corresponding to the high resolution picture compressed in accordance with the MPEG2 can be decoded and reduced in resolution to ½, so as to be outputted as a standard resolution picture.

The motion compensation unit for field mode 51 and the motion compensation unit for frame mode 52 are explained in more detail.

First, the interpolation processing by the motion compensation unit for field mode 51 is explained. This motion compensation unit for field mode 51 interpolates pixels of the standard resolution picture stored in the frame memory 17, in meeting with the motion compensation of ½ pixel precision of the high resolution picture, to generate pixels of ¼ pixel precision, as will be explained subsequently.

As for pixels in the horizontal direction, pixels of ½ pixel precision are generated from the pixels of the integer-number precision stored in the frame memory 17. The motion compensation unit for field mode 51 generates pixels to ½ pixel precision, using a half-band filter. Then, using a linear interpolation filter, the motion compensation unit for field mode 51 then generates pixels to ¼ pixel precision, from the pixels of the ½ pixel precision, generated using a double interpolation filter. By using the double interpolation filter, such as the half-band filter, the motion compensation unit for field mode 51 is able to output pixels of the same phase as that of the pixels of the standard resolution picture stored in the frame memory 17, as a reference picture corresponding to the high resolution picture, without the necessity of performing product and sum processing associated with the number of taps. Thus, the present motion compensation unit for field mode 51 is able to perform high-speed processing. It is also possible with the motion compensation unit for field mode 51 to calculate the above processing using a sole matrix, or to generate pixels of ¼ precision from the integer-number precision pixel, using a quadrupled interpolation filter.

As for the pixels in the vertical direction, those pixels of the integer-number precision of a standard resolution picture, in which dephasing has been corrected between the top and bottom fields, such that the pixels of the top field will have the phases in the vertical direction equal to ½, ⁵⁄₂, ⁹⁄₂, . . . and those of the bottom field will have the phases in the vertical direction equal to ³⁄₂, ⁷⁄₂, ¹¹⁄₂, . . . , are retrieved from the frame memory 17, as shown in FIG. 40A.

Then, as for the pixels in the vertical direction, those pixels of the ½ pixel precision are generated in one field, from the pixels of the integer-number precision taken out from the frame memory 17, using a double interpolation filter, such as a half-band filter, as shown in FIG. 40B. That is, top field pixels of ½ pixel precision are generated based on the integer-number precision pixels of the top field, while bottom field pixels of ½ pixel precision are generated based on the integer-number precision pixels of the bottom field. For example, the pixels of the top field, whose phase in the vertical direction is at a position of ⁷⁄₂, are generated by doubled interpolation from pixels of the top field at the positions of ½, ⁵⁄₂, ⁹⁄₂, ¹³⁄₂, . . . , as shown in FIG. 40B. On the other hand, the bottom field pixels whose phase in the vertical direction is at a positions of ⁹⁄₂, are generated by interpolation with dephasing of ¼ or ¾ from the bottom field pixels at the positions of . . . ³⁄₂, ⁷⁄₂, ¹¹⁄₂, ¹⁵⁄₂ . . . .

Then, as for the pixels in the vertical direction, the pixels of the ¼ pixel precision are generated in a field, using a linear interpolation filter, from the pixels of the ½ pixel precision generated using a doubled interpolation filter, as shown in FIG. 40C. That is, ¼ pixel precision pixels of the top field are generated, based on the ½ pixel precision pixels of the top field, while ¼ pixel precision pixels of the bottom field are generated, based on the ½ pixel precision pixels of the bottom field. For example, the pixel of the top field, whose phase in the vertical direction is at a ⁹⁄₄ position, is generated by linear interpolation from the top field pixel lying at the positions of 2 and ⁵⁄₂, as shown in FIG. 40C. The bottom field pixel, whose phase in the vertical direction is ¹¹⁄₄, is generated by linear interpolation from the bottom field pixels lying at the positions of ¹⁰⁄₄ and 3.

By doing interpolation in the vertical direction in this manner, it is possible with the motion compensation unit for field mode 51 to output the pixel of the same phase as that of the pixel of the standard resolution picture stored in the frame memory 17, with the aid of a doubled interpolation filter, such as a half-band filter, without performing product and sum computing operations corresponding to the number of taps, as a reference picture corresponding to the high resolution picture. Thus, the present motion compensation unit for field mode 51 is able to perform high-speed processing. It is also possible with the motion compensation unit for field mode 51 to calculate the above processing using a sole matrix, or to generate ¼ precision pixels from the integer-number precision pixels using a quadrupled interpolation filter.

The interpolation processing performed by the motion compensation unit for frame mode 52 is now explained. The motion compensation unit for frame mode 52 interpolates pixels of the standard resolution picture, stored in the frame memory 17, in meeting with the motion compensation of the ½ pixel precision of the high resolution picture, to generate pixels of the ¼ pixel precision, as will be explained subsequently.

As for pixels in the horizontal direction, pixels of ½ pixel precision are generated, using a doubled interpolation filter, from the integer-number precision pixels stored in the frame memory 17. The motion compensation unit for frame mode 52 generates pixels of ½ pixel precision, using, for example, a half band filter. The motion compensation unit for frame mode 52 then generates, using a linear interpolation filter, pixels of ¼ pixel precision from the pixels of the ½ pixel precision generated using the double interpolation filter. The motion compensation unit for frame mode 52 is able to output the pixel of the same phase as that of the pixel of the standard resolution picture stored in the frame memory 17, with the aid of a doubled interpolation filter, such as a half-band filter, without performing product and sum computing operations corresponding to the number of taps, as a reference picture corresponding to the high resolution picture. Thus, the present motion compensation unit for frame mode 52 is able to perform high-speed processing. It is also possible with the motion compensation unit for frame mode 52 to calculate the above processing using a sole matrix, or to generate ¼ precision pixels from the integer-number precision pixels using a quadrupled interpolation filter.

Figures 41A, 41B, 41C:
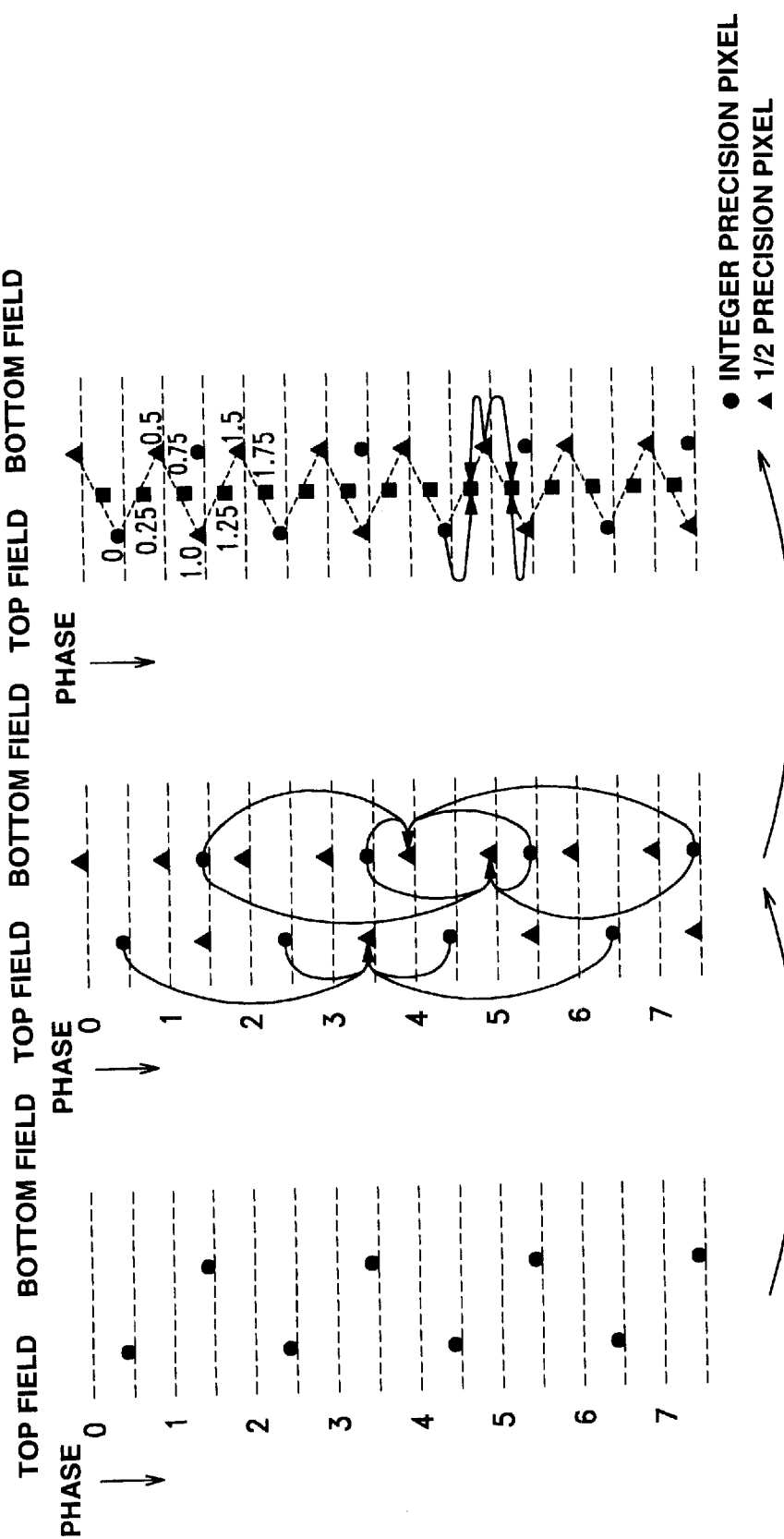
FIGS. 41A, 41B, 41C illustrates the interpolation processing in the motion compensation device for the field mode of the picture decoding device shown in FIG. 39.

As for the pixels in the vertical direction, those pixels of the integer-number precision of a standard resolution picture, freed of dephasing between the top and bottom fields such that the pixels of the top field will have the phases in the vertical direction equal to ½, ⁵⁄₂, ⁹⁄₂, . . . and those of the bottom field will have the phases in the horizontal direction equal to ³⁄₂, ⁷⁄₂, ¹¹⁄₂, . . . , as shown in FIG. 41A.

Then, as for the pixels in the vertical direction, those pixels of the ½ pixel precision are generated in a field, from the pixels of the integer-number precision taken out from the frame memory 17, using a double interpolation filter, such as a half-band filter, as shown in FIG. 41B. In the other field, the pixels dephased by ¼ and ¾ are generated from the pixels of the integer-number precision retrieved from the frame memory 17, using a filter. For example, ½ pixel precision pixels are generated on the basis of the integer-number precision pixel of the top field, while pixels dephased by ¼ and ¾ of the bottom field are generated on the basis of the integer-number precision pixels of the bottom field. Specifically, the pixels of the top field, whose phase in the vertical direction is at the ⁷⁄₂ position, are generated with double interpolation from the pixels of the top field lying at the positions of . . . ½, ⁵⁄₂, ⁹⁄₂, ¹³⁄₂, . . . , as shown in FIG. 41B. The pixels of the bottom field, whose phase in the vertical direction is at the positions of 4 and 5, are generated with interpolation with dephasing by ¼ and ¾ from the bottom field lying at the positions of . . . ³⁄₂, ⁷⁄₂, ¹¹⁄₂, ¹⁵⁄₂, . . . .

Then, as for the pixels in the vertical direction, the pixels of the ¼ pixel precision are generated from pixels of ½ pixel precision, generated using the doubled interpolation filter, between the top and bottom fields, as shown in FIG. 41C. For example, the pixel whose phase in the vertical direction is at the ¼ position is generated by linear interpolation from the top field pixel lying at the 0 position and the bottom field pixel lying at the ½ position, as shown in FIG. 41C. On the other hand, the pixels whose phase in the vertical direction is at the ¾ precision are generated by interpolation from the bottom field pixel at the ½ position and the top field pixel at the 1 position.

By doing interpolation in the vertical direction in this manner, it is possible with the motion compensation unit for frame mode 52 to output the pixel of the same phase as that of the pixel of the standard resolution picture stored in the frame memory 17, with the aid of a doubled interpolation filter, such as a half-band filter, without performing product and sum computing operations corresponding to the number of taps, as a reference picture corresponding to the high resolution picture. Thus, the present motion compensation unit for frame mode 52 is able to perform high-speed processing. There is produced no dephasing between the top field and the bottom field to prevent so-called field inversion or field mixing and resulting deterioration in the picture quality. It is also possible with the motion compensation unit for frame mode 52 to calculate the above processing using a sole matrix, or to generate ¼ precision pixels from the integer-number precision pixels using a quadrupled interpolation filter.

With the picture decoding device 50 of the fourth embodiment of the present invention, 4×4 decimating inverse discrete cosine transform is applied to each of the top field and the bottom field in the field DCT mode to decode the standard resolution picture, while the standard resolution picture, corrected for dephasing, is decoded. In the frame DCT mode, a standard resolution picture is decoded on frame separation and on performing decimating inverse discrete cosine transform for correcting the dephasing. With the present picture decoding device 50, in which different processing is performed for the field DCT mode and the frame DCT mode, picture characteristics proper to a picture obtained on interlaced scanning are not degraded. Moreover, the with the present picture decoding device 50, it is possible to prevent deterioration of the output picture quality. In addition, with the present picture decoding device 50, high-speed processing can be realized by interpolating the picture stored in the frame memory 17, using the doubled interpolation filter at the time of motion compensation, without performing product and sum processing associated with the number of taps.

Meanwhile, it is possible with the present picture decoding device 50 to generate only required pixels depending on the value of the motion vector in the input bitstream. It is also possible to prepare filter coefficients associated with the values of the motion vectors in the horizontal direction and in the vertical direction and to perform interpolation in the vertical and horizontal directions at a time.

Meanwhile, with the motion compensation unit for frame mode 52 of the fourth embodiment of the picture decoding device 50, interpolation processing can be performed on the pixels in the vertical direction without making distinctions between the top and bottom fields, as will be explained subsequently.

Figures 42A, 42B, 42C:
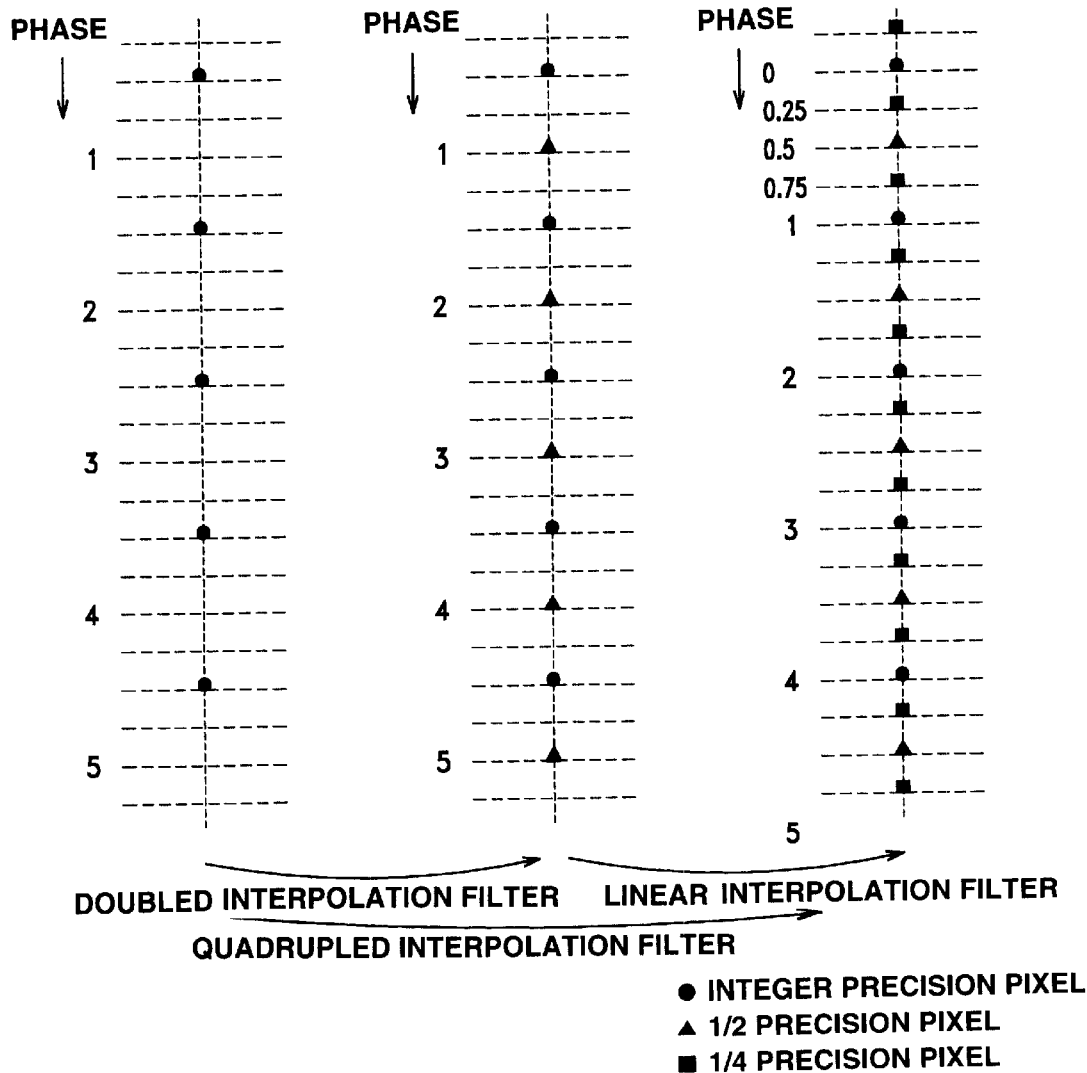
FIGS. 42A, 42B, 42C illustrates alternative interpolation processing in the motion compensation device for the field mode of the picture decoding device shown in FIG. 39.

Also, those pixels of the integer-number precision of a standard resolution picture, free of dephasing between the top and bottom fields such that the pixels of the top field will have the phases in the vertical direction equal to ½, ⁵⁄₂, . . . and those of the bottom field in the vertical direction will have the phases equal to ³⁄₂, ⁷⁄₂, . . . , are taken out from the frame memory 17, as shown in FIG. 42A. It is noted that, in FIG. 42A, pixel values are stated without making distinctions between the top and bottom fields.

The pixels in the vertical direction then are interpolated, between the top and bottom fields, using a double interpolation filter, such as a half-band filter, to generate ½ pixel precision pixels, as shown in FIG. 42B. If the pixels retrieved from the frame memory 17 are directly outputted, using this half band filter, the processing can be expedited, without the necessity of performing calculations.

The double-interpolated pixels are interpolated between the fields, using a linear interpolation filter, to generate pixels of the ¼ pixel precision, as shown in FIG. 42C.

With the motion compensation unit for frame mode 52, it is possible to provide coefficients corresponding to the two-stage filter processing from the outset and to calculate the coefficients directly on the pixel value read out from the frame memory 17 to expedite the motion compensation processing.

With the motion compensation unit for frame mode 52, it is also possible to generate pixels of the ¼ pixel precision, shown in FIG. 42C, from the integer-number precision pixels shown on FIG. 42A, using a ¼ interpolation filter.

With the motion compensation unit for frame mode 52, it is similarly possible to switch between the interpolation processing of double interpolation within a field has shown in FIG. 41 and the interpolation processing making no distinction between fields, as shown in FIG. 42, under a pre-set condition, to effect optimum interpolation processing depending on, for example, picture contents.

Fifth Embodiment

A picture decoding device according to a fifth embodiment of the present invention is hereinafter explained.

Figure 43:
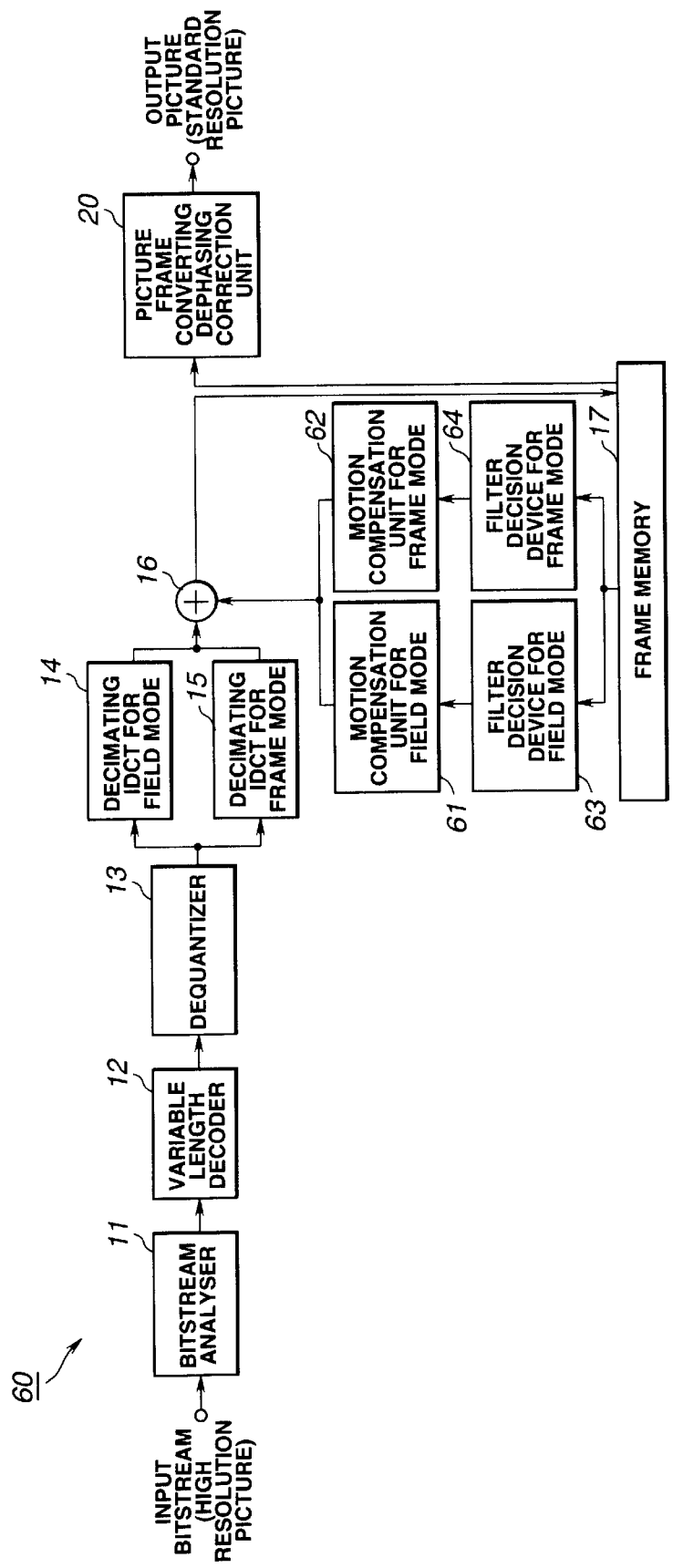
FIG. 43 is a block diagram of a picture decoding device according to a fifth embodiment of the present invention.

Referring to FIG. 43, a picture decoding device 60 of the present fifth embodiment is fed with a bitstream, obtained on compressing a high resolution picture, with the effective number of vertical lines of, for example, 1152, in accordance with the MPEG2, decodes this input bitstream and reduces the resolution to ½ to output a standard resolution picture with the number of effective lines in the vertical direction of, for example, 576.

This picture decoding device 60 includes a bitstream analyzing unit 11, fed with a bitstream of a compressed high resolution picture, and which is adapted for analyzing the input bitstream, and a variable length decoding unit 12 for decoding the bitstream, processed with variable length encoding of allocating a code length associated with the data occurrence frequency. The picture decoding device 10 also includes a dequantizer 13 for multiplying the coefficients of the DCT block with quantization steps and a decimating inverse discrete cosine transform unit 14 for field mode for executing decimating inverse discrete cosine transform on the DCT block discrete cosine transformed with the field DCT mode to generate a standard resolution picture. The picture decoding device 10 also includes a decimating inverse discrete cosine transform unit for frame mode 15 for executing decimating inverse discrete cosine transform on a DCT block discrete cosine transformed with the frame DCT mode to generate a standard resolution picture. This picture decoding device 50 also includes an adder 16 for summing the standard resolution picture processed with decimating inverse discrete cosine transform to the motion compensated reference picture. The picture decoding device 10 also includes a frame memory 17 for temporarily storing the reference picture and a motion compensation unit for field mode 61 for field mode adapted for motion compensating the reference picture stored in the frame memory 17 in meeting with the field motion predictive mode. The picture decoding device 10 also includes a motion compensation unit for frame mode 62 for motion compensating the reference picture stored in the frame memory 17 in meeting with the frame motion predictive mode, and a filter decision device for field mode 63 for determining the number of taps for filtering for the motion compensation unit for field mode 61. The picture decoding device 10 also includes a filter decision device for field mode 64 for determining the number of taps for filtering for the motion compensation unit for frame mode 62 and a picture frame conversion dephasing correction device 20 for post-filtering the picture stored in the frame memory 17 for picture frame conversion and for correcting the pixel dephasing to output picture data of the standard resolution for display on, for example, a television monitor.

The decimating inverse discrete cosine transform unit 14 for field mode is used if the macro-block of an input bitstream is discrete cosine transformed in the field DCT mode. The decimating inverse discrete cosine transform unit 14 for field mode performs inverse discrete cosine transform with correction of dephasing in the vertical direction between the top and bottom fields, only on the 4×4 coefficients of the DCT block, showing 8×8 coefficients in the macro-block discrete cosine transformed in the field DCT mode, as shown in FIG. 5. That is, the decimating inverse discrete cosine transform unit 14 for field mode performs inverse discrete cosine transform based on low range side four point inverse discrete cosine transform coefficients in the horizontal direction and in the vertical direction. By the above-described decimating inverse discrete cosine transform, there is generated with the present decimating inverse discrete cosine transform unit 14 for field mode a standard resolution picture each DCT block of which is made up of 4×4 pixels and in which the phase in the vertical direction of each pixel of the top field is ½, ⅖, . . . , and that in the vertical direction of each pixel of the bottom field is 1, 3, . . . , as shown in FIG. 12.

The decimating inverse discrete cosine transform unit for frame mode 15 is used when the macro-block of the input bitstream is discrete cosine transformed with the frame DCT mode. The decimating inverse discrete cosine transform unit for frame mode 15 performs decimating inverse discrete cosine transform on the DCT block showing 8×8 coefficients in the macro-block discrete cosine transformed in the frame DCT mode. The decimating inverse discrete cosine transform unit for frame mode 15 generates a picture of the same phase as the phase of the pixel of the standard resolution picture generated by the decimating inverse discrete cosine transform unit 14 for field mode. That is, the phase in the vertical direction of respective pixels of picture data decoded by the decimating inverse discrete cosine transform unit for frame mode 15 is ½, 5/2 in the top field, . . . , with the phase in the vertical direction of respective pixels of the bottom field being 1, 3, . . . , as shown in FIG. 12.

The motion compensation unit for field mode 61 is used if the motion prediction mode for the macro-block is the field motion prediction mode. The motion compensation unit for field mode 61 interpolates the reference picture of the standard resolution picture stored in the frame memory 17 to ¼ pixel precision, such as to take dephasing components into account, in order to perform motion compensation in meeting with the field motion prediction mode. The reference picture, motion compensated by the motion compensation unit for field mode 61, is sent to the adder 16 for synthesis to the inter-picture. The motion compensation unit for field mode 61 interpolates the reference picture by filtering with a pre-set number of taps as set by a filter decision unit for field mode 63.

The motion compensation unit for frame mode 62 is used when the macro-block motion prediction mode is the frame motion prediction mode. The motion compensation device for frame mode 62 interpolates the standard resolution reference picture stored in the frame memory 17, to ¼ pixel precision, taking the dephasing component into account, by way of performing motion compensation in meeting with the frame motion prediction mode. The reference picture, motion compensated by this motion compensation unit for frame mode 62, is sent to the adder 16 for synthesis to an inter-picture. The motion compensation unit for frame mode 62 interpolates the reference picture by filtering with a pre-set number of taps as set by a filter decision unit for frame mode 64.

The filter decision unit for field mode 63 sets the number of taps of the filtering by the motion compensation unit for field mode 61, based on the information on the macro-block in the bitstream of the input high resolution picture.

For decimating the high resolution picture to a standard resolution picture, there holds the relation of trade-off between the picture quality of the output standard resolution picture and the number of taps for filtering. That is, the output standard resolution picture is improved in picture quality by increasing the number of filtering taps, however, the increased number of the filtering taps leads to an increased processing volume. That is, if the motion compensation unit for field mode 61 with low processing capability is used, and and the number of filtering taps is increased to improve the picture quality, the possibility is that the picture decoding device cannot operate in real-time. If conversely the number of taps for filtering is decreased to assure the real-time operation, the decoded picture is deteriorated in picture quality.

In the filter decision unit for field mode 63, the number of taps of the motion compensation unit for field mode 61 is switched, based on the information on the macro-block, to improve the picture quality of the output standard resolution picture and simultaneously to assure a real-time operation.

Also, in the filter decision unit for frame mode 64, the number of taps of the motion compensation unit for field mode 61 is switched, based on the information on the macro-block, to improve the picture quality of the output standard resolution picture and simultaneously to assure a real-time operation.

With the above-described fifth embodiment of the picture decoding device 60 of the present invention, it is possible to decode the bitstream compressed from the high resolution picture in accordance with MPEG2 and simultaneously reduce the resolution to ½ to output a standard resolution picture.

The processing of determining the number of filter taps, executed by the filter decision unit for field mode 63 and the filter decision unit for frame mode 64, is explained. The filter decision unit for field mode 63 and the filter decision unit for frame mode 64 set the number of the filter taps based on the information in the input bitstream as analyzed by the bitstream analysis unit 11.

The information for setting the number of the filter taps is the following six information and combinations thereof.

First, the number of the filter taps is determined depending on whether the processed data is the luminance signals or chrominance signals, for the following reason:

The subjective evaluation of the picture quality is significantly influenced by luminance signals. Also, in the 420 format, used in digital television broadcast, the information volume of the luminance signals is four times that of the chrominance signals. Also, in the MPEG2, the motion vector detected during encoding using the luminance signals is also used for chrominance signals. Thus, by filtering using a number of taps for motion compensation for luminance signals, and by performing linear interpolation for motion compensation for chrominance signals, or filtering using a smaller number of taps, it is possible to reduce the processing volume without degrading the apparent picture quality.

Second, the number of filter taps is determined based on whether the processed data is of a P-picture or a B-picture. The reason is as follows:

In a device for decoding only the low range of the DCT coefficients of a bitstream, such as MPEG bitstream, e.g., the above-described picture decoding device 60, the picture is deteriorated in quality due to error integration caused by motion compensation. An error in a P-picture affects the next following P- or B-pictures. However, errors in a B-picture is not propagated. Thus, by using a larger number of filter taps for motion compensation of the pixels of the P-picture and by using linear interpolation or by using a smaller number of filter taps for pixel motion compensation to approximate the linear interpolation, the processing volume can be decreased without lowering the picture quality.

Third, the number of filter taps is set depending on whether the motion compensation of the processed data is the forward prediction mode/backward prediction mode or the bitstream-directional prediction mode. The reason is as follows:

For the same reason as stated above, if a larger number of filter taps is used for motion compensation for the forward prediction mode/backward prediction mode and a smaller number of filter taps is used for pixel motion compensation for the bidirectional prediction mode to approximate the linear interpolation, the processing volume can be decreased without lowering the picture quality.

Fourth, the number of filter taps is determined depending on the particular value of the motion vector of a macro-block containing processed data. The reason is as follows:

If a motion compensation device outputs a pixel value corresponding to the phase of the ¼ pixel precision, deterioration in the picture quality is less outstanding, even with the use of a smaller number of taps, than if the motion compensation device outputs a pixel value corresponding to the phase of the ½ pixel precision, by the motion vector value. Therefore, the processing volume can be decreased without lowering the picture quality by switching the number of filter taps depending on the motion vector value.

Fifth, the number of filter taps is set depending on whether the interpolation processing is that in the horizontal direction or that in the vertical direction. The reason is as follows:

In particular, in the case of an interlaced picture, deterioration in the picture quality due to the decreased number of the filter taps is more apparent in the vertical direction than in the horizontal direction. Therefore, the processing volume can be decreased without lowering the picture quality by using a number of filter taps for motion compensation in the vertical direction and by using linear interpolation or by using a smaller number of filter taps for motion compensation in the horizontal direction to approximate the linear interpolation.

Sixth, the number of filter taps is determined depending on whether the processed data is of the field motion compensation mode or the frame motion compensation mode. The reason is as follows:

In picture encoding devices in general, macro-blocks with large field-to-field difference is processed in the field motion compensation mode, while those with small field-to-field difference is processed in the frame motion compensation mode. Thus, by allocating a larger number of taps to the field motion compensation mode and by allocating a smaller number of taps to the frame motion compensation mode, the processing volume can be decreased without lowering the picture quality.

In the above-described picture decoding device 60 of the present invention, 4×4 decimating inverse discrete cosine transform is applied to each of the top and bottom fields, in the field DCT mode, to decode a standard resolution picture, whereas, in the frame DCT mode, decimating inverse discrete cosine transform is applied with frame separation to decode the standard resolution picture. With the picture decoding device 60, in which processing is executed for each of the field DCT mode and the frame DCT mode, the properties peculiar to the interlaced picture are not lost. In addition, the picture decoded in the field DCT mode and that decoded in the frame DCT mode can be rendered equal in phase, such that the picture is not deteriorated in quality.

With the present picture decoding device 60, in which the number of taps of the filter decision unit for field mode 63 is switched based on the information on the macro-blocks, it is possible to prevent picture quality deterioration otherwise caused by motion compensation and to reduce the processing volume for motion compensation.

The filter decision unit for field mode 63 and the filter decision unit for frame mode 64 of the picture decoding device 60 of the fifth embodiment of the present invention can be applied to the picture decoding devices 40, 50 of the above-described third and fourth embodiments.

Although the picture decoding devices of the first to fifth embodiments have been described in the foregoing, the data processed in accordance with the present invention is not limited to picture data of the MPEG2 system. That is, the picture data processed in accordance with the present invention may be any compressed picture data of a first resolution obtained on predictive coding by motion prediction or on compression coding by orthogonal transform on the pre-set pixel block basis. For example, compressed picture data by, for example, wavelet transform, may be processed in accordance with the present invention.

What is claimed is:

1. A picture decoding apparatus for decoding moving picture data of a second resolution from compressed picture data of a first resolution, obtained on predictive coding by motion prediction in terms of a pre-set pixel block as a unit and on compression coding in terms of a predefined pixel block as a unit, the second resolution being lower than the first resolution, comprising:

first inverse orthogonal transform means for inverse orthogonal transforming an orthogonal transform block of the compressed picture data, orthogonal transformed by an orthogonal transform system associated with interlaced scanning;

second inverse orthogonal transform means for inverse orthogonal transforming an orthogonal transform block of said compressed picture data, orthogonal transformed in accordance with an orthogonal transform system associated with sequential scanning;

addition means for summing the compressed picture data, inverse orthogonal transformed by said first inverse orthogonal transform means or said second inverse orthogonal transform means, to motion compensated reference picture data to output moving picture data of the second resolution;

memory means for storing moving picture data outputted by said addition means as reference picture data; and motion compensation means for motion compensating a macro-block of the reference picture data stored in said memory means;

wherein said motion compensation means includes:

first motion compensation means for motion compensating a macro-block of reference picture data motion-predicted in accordance with a motion prediction system associated with interlaced scanning; and second motion compensation means for motion compensating a macro-block of reference picture data motion-predicted in accordance with a motion prediction system associated with sequential scanning;

said first motion compensation means and the second motion compensation means interpolating respective pixels of the macro-block of reference picture data stored in said memory means to generate a macro-block constituted by pixels of ¼ pixel precision for the reference picture data stored in said memory means to execute motion compensation on the generated macro-block.

2. The picture decoding apparatus according to claim 1 wherein said first and second motion compensation means effect doubled interpolation on respective pixels in the horizontal direction of the macro-block of reference picture data stored in said memory means and also effect doubled linear interpolation on the double-interpolated pixels to generate a macro-block constructed by pixels having ¼ pixel precision in the horizontal direction for reference picture data stored in said memory means.

3. The picture decoding apparatus according to claim 1 wherein said first and second motion compensation means effect quadrupled interpolation on respective pixels in the horizontal direction of the macro-block of reference picture data stored in said memory means and to generate a macro-block constructed by pixels of ¼ pixel precision in the horizontal direction for reference picture data stored in said memory means.

4. The picture decoding apparatus according to claim 1, wherein said first motion compensation means effects double interpolation on respective pixels in the vertical direction of a macro-block of reference picture data stored in said memory means in one field and also effects linear interpolation on the double-interpolated pixels in one field to generate a macro-block constructed by pixels of the ¼ pixel precision for the vertical direction for the reference picture data stored in said memory means.

5. The picture decoding apparatus according to claim 1 wherein said first motion compensation means effects quadrupled interpolation on respective pixels in the vertical direction of a macro-block of reference picture data stored in said memory means to generate a macro-block constructed by pixels of the ¼ pixel precision for the vertical direction for the reference picture data stored in said memory means.

6. The picture decoding apparatus according to claim 1 wherein said second motion compensation means effects double interpolation on respective pixels in the vertical direction of a macro-block of reference picture data stored in said memory means in one field and also effects linear interpolation between top and bottom fields on the double-interpolated pixels in one field to generate a macro-block constructed by pixels of the ¼ pixel precision for the vertical direction for the reference picture data stored in said memory means.

7. The picture decoding apparatus according to claim 1 wherein:

said pre-set pixel block is a macro-block;

said predefined pixel block is an orthogonal transform block;

said orthogonal transform system associated with interlaced scanning operates in a field orthogonal transform mode;

said orthogonal transform system associated with sequential scanning operates in a frame orthogonal transform mode;

said motion prediction system associated with interlaced scanning operates in a field motion prediction mode; and said motion prediction system associated with sequential scanning operates in a frame motion prediction mode.

8. A picture decoding method for decoding moving picture data of a second resolution from compressed picture data of a first resolution, obtained on predictive coding by motion prediction in terms of a pre-set pixel block as a unit and on compression coding in terms of a predefined pixel block as a unit, the second resolution being lower than the first resolution, said method comprising the steps of:

inverse orthogonal transforming a first orthogonal transform block of the compressed picture data, orthogonal transformed by an orthogonal transform system associated with interlaced scanning;

inverse orthogonal transforming a second orthogonal transform block of said compressed picture data, orthogonal transformed in accordance with an orthogonal transform system associated with sequential scanning;

summing the first and second inverse orthogonally transformed compressed picture data to provide motion compensated reference picture data to output moving picture data of the second resolution;

storing moving picture data outputted in said summing step as reference picture data; and motion compensating a macro-block of the reference picture data, said motion compensating including:

performing first motion compensating of a macro-block of reference picture data motion-predicted in accordance with a motion prediction system associated with interlaced scanning;

performing second motion compensating of a macro-block of reference picture data motion-predicted in accordance with a motion prediction system associated with sequential scanning;

said first and second motion compensating including interpolating respective pixels of the macro-block of said stored reference picture data to generate a macro-block constituted by pixels of ¼ pixel precision for the stored reference picture data to execute motion compensation on the generated macro-block.

9. The picture decoding method according to claim 8 wherein said first and second motion compensating effects doubled interpolation on respective pixels in the horizontal direction of the macro-block of stored reference picture data and also effects doubled linear interpolation on the double-interpolated pixels to generate a macro-block constructed by pixels having ¼ pixel precision in the horizontal direction for the stored reference picture data.

10. The picture decoding method according to claim 8 wherein said first and second motion compensating effects quadrupled interpolation on respective pixels in the horizontal direction of the macro-block of the stored reference picture data to generate a macro-block constructed by pixels of ¼ pixel precision in the horizontal direction for the reference picture data.

11. The picture decoding method according to claim 8 wherein said first motion compensating effects double interpolation on respective pixels in the vertical direction of a macro-block of stored reference picture data in one field and also effects linear interpolation on the double interpolated pixels in one field to generate a macro-block constructed by pixels of the ¼ pixel precision for the vertical direction for the reference picture data.

12. The picture decoding method according to claim 8 wherein said first motion compensating effects quadrupled interpolation on respective pixels in the vertical direction of a macro-block of stored reference picture data to generate a macro-block constructed by pixels of the ¼ pixel precision for the vertical direction for the reference picture data.

13. The picture decoding method according to claim 8 wherein said second motion compensating effects double interpolation on respective pixels in the vertical direction of a macro-block of stored reference picture data in one field and also effects linear interpolation between top and bottom fields on the double-interpolated pixels in one field to generate a macro-block constructed by pixels of the ¼ pixel precision for the vertical direction for the reference picture data.

14. The picture decoding method according to claim 8 wherein:

said pre-set pixel block is a macro-block;

said predefined pixel block is an orthogonal transform block;

said orthogonal transform system associated with interlaced scanning operates in a field orthogonal transform mode;

said orthogonal transform system associated with sequential scanning operates in a frame orthogonal transform mode;

said motion prediction system associated with interlaced scanning operates in a field motion prediction mode; and said motion prediction system associated with sequential scanning operates in a frame motion prediction mode.

\* \* \* \* \*